United States Patent
Kohane et al.

(10) Patent No.: US 12,454,509 B2
(45) Date of Patent: Oct. 28, 2025

(54) LOCAL ANESTHETICS WITH SELECTIVE-SENSORY NERVE BLOCKADE

(71) Applicant: Children's Medical Center Corporation, Boston, MA (US)

(72) Inventors: Daniel S. Kohane, Newton, MA (US); Yueqin Zheng, Boston, MA (US)

(73) Assignee: Children's Medical Center Corporation, Boston, MA (US)

( * ) Notice: Subject to any disclaimer, the term of this patent is extended or adjusted under 35 U.S.C. 154(b) by 560 days.

(21) Appl. No.: 17/773,171

(22) PCT Filed: Oct. 29, 2020

(86) PCT No.: PCT/US2020/057963
§ 371 (c)(1),
(2) Date: Apr. 29, 2022

(87) PCT Pub. No.: WO2021/087113
PCT Pub. Date: May 6, 2021

(65) Prior Publication Data
US 2024/0092736 A1    Mar. 21, 2024

Related U.S. Application Data

(60) Provisional application No. 62/941,624, filed on Nov. 27, 2019, provisional application No. 62/928,177, filed on Oct. 30, 2019.

(51) Int. Cl.
| | | |
|---|---|---|
| *C07D 211/60* | (2006.01) | |
| *A61P 23/02* | (2006.01) | |
| *C07C 237/08* | (2006.01) | |
| *C07C 237/10* | (2006.01) | |
| *C07C 237/12* | (2006.01) | |

(52) U.S. Cl.
CPC ............ *C07D 211/60* (2013.01); *A61P 23/02* (2018.01); *C07C 237/08* (2013.01); *C07C 237/10* (2013.01); *C07C 237/12* (2013.01)

(58) Field of Classification Search
CPC .... C07D 211/60; C07C 237/08; C07C 237/10
See application file for complete search history.

(56) References Cited

U.S. PATENT DOCUMENTS

| | | |
|---|---|---|
| 3,050,559 A | 8/1962 | Burger et al. |
| 3,255,207 A | 6/1966 | Truant et al. |
| 4,160,099 A | 7/1979 | Bodor |
| 2017/0204053 A1 | 7/2017 | Tang et al. |
| 2019/0008865 A1 | 1/2019 | Patwardhan et al. |

FOREIGN PATENT DOCUMENTS

| | | |
|---|---|---|
| CH | 618842 A5 | 8/1980 |
| CN | 103601650 A | 2/2014 |
| CN | 106928126 | 7/2017 |
| GB | 866604 A | 4/1961 |
| JP | 2017-523175 A | 8/2017 |
| WO | WO 1998/024428 A1 | 6/1998 |
| WO | WO 2016/015581 A1 | 2/2016 |
| WO | WO 2019/189756 A1 | 10/2019 |

OTHER PUBLICATIONS

EP 20882228.8, Sep. 18, 2023, Partial Supplementary European Serach Report.
EP 20882228.8, Nov. 9, 2023, Extended European Search Report.
PCT/US20/57963, Dec. 29, 2020, Invitation to Pay Additional Fees.
PCT/US20/57963, Mar. 8, 2021, International Search Report and Written Opinion.
PCT/US20/57963, May 12, 2022, International Preliminary Report on Patentability.
Banasiak et al., Fungicidal quaternary ammonium compounds derived from betaine. Chemical Abstracts Services, Columbus, OH. Database Accession No. 1992:53509. 1992.
Dahlbom et al., Quaternary derivatives of aminoacylanilines. II. N,N-Bis(arylcarbamoylalkyl)ammonium salts, a class of new compounds with antiarrhythmic activity. Chemical Abstracts Services, Columbus, OH. Database Accession No. 1965:488540. 1965.
[No Author Listed] PubChem CID No. 130180162. 2-Acetyloxyethyl-[2-(2,6-dimethylanilino)-2-oxoethyl]-diethylazanium. Date Created: Oct. 7, 2017. Date Modified: Dec. 19, 2020. 7 pages.
Banasiak et al., Fungicidal quaternary ammonium compounds derived from Betaine. Tagungsbericht—Akademie der Landwirtschaftswissenschaften (1990), 291(Syst. Fungic. Antifungal Compd., vol. 2), 269-77.
Banasiak et al., Fungicidal activity of N-phenylamide quaternary ammonium compounds. Tagungsbericht—Akademie der Landwirtschaftswissenschaften (1990), 291(Syst. Fungic. Antifungal Compd., vol. 2), 377-348.
Bodor, Soft drugs. 3. A new class of anticholinergic agents. J Med Chem. May 1980;23(5):474-80.
Dahlbom et al., Quaternary derivatives of aminoacylanilines. Acta Pharm Suec. 1965; 2: 219-26.
Dahlbom et al., Quaternary derivatives of aminoacylanilines. IV. Acta Pharm Suec. Nov. 1965;2(5):383-6.
Li et al., Discovery of potent human lactate dehydrogenase A (LDHA) inhibitors with antiproliferative activity against lung cancer cells: virtual screening and biological evaluation. Medchemcomm. Jan. 13, 2017;8(3):599-605.
Nielsen et al., Bioreversible quaternary N-acyloxymethyl derivatives of the tertiary amines bupivacaine and lidocaine—synthesis, aqueous solubility and stability in buffer, human plasma and simulated intestinal fluid. Eur J Pharm Sci. Apr. 2005;24(5):433-40.

*Primary Examiner* — Adam C Milligan
*Assistant Examiner* — Karen Cheng
(74) *Attorney, Agent, or Firm* — Wolf, Greenfield & Sacks, P.C.

(57) ABSTRACT

Provided herein are compounds that are local anesthetics and useful for inducing selective sensory nerve blockade. Also provided are pharmaceutical compositions and kits comprising the compounds, and methods of inducing selective sensory nerve blockade by administering the compounds and/or compositions to a subject.

23 Claims, 2 Drawing Sheets

LOCAL ANESTHETICS WITH SELECTIVE-SENSORY NERVE BLOCKADE

CROSS-REFERENCE TO RELATED APPLICATIONS

This application is a national stage filing under 35 U.S.C. § 371 of International Patent Application Serial No. PCT/US2020/057963, filed Oct. 29, 2020, which claims the benefit under 35 U.S.C. § 119(e) of U.S. provisional application No. 62/928,177, filed Oct. 30, 2019, and U.S. provisional application No. 62/941,624, filed Nov. 27, 2019, each of which are incorporated by reference herein in their entireties.

FEDERALLY SPONSORED RESEARCH

This invention was made with government support under Grant No. GM131728 awarded by the National Institutes of Health. The government has certain rights in the invention.

BACKGROUND

Local anesthetics can produce a reversible loss of sensation when applied to nerve tissues. When applied locally to a nerve tissue in appropriate concentrations, local anesthetics reversibly block the action potentials responsible for nerve conduction. The anesthetics act on any part of the nervous system, including every type of nerve fiber. Thus, a local anesthetic in contact with a nerve trunk can cause both sensory and motor nerve block in the area innervated. Therefore, although the goal of topical or regional anesthesia is to block the transmission of signals to prevent pain, the administration of local anesthetics also produces numbness from block of low-threshold pressure and touch receptors, paralysis from block of motor axons, and block of autonomic fibers.

SUMMARY

The present disclosure stems from the recognition that effective strategies for generating pain-restricted local anesthesia while preserving motor and autonomic responses are desirable in certain medical and/or surgical procedures (e.g., childbirth, dental procedures, treating nociceptor-driven chronic pain). Thus, the present disclosure recognizes there is a need for compounds and methods that provide sensory-specific nerve blockade. Accordingly, the present disclosure provides new compounds, compositions, and methods for achieving selective sensory nerve blockade.

In one aspect, provided are compounds of Formula (II):

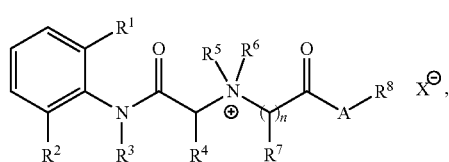
(II)

and pharmaceutically acceptable co-crystals, tautomers, stereoisomers, solvates, hydrates, polymorphs, isotopically enriched derivatives, or prodrugs thereof, wherein:

$R^1$ is substituted or unsubstituted alkyl;
$R^2$ is substituted or unsubstituted alkyl;
$R^3$ is hydrogen, or substituted or unsubstituted alkyl;
$R^4$ is hydrogen, substituted or unsubstituted alkyl, or is joined with $R^5$ or $R^6$ to form a heterocyclyl ring;
$R^5$ is substituted or unsubstituted alkyl, or is joined with $R^4$ to form a heterocyclyl ring;
$R^6$ is substituted or unsubstituted alkyl, or is joined with $R^4$ to form a heterocyclyl ring;
$R^7$ is hydrogen, substituted or unsubstituted alkyl, or halogen;
$R^8$ is substituted or unsubstituted alkyl, substituted or unsubstituted carbocyclyl, substituted or unsubstituted heterocyclyl, substituted or unsubstituted heteroaryl, or substituted or unsubstituted aryl;
A is O, S, or $NR^A$;
$R^A$ is hydrogen or substituted or unsubstituted alkyl;
$X^-$ is a counterion; and
n is 1, 2, 3, 4, 5, or 6;
provided that if A is $NR^A$, then $R^3$ is H; $R^8$ is not substituted or unsubstituted aryl; and the compound is not:

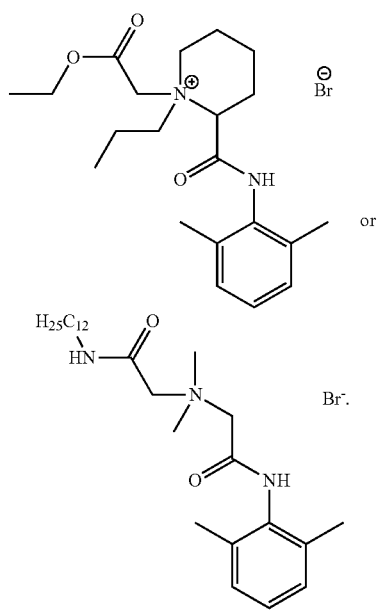

In certain embodiments, the compounds of Formula (II) are compounds of Formula (II-b), (II-c), (II-d), (II-e), (II-f), (II-g), (II-h), (II-i), or (II-j):

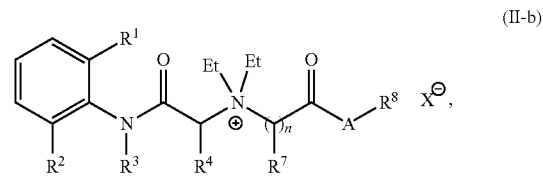
(II-b)

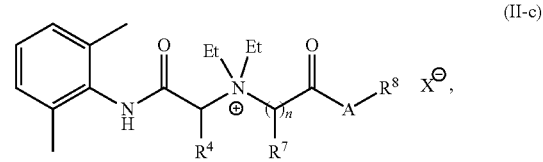
(II-c)

(II-d) 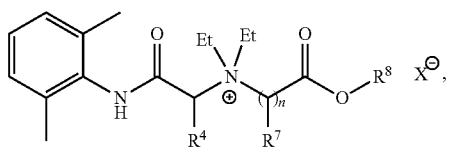
(II-e) 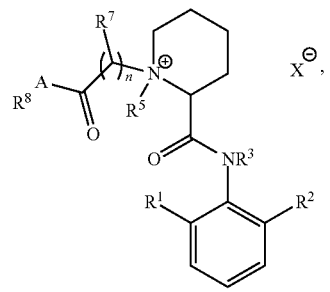
(II-f) 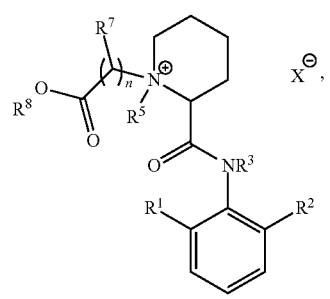
(II-g) 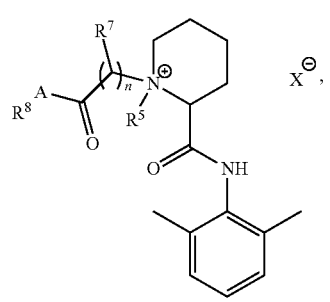
(II-h) 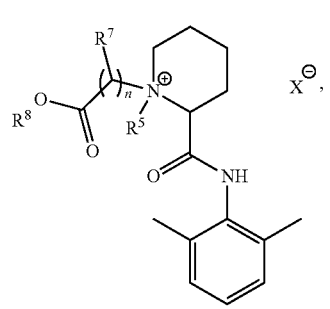
(II-i) 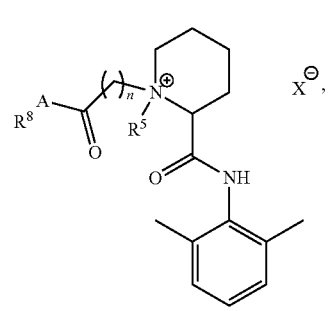
(II-j) 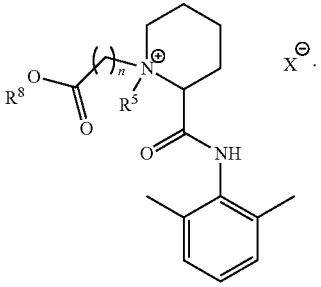
Exemplary compounds of Formula (II) include, but are not limited to:
1
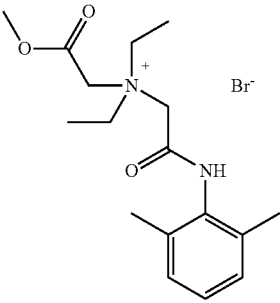
2
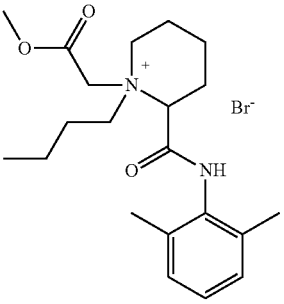
3
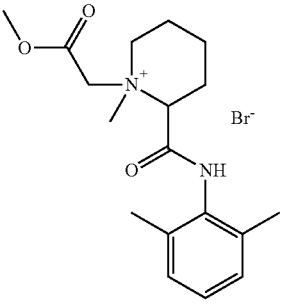

4
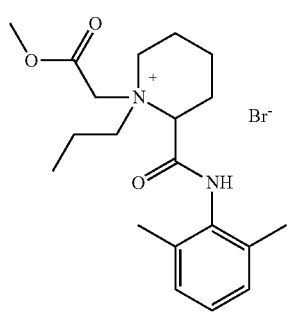
5
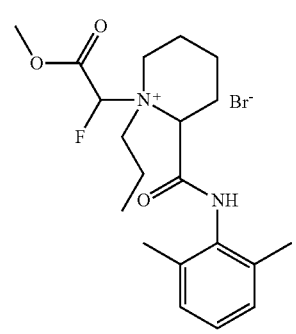
8
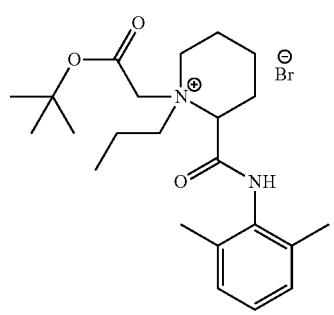
14
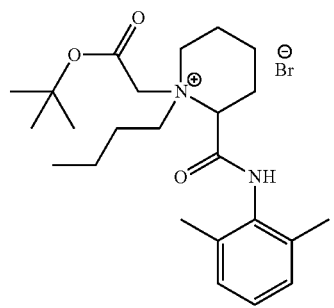
15
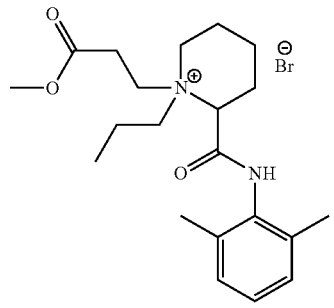
16
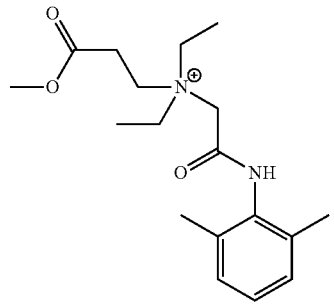
17

18
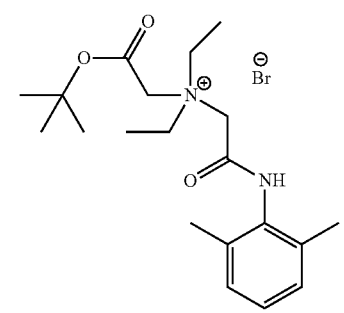
19
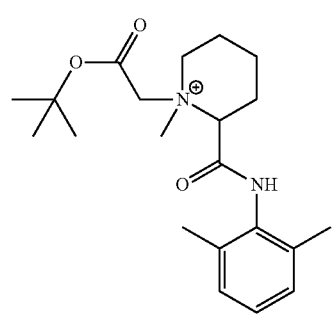
20
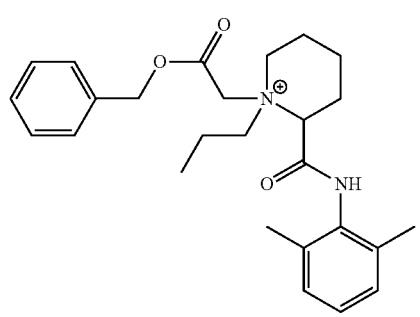
21
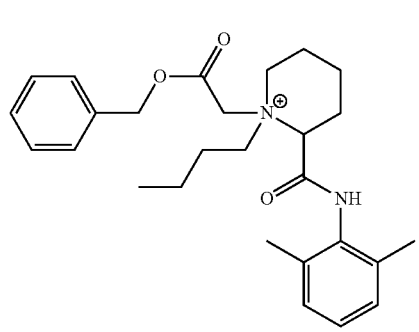
22
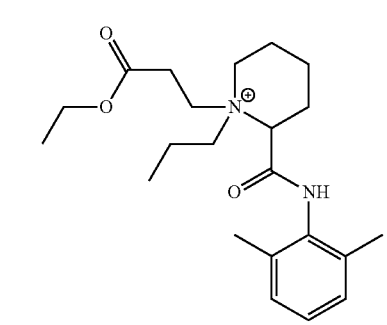
23
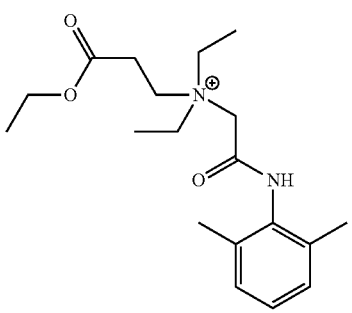
24
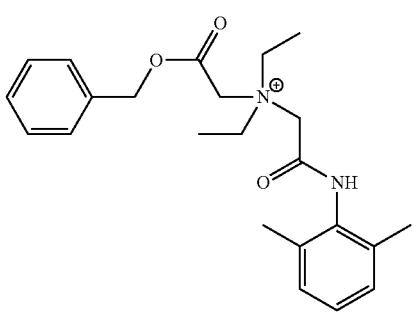
25
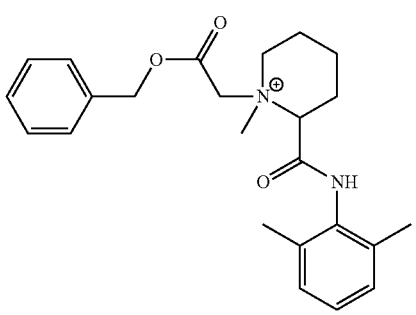
26
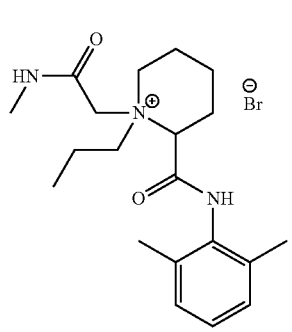
27
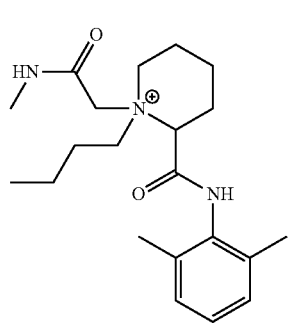

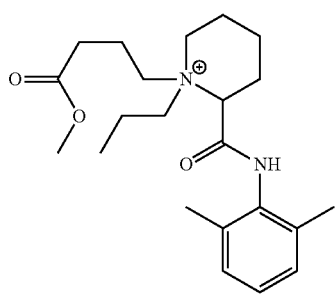

28

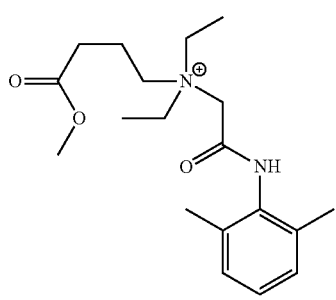

29

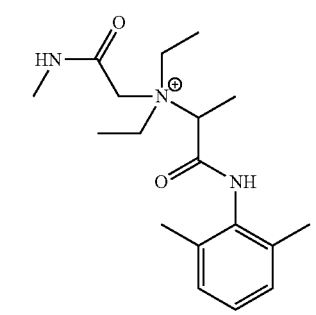

30

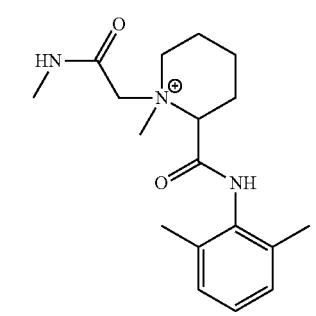

31

In another aspect, provided are compounds of formula:

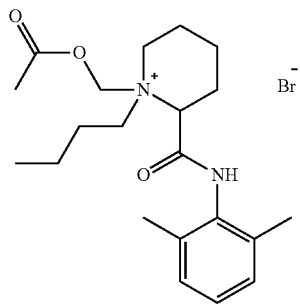

9

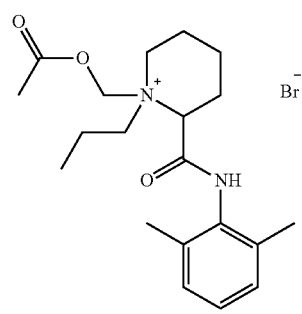

10

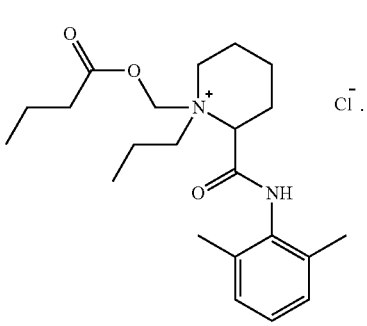

11 or 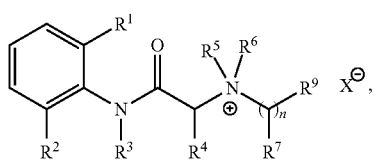

In another aspect, provided are pharmaceutical compositions comprising a compound of the disclosure (e.g., a compound of Formula (II)), and optionally a pharmaceutically acceptable excipient.

In another aspect, provided are methods of inducing selective sensory nerve blockade, the method comprising administering to a subject in need thereof, a compound of Formula (I):

$$\text{(I)}$$

and pharmaceutically acceptable co-crystals, tautomers, stereoisomers, solvates, hydrates, polymorphs, isotopically enriched derivatives, or prodrugs thereof, wherein:

$R^1$ is substituted or unsubstituted alkyl;
$R^2$ is substituted or unsubstituted alkyl;
$R^3$ is hydrogen, or substituted or unsubstituted alkyl;
$R^4$ is hydrogen, substituted or unsubstituted alkyl, or is joined with $R^5$ or $R^6$ to form a heterocyclyl ring;
$R^5$ is substituted or unsubstituted alkyl, or is joined with $R^4$ or $R^6$ to form a heterocyclyl ring;
$R^6$ is substituted or unsubstituted alkyl, or is joined with $R^4$ or $R^5$ to form a heterocyclyl ring;
$R^7$ is hydrogen, substituted or unsubstituted alkyl, or halogen;
$R^9$ is —(C=O)-A-$R^8$ or -$A^1$-(C=O)—$R^{10}$;
$R^8$ is substituted or unsubstituted alkyl, substituted or unsubstituted carbocyclyl, substituted or unsubstituted heterocyclyl, substituted or unsubstituted heteroaryl, or substituted or unsubstituted aryl;
$R^{10}$ is substituted or unsubstituted alkyl, substituted or unsubstituted carbocyclyl, substituted or unsubstituted heterocyclyl, substituted or unsubstituted heteroaryl, or substituted or unsubstituted aryl;

A is O, S, or NR$^A$;
A$^1$ is O, S, or NR$^A$;
R$^A$ is hydrogen or substituted or unsubstituted alkyl;
X$^-$ is a counterion; and
n is 1, 2, 3, 4, 5, or 6.

In certain embodiments, the method comprises administering a compound of Formula (II):

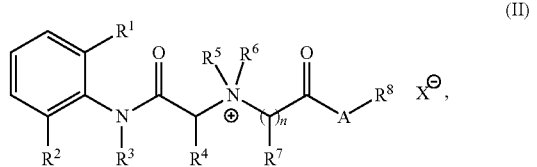

(II)

In certain embodiments, the method comprises administering a compound of Formula (II-b), (II-c), (II-d), (II-e), (II-f), (II-g), (II-h), (II-i), or (II-j):

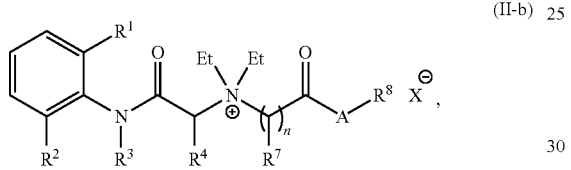

(II-b)

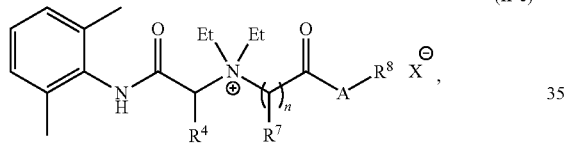

(II-c)

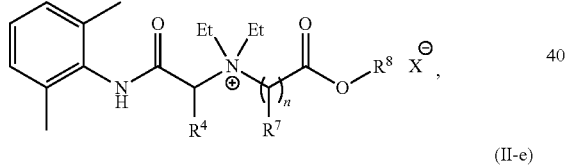

(II-d)

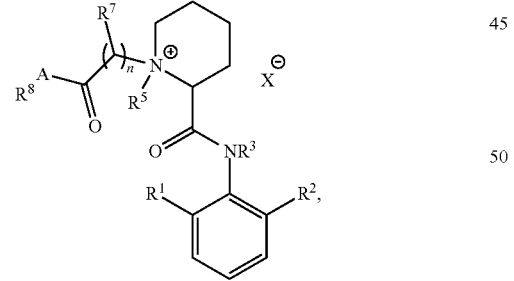

(II-e)

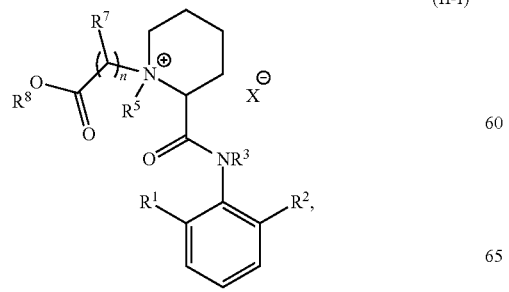

(II-f)

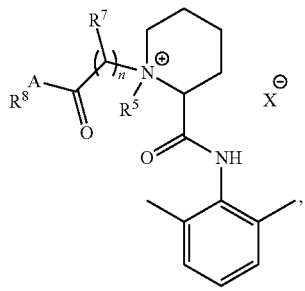

(II-g)

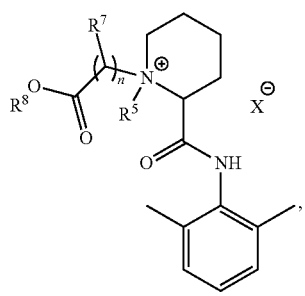

(II-h)

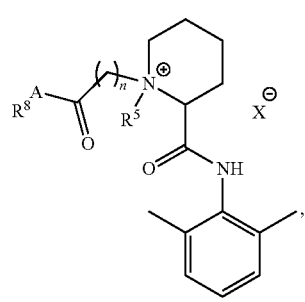

(II-i)

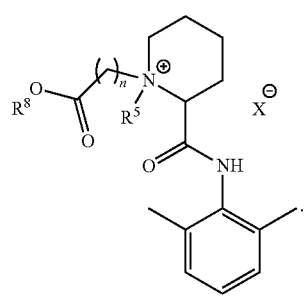

(II-j)

In certain embodiments, the method comprises administering a compound of Formula (III):

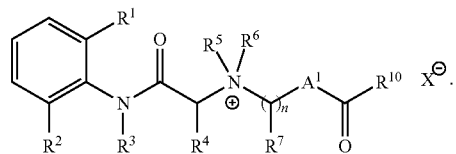

(III)

In certain embodiments, the method comprises administering a compound of Formula (III-b), (III-c), (III-d), (III-e), or (III-f):

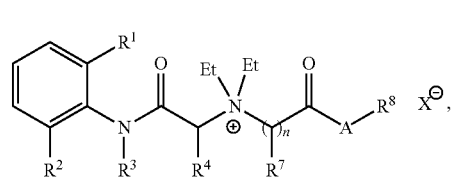
(III-b)
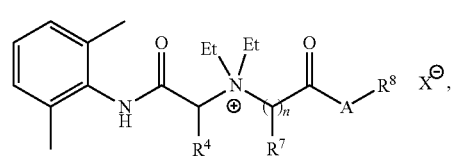
(III-c)
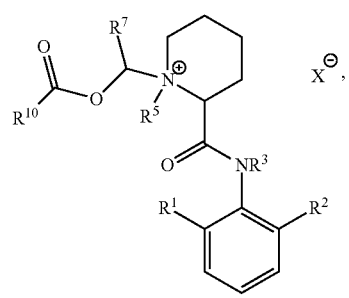
(III-d)
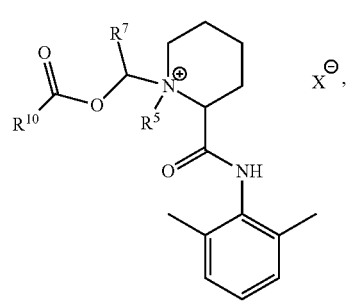
(III-e)
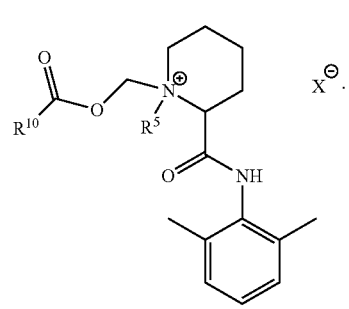
(III-f)
In certain embodiments, the method comprises administering a compound of formula:
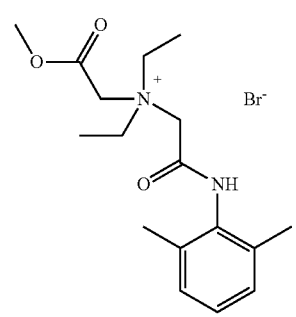
1
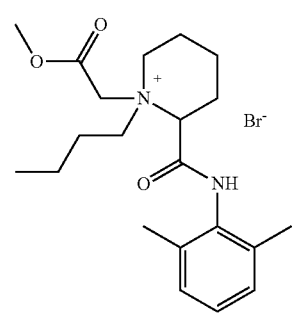
2
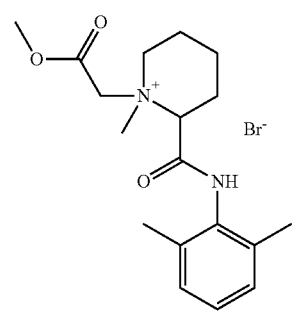
3
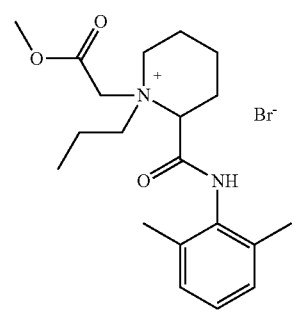
4
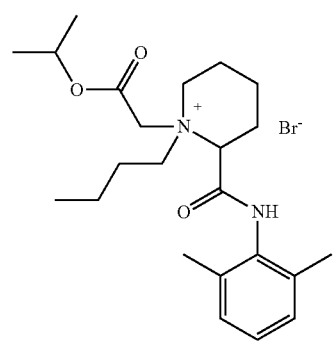
5

-continued
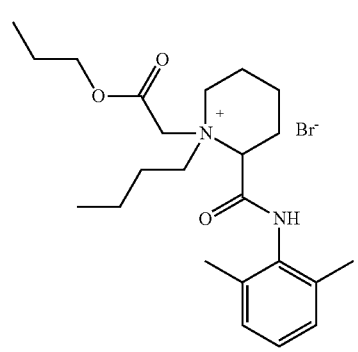
6
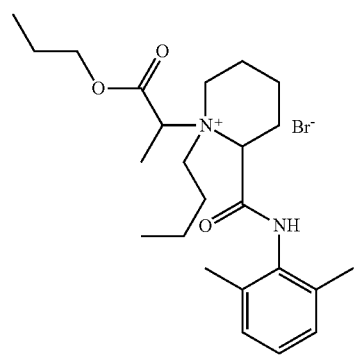
7
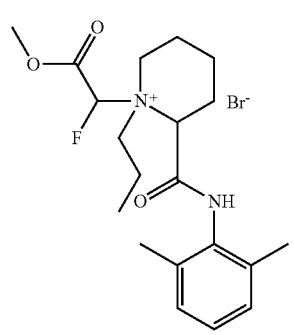
8
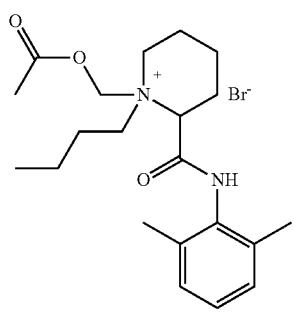
9
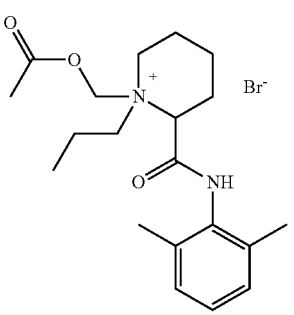
10
-continued
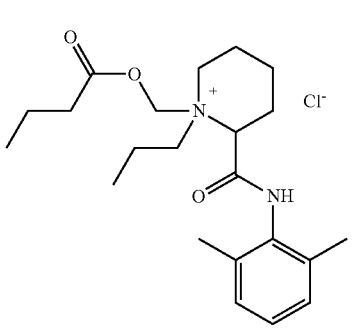
11
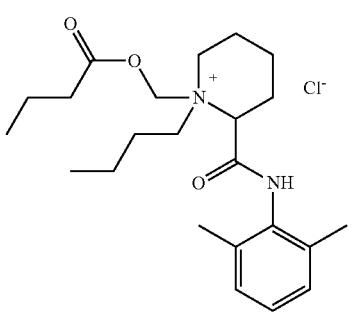
12
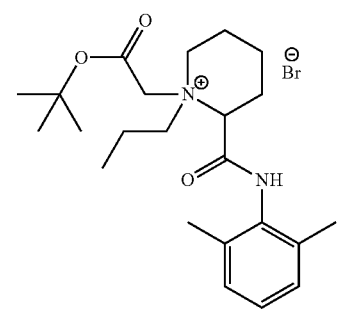
14
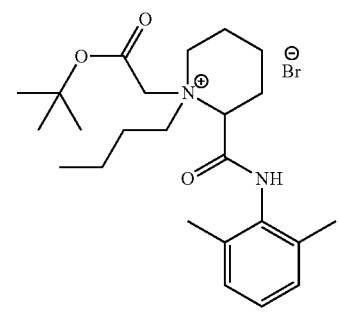
15
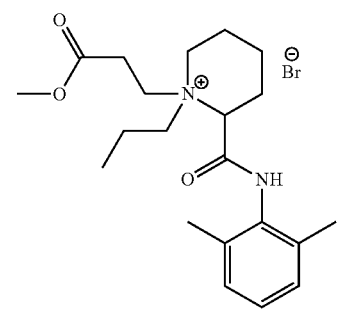
16

-continued
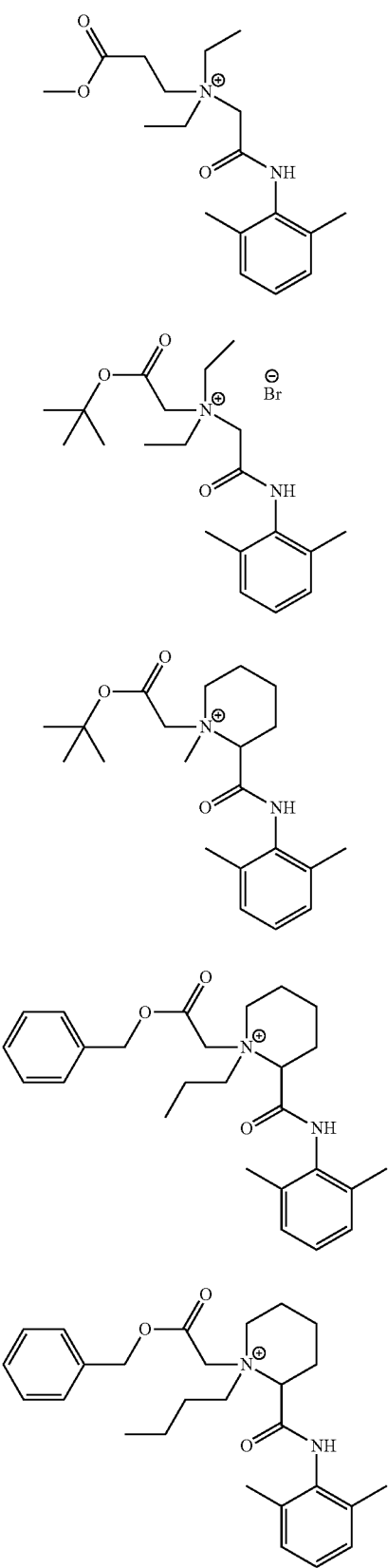
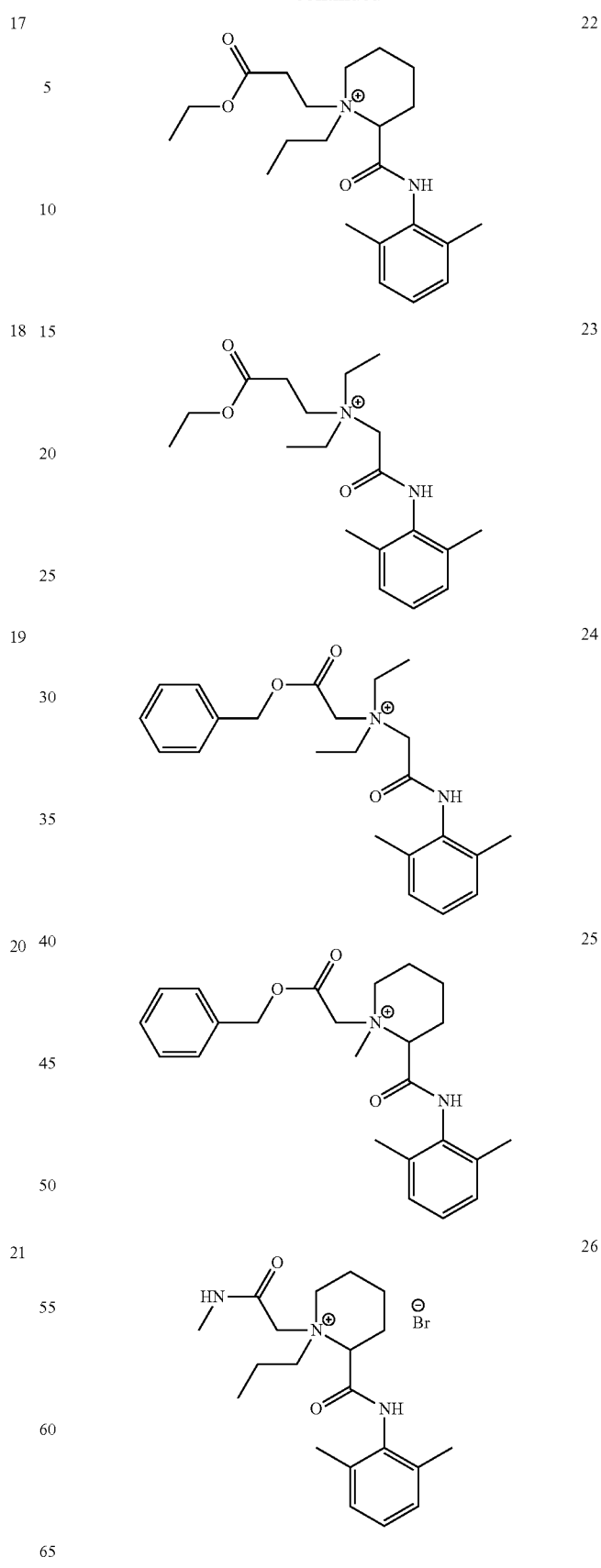

27

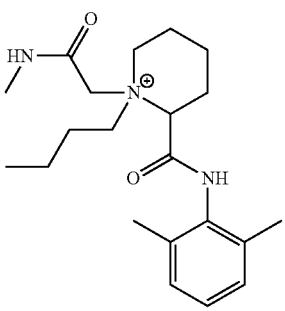

28

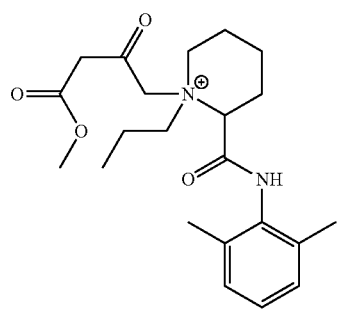

29

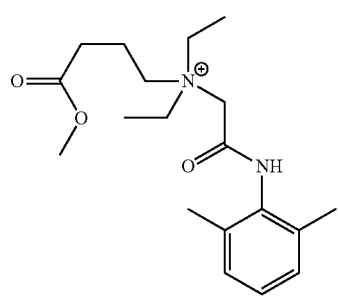

30

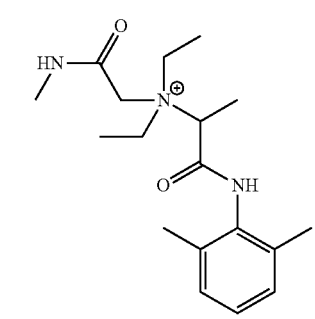

31

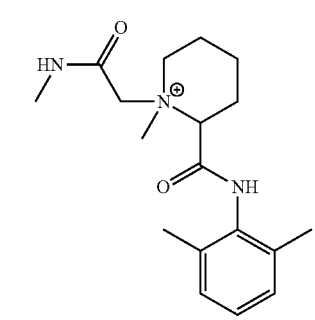

In another aspect, provided are compounds of Formula (I), (II), or (III), and pharmaceutical compositions comprising a compound of Formula (I), (II), or (III), for use in inducing selective sensory nerve blockade in a subject in need thereof.

In another aspect, provided are kits comprising a compound of Formula (I), (II), or (III), or a pharmaceutical composition comprising a compound of Formula (I), (II), or (III). In certain embodiments, the kits further comprise instructions for administration (e.g., human administration).

The details of certain embodiments of the invention are set forth in the Detailed Description of Certain Embodiments, as described below. Other features, objects, and advantages of the invention will be apparent from the Definitions, Examples, and Claims.

Definitions

Chemical Definitions

Definitions of specific functional groups and chemical terms are described in more detail below. The chemical elements are identified in accordance with the Periodic Table of the Elements, CAS version, *Handbook of Chemistry and Physics*, 75th Ed., inside cover, and specific functional groups are generally defined as described therein. Additionally, general principles of organic chemistry, as well as specific functional moieties and reactivity, are described in *Organic Chemistry*, Thomas Sorrell, University Science Books, Sausalito, 1999; Smith and March, *March's Advanced Organic Chemistry*, 5th Edition, John Wiley & Sons, Inc., New York, 2001; Larock, *Comprehensive Organic Transformations*, VCH Publishers, Inc., New York, 1989; and Carruthers, *Some Modern Methods of Organic Synthesis*, 3rd Edition, Cambridge University Press, Cambridge, 1987.

Compounds described herein can comprise one or more asymmetric centers, and thus can exist in various stereoisomeric forms, e.g., enantiomers and/or diastereomers. For example, the compounds described herein can be in the form of an individual enantiomer, diastereomer or geometric isomer, or can be in the form of a mixture of stereoisomers, including racemic mixtures and mixtures enriched in one or more stereoisomer. Isomers can be isolated from mixtures by methods known to those skilled in the art, including chiral high pressure liquid chromatography (HPLC) and the formation and crystallization of chiral salts; or preferred isomers can be prepared by asymmetric syntheses. See, for example, Jacques et al., Enantiomers, Racemates and Resolutions (Wiley Interscience, New York, 1981); Wilen et al., Tetrahedron 33:2725 (1977); Eliel, E. L. Stereochemistry of Carbon Compounds (McGraw-Hill, N Y, 1962); and Wilen, S. H., Tables of Resolving Agents and Optical Resolutions p. 268 (E. L. Eliel, Ed., Univ. of Notre Dame Press, Notre Dame, IN 1972). The invention additionally encompasses compounds as individual isomers substantially free of other isomers, and alternatively, as mixtures of various isomers.

Unless otherwise stated, structures depicted herein are also meant to include compounds that differ only in the presence of one or more isotopically enriched atoms. For example, compounds having the present structures except for the replacement of hydrogen by deuterium or tritium, replacement of $^{19}$F with $^{18}$F, or the replacement of $^{12}$C with $^{13}$C or $^{14}$C are within the scope of the disclosure. Such compounds are useful, for example, as analytical tools or probes in biological assays.

When a range of values is listed, it is intended to encompass each value and sub-range within the range. For example "$C_{1-6}$ alkyl" is intended to encompass, $C_1$, $C_2$, $C_3$, $C_4$, $C_5$, $C_6$, $C_{1-6}$, $C_{1-5}$, $C_{1-4}$, $C_{1-3}$, $C_{1-2}$, $C_{2-6}$, $C_{2-5}$, $C_{2-4}$, $C_{2-3}$, $C_{3-6}$, $C_{3-5}$, $C_{3-4}$, $C_{4-6}$, $C_{4-5}$, and $C_{5-6}$ alkyl.

The term "alkyl" refers to a radical of a straight-chain or branched saturated hydrocarbon group having from 1 to 10 carbon atoms ("$C_{1-10}$ alkyl"). In some embodiments, an alkyl group has 1 to 9 carbon atoms ("$C_{1-9}$ alkyl"). In some embodiments, an alkyl group has 1 to 8 carbon atoms ("$C_{1-8}$ alkyl"). In some embodiments, an alkyl group has 1 to 7 carbon atoms ("$C_{1-7}$ alkyl"). In some embodiments, an alkyl group has 1 to 6 carbon atoms ("$C_{1-6}$ alkyl"). In some embodiments, an alkyl group has 1 to 5 carbon atoms ("$C_{1-5}$ alkyl"). In some embodiments, an alkyl group has 1 to 4 carbon atoms ("$C_{1-4}$ alkyl"). In some embodiments, an alkyl group has 1 to 3 carbon atoms ("$C_{1-3}$ alkyl"). In some embodiments, an alkyl group has 1 to 2 carbon atoms ("$C_{1-2}$ alkyl"). In some embodiments, an alkyl group has 1 carbon atom ("$C_1$ alkyl"). In some embodiments, an alkyl group has 2 to 6 carbon atoms ("$C_{2-6}$ alkyl"). Examples of $C_{1-6}$ alkyl groups include methyl ($C_1$), ethyl ($C_2$), propyl ($C_3$) (e.g., n-propyl, isopropyl), butyl ($C_4$) (e.g., n-butyl, tert-butyl, sec-butyl, iso-butyl), pentyl ($C_5$) (e.g., n-pentyl, 3-pentanyl, amyl, neopentyl, 3-methyl-2-butanyl, tertiary amyl), and hexyl ($C_6$) (e.g., n-hexyl). Additional examples of alkyl groups include n-heptyl ($C_7$), n-octyl ($C_8$), and the like. Unless otherwise specified, each instance of an alkyl group is independently unsubstituted (an "unsubstituted alkyl") or substituted (a "substituted alkyl") with one or more substituents (e.g., halogen, such as F). In certain embodiments, the alkyl group is an unsubstituted $C_{1-10}$ alkyl (such as unsubstituted $C_{1-6}$ alkyl, e.g., —$CH_3$ (Me), unsubstituted ethyl (Et), unsubstituted propyl (Pr, e.g., unsubstituted n-propyl (n-Pr), unsubstituted isopropyl (i-Pr)), unsubstituted butyl (Bu, e.g., unsubstituted n-butyl (n-Bu), unsubstituted tert-butyl (tert-Bu or t-Bu), unsubstituted sec-butyl (sec-Bu), unsubstituted isobutyl (i-Bu)). In certain embodiments, the alkyl group is a substituted $C_{1-10}$ alkyl (such as substituted $C_{1-6}$ alkyl, e.g., —$CF_3$, Bn).

The term "haloalkyl" is a substituted alkyl group, wherein one or more of the hydrogen atoms are independently replaced by a halogen, e.g., fluoro, bromo, chloro, or iodo. In some embodiments, the haloalkyl moiety has 1 to 8 carbon atoms ("$C_{1-8}$ haloalkyl"). In some embodiments, the haloalkyl moiety has 1 to 6 carbon atoms ("$C_{1-6}$ haloalkyl"). In some embodiments, the haloalkyl moiety has 1 to 4 carbon atoms ("$C_{1-4}$ haloalkyl"). In some embodiments, the haloalkyl moiety has 1 to 3 carbon atoms ("$C_{1-3}$ haloalkyl"). In some embodiments, the haloalkyl moiety has 1 to 2 carbon atoms ("$C_{1-2}$ haloalkyl"). Examples of haloalkyl groups include —$CHF_2$, —$CH_2F$, —$CF_3$, —$CH_2CF_3$, —$CF_2CF_3$, —$CF_2CF_2CF_3$, —$CCl_3$, —$CFCl_2$, —$CF_2Cl$, and the like.

The term "heteroalkyl" refers to an alkyl group, which further includes at least one heteroatom (e.g., 1, 2, 3, or 4 heteroatoms) selected from oxygen, nitrogen, or sulfur within (i.e., inserted between adjacent carbon atoms of) and/or placed at one or more terminal position(s) of the parent chain. In certain embodiments, a heteroalkyl group refers to a saturated group having from 1 to 20 carbon atoms and 1 or more heteroatoms within the parent chain ("hetero$C_{1-20}$ alkyl"). In some embodiments, a heteroalkyl group is a saturated group having 1 to 18 carbon atoms and 1 or more heteroatoms within the parent chain ("hetero$C_{1-18}$ alkyl"). In some embodiments, a heteroalkyl group is a saturated group having 1 to 16 carbon atoms and 1 or more heteroatoms within the parent chain ("hetero$C_{1-16}$ alkyl"). In some embodiments, a heteroalkyl group is a saturated group having 1 to 14 carbon atoms and 1 or more heteroatoms within the parent chain ("hetero$C_{1-14}$ alkyl"). In some embodiments, a heteroalkyl group is a saturated group having 1 to 12 carbon atoms and 1 or more heteroatoms within the parent chain ("hetero$C_{1-12}$ alkyl"). In some embodiments, a heteroalkyl group is a saturated group having 1 to 10 carbon atoms and 1 or more heteroatoms within the parent chain ("hetero$C_{1-10}$ alkyl"). In some embodiments, a heteroalkyl group is a saturated group having 1 to 8 carbon atoms and 1 or more heteroatoms within the parent chain ("hetero$C_{1-8}$ alkyl"). In some embodiments, a heteroalkyl group is a saturated group having 1 to 6 carbon atoms and 1 or more heteroatoms within the parent chain ("hetero$C_{1-6}$ alkyl"). In some embodiments, a heteroalkyl group is a saturated group having 1 to 4 carbon atoms and 1 or 2 heteroatoms within the parent chain ("hetero$C_{1-4}$ alkyl"). In some embodiments, a heteroalkyl group is a saturated group having 1 to 3 carbon atoms and 1 heteroatom within the parent chain ("hetero$C_{1-3}$ alkyl"). In some embodiments, a heteroalkyl group is a saturated group having 1 to 2 carbon atoms and 1 heteroatom within the parent chain ("hetero$C_{1-2}$ alkyl"). In some embodiments, a heteroalkyl group is a saturated group having 1 carbon atom and 1 heteroatom ("hetero$C_1$ alkyl"). In some embodiments, the heteroalkyl group defined herein is a partially unsaturated group having 1 or more heteroatoms within the parent chain and at least one unsaturated carbon, such as a carbonyl group. For example, a heteroalkyl group may comprise an amide or ester functionality in its parent chain such that one or more carbon atoms are unsaturated carbonyl groups. Unless otherwise specified, each instance of a heteroalkyl group is independently unsubstituted (an "unsubstituted heteroalkyl") or substituted (a "substituted heteroalkyl") with one or more substituents. In certain embodiments, the heteroalkyl group is an unsubstituted hetero$C_{1-20}$ alkyl. In certain embodiments, the heteroalkyl group is an unsubstituted hetero$C_{1-10}$ alkyl. In certain embodiments, the heteroalkyl group is a substituted hetero$C_{1-20}$ alkyl. In certain embodiments, the heteroalkyl group is an unsubstituted hetero$C_{1-10}$ alkyl.

The term "alkenyl" refers to a radical of a straight-chain or branched hydrocarbon group having from 2 to 10 carbon atoms and one or more carbon-carbon double bonds (e.g., 1, 2, 3, or 4 double bonds). In some embodiments, an alkenyl group has 2 to 9 carbon atoms ("$C_{2-9}$ alkenyl"). In some embodiments, an alkenyl group has 2 to 8 carbon atoms ("$C_{2-8}$ alkenyl"). In some embodiments, an alkenyl group has 2 to 7 carbon atoms ("$C_{2-7}$ alkenyl"). In some embodiments, an alkenyl group has 2 to 6 carbon atoms ("$C_{2-6}$ alkenyl"). In some embodiments, an alkenyl group has 2 to 5 carbon atoms ("$C_{2-5}$ alkenyl"). In some embodiments, an alkenyl group has 2 to 4 carbon atoms ("$C_{2-4}$ alkenyl"). In some embodiments, an alkenyl group has 2 to 3 carbon atoms ("$C_{2-3}$ alkenyl"). In some embodiments, an alkenyl group has 2 carbon atoms ("$C_2$ alkenyl"). The one or more carbon-carbon double bonds can be internal (such as in 2-butenyl) or terminal (such as in 1-butenyl). Examples of $C_{2-4}$ alkenyl groups include ethenyl ($C_2$), 1-propenyl ($C_3$), 2-propenyl ($C_3$), 1-butenyl ($C_4$), 2-butenyl ($C_4$), butadienyl ($C_4$), and the like. Examples of $C_{2-6}$ alkenyl groups include the aforementioned $C_{2-4}$ alkenyl groups as well as pentenyl ($C_5$), pentadienyl ($C_5$), hexenyl ($C_6$), and the like. Additional examples of alkenyl include heptenyl ($C_7$), octenyl ($C_8$), octatrienyl ($C_8$), and the like. Unless otherwise specified, each instance of an alkenyl group is independently unsubstituted (an "unsubstituted alkenyl") or substituted (a "substituted alkenyl") with one or more substituents. In certain embodiments, the alkenyl group is an unsubstituted $C_{2-10}$ alkenyl. In certain embodiments, the alkenyl group is a substituted C$_{2-10}$ alkenyl. In an alkenyl group, a C=C double bond for which the stereochemistry is not specified (e.g., —CH=CHCH$_3$ or

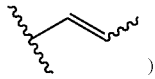
)

may be an (E)- or (Z)-double bond.

The term "heteroalkenyl" refers to an alkenyl group, which further includes at least one heteroatom (e.g., 1, 2, 3, or 4 heteroatoms) selected from oxygen, nitrogen, or sulfur within (i.e., inserted between adjacent carbon atoms of) and/or placed at one or more terminal position(s) of the parent chain. In certain embodiments, a heteroalkenyl group refers to a group having from 2 to 10 carbon atoms, at least one double bond, and 1 or more heteroatoms within the parent chain ("heteroC$_{2-10}$ alkenyl"). In some embodiments, a heteroalkenyl group has 2 to 9 carbon atoms at least one double bond, and 1 or more heteroatoms within the parent chain ("heteroC$_{2-9}$ alkenyl"). In some embodiments, a heteroalkenyl group has 2 to 8 carbon atoms, at least one double bond, and 1 or more heteroatoms within the parent chain ("heteroC$_{2-8}$ alkenyl"). In some embodiments, a heteroalkenyl group has 2 to 7 carbon atoms, at least one double bond, and 1 or more heteroatoms within the parent chain ("heteroC$_{2-7}$ alkenyl"). In some embodiments, a heteroalkenyl group has 2 to 6 carbon atoms, at least one double bond, and 1 or more heteroatoms within the parent chain ("heteroC$_{2-6}$ alkenyl"). In some embodiments, a heteroalkenyl group has 2 to 5 carbon atoms, at least one double bond, and 1 or 2 heteroatoms within the parent chain ("heteroC$_{2-5}$ alkenyl"). In some embodiments, a heteroalkenyl group has 2 to 4 carbon atoms, at least one double bond, and 1 or 2 heteroatoms within the parent chain ("heteroC$_{2-4}$ alkenyl"). In some embodiments, a heteroalkenyl group has 2 to 3 carbon atoms, at least one double bond, and 1 heteroatom within the parent chain ("heteroC$_{2-3}$ alkenyl"). In some embodiments, a heteroalkenyl group has 2 to 6 carbon atoms, at least one double bond, and 1 or 2 heteroatoms within the parent chain ("heteroC$_{2-6}$ alkenyl"). Unless otherwise specified, each instance of a heteroalkenyl group is independently unsubstituted (an "unsubstituted heteroalkenyl") or substituted (a "substituted heteroalkenyl") with one or more substituents. In certain embodiments, the heteroalkenyl group is an unsubstituted heteroC$_{2-10}$ alkenyl. In certain embodiments, the heteroalkenyl group is a substituted heteroC$_{2-10}$ alkenyl.

The term "alkynyl" refers to a radical of a straight-chain or branched hydrocarbon group having from 2 to 10 carbon atoms and one or more carbon-carbon triple bonds (e.g., 1, 2, 3, or 4 triple bonds) ("C$_{2-10}$ alkynyl"). In some embodiments, an alkynyl group has 2 to 9 carbon atoms ("C$_{2-9}$ alkynyl"). In some embodiments, an alkynyl group has 2 to 8 carbon atoms ("C$_{2-8}$ alkynyl"). In some embodiments, an alkynyl group has 2 to 7 carbon atoms ("C$_{2-7}$ alkynyl"). In some embodiments, an alkynyl group has 2 to 6 carbon atoms ("C$_{2-6}$ alkynyl"). In some embodiments, an alkynyl group has 2 to 5 carbon atoms ("C$_{2-5}$ alkynyl"). In some embodiments, an alkynyl group has 2 to 4 carbon atoms ("C$_{2-4}$ alkynyl"). In some embodiments, an alkynyl group has 2 to 3 carbon atoms ("C$_{2-3}$ alkynyl"). In some embodiments, an alkynyl group has 2 carbon atoms ("C$_2$ alkynyl"). The one or more carbon-carbon triple bonds can be internal (such as in 2-butynyl) or terminal (such as in 1-butynyl).

Examples of C$_{2-4}$ alkynyl groups include, without limitation, ethynyl (C$_2$), 1-propynyl (C$_3$), 2-propynyl (C$_3$), 1-butynyl (C$_4$), 2-butynyl (C$_4$), and the like. Examples of C$_{2-6}$ alkenyl groups include the aforementioned C$_{2-4}$ alkynyl groups as well as pentynyl (C$_5$), hexynyl (C$_6$), and the like. Additional examples of alkynyl include heptynyl (C$_7$), octynyl (C$_8$), and the like. Unless otherwise specified, each instance of an alkynyl group is independently unsubstituted (an "unsubstituted alkynyl") or substituted (a "substituted alkynyl") with one or more substituents. In certain embodiments, the alkynyl group is an unsubstituted C$_{2-10}$ alkynyl. In certain embodiments, the alkynyl group is a substituted C$_{2-10}$ alkynyl.

The term "heteroalkynyl" refers to an alkynyl group, which further includes at least one heteroatom (e.g., 1, 2, 3, or 4 heteroatoms) selected from oxygen, nitrogen, or sulfur within (i.e., inserted between adjacent carbon atoms of) and/or placed at one or more terminal position(s) of the parent chain. In certain embodiments, a heteroalkynyl group refers to a group having from 2 to 10 carbon atoms, at least one triple bond, and 1 or more heteroatoms within the parent chain ("heteroC$_{2-10}$ alkynyl"). In some embodiments, a heteroalkynyl group has 2 to 9 carbon atoms, at least one triple bond, and 1 or more heteroatoms within the parent chain ("heteroC$_{2-9}$ alkynyl"). In some embodiments, a heteroalkynyl group has 2 to 8 carbon atoms, at least one triple bond, and 1 or more heteroatoms within the parent chain ("heteroC$_{2-8}$ alkynyl"). In some embodiments, a heteroalkynyl group has 2 to 7 carbon atoms, at least one triple bond, and 1 or more heteroatoms within the parent chain ("heteroC$_{2-7}$ alkynyl"). In some embodiments, a heteroalkynyl group has 2 to 6 carbon atoms, at least one triple bond, and 1 or more heteroatoms within the parent chain ("heteroC$_{2-6}$ alkynyl"). In some embodiments, a heteroalkynyl group has 2 to 5 carbon atoms, at least one triple bond, and 1 or 2 heteroatoms within the parent chain ("heteroC$_{2-5}$ alkynyl"). In some embodiments, a heteroalkynyl group has 2 to 4 carbon atoms, at least one triple bond, and 1 or 2 heteroatoms within the parent chain ("heteroC$_{2-4}$ alkynyl"). In some embodiments, a heteroalkynyl group has 2 to 3 carbon atoms, at least one triple bond, and 1 heteroatom within the parent chain ("heteroC$_{2-3}$ alkynyl"). In some embodiments, a heteroalkynyl group has 2 to 6 carbon atoms, at least one triple bond, and 1 or 2 heteroatoms within the parent chain ("heteroC$_{2-6}$ alkynyl").

Unless otherwise specified, each instance of a heteroalkynyl group is independently unsubstituted (an "unsubstituted heteroalkynyl") or substituted (a "substituted heteroalkynyl") with one or more substituents. In certain embodiments, the heteroalkynyl group is an unsubstituted heteroC$_{2-10}$ alkynyl. In certain embodiments, the heteroalkynyl group is a substituted heteroC$_{2-10}$ alkynyl.

The term "carbocyclyl" or "carbocyclic" refers to a radical of a non-aromatic cyclic hydrocarbon group having from 3 to 14 ring carbon atoms ("C$_{3-14}$ carbocyclyl") and zero heteroatoms in the non-aromatic ring system. In some embodiments, a carbocyclyl group has 3 to 10 ring carbon atoms ("C$_{3-10}$ carbocyclyl"). In some embodiments, a carbocyclyl group has 3 to 8 ring carbon atoms ("C$_{3-8}$ carbocyclyl"). In some embodiments, a carbocyclyl group has 3 to 7 ring carbon atoms ("C$_{3-7}$ carbocyclyl"). In some embodiments, a carbocyclyl group has 3 to 6 ring carbon atoms ("C$_{3-6}$ carbocyclyl"). In some embodiments, a carbocyclyl group has 4 to 6 ring carbon atoms ("C$_{4-6}$ carbocyclyl"). In some embodiments, a carbocyclyl group has 5 to 6 ring carbon atoms ("C$_{5-6}$ carbocyclyl"). In some embodiments, a carbocyclyl group has 5 to 10 ring carbon atoms ("C$_{5-10}$ carbocyclyl"). Exemplary $C_{3-6}$ carbocyclyl groups include, without limitation, cyclopropyl ($C_3$), cyclopropenyl ($C_3$), cyclobutyl ($C_4$), cyclobutenyl ($C_4$), cyclopentyl ($C_5$), cyclopentenyl ($C_5$), cyclohexyl ($C_6$), cyclohexenyl ($C_6$), cyclohexadienyl ($C_6$), and the like. Exemplary $C_{3-8}$ carbocyclyl groups include, without limitation, the aforementioned $C_{3-6}$ carbocyclyl groups as well as cycloheptyl ($C_7$), cycloheptenyl ($C_7$), cycloheptadienyl ($C_7$), cycloheptatrienyl ($C_7$), cyclooctyl ($C_8$), cyclooctenyl ($C_8$), bicyclo[2.2.1]heptanyl ($C_7$), bicyclo[2.2.2]octanyl ($C_8$), and the like. Exemplary $C_{3-10}$ carbocyclyl groups include, without limitation, the aforementioned $C_{3-8}$ carbocyclyl groups as well as cyclononyl ($C_9$), cyclononenyl ($C_9$), cyclodecyl ($C_{10}$), cyclodecenyl ($C_{10}$), octahydro-1H-indenyl ($C_9$), decahydronaphthalenyl ($C_{10}$), spiro[4.5]decanyl ($C_{10}$), and the like. As the foregoing examples illustrate, in certain embodiments, the carbocyclyl group is either monocyclic ("monocyclic carbocyclyl") or polycyclic (e.g., containing a fused, bridged or spiro ring system such as a bicyclic system ("bicyclic carbocyclyl") or tricyclic system ("tricyclic carbocyclyl")) and can be saturated or can contain one or more carbon-carbon double or triple bonds. "Carbocyclyl" also includes ring systems wherein the carbocyclyl ring, as defined above, is fused with one or more aryl or heteroaryl groups wherein the point of attachment is on the carbocyclyl ring, and in such instances, the number of carbons continue to designate the number of carbons in the carbocyclic ring system. Unless otherwise specified, each instance of a carbocyclyl group is independently unsubstituted (an "unsubstituted carbocyclyl") or substituted (a "substituted carbocyclyl") with one or more substituents. In certain embodiments, the carbocyclyl group is an unsubstituted $C_{3-14}$ carbocyclyl. In certain embodiments, the carbocyclyl group is a substituted $C_{3-14}$ carbocyclyl.

In some embodiments, "carbocyclyl" is a monocyclic, saturated carbocyclyl group having from 3 to 14 ring carbon atoms ("$C_{3-14}$ cycloalkyl"). In some embodiments, a cycloalkyl group has 3 to 10 ring carbon atoms ("$C_{3-10}$ cycloalkyl"). In some embodiments, a cycloalkyl group has 3 to 8 ring carbon atoms ("$C_{3-8}$ cycloalkyl"). In some embodiments, a cycloalkyl group has 3 to 6 ring carbon atoms ("$C_{3-6}$ cycloalkyl"). In some embodiments, a cycloalkyl group has 4 to 6 ring carbon atoms ("$C_{4-6}$ cycloalkyl"). In some embodiments, a cycloalkyl group has 5 to 6 ring carbon atoms ("$C_{5-6}$ cycloalkyl"). In some embodiments, a cycloalkyl group has 5 to 10 ring carbon atoms ("$C_{5-10}$ cycloalkyl"). Examples of $C_{5-6}$ cycloalkyl groups include cyclopentyl ($C_5$) and cyclohexyl ($C_5$). Examples of $C_{3-6}$ cycloalkyl groups include the aforementioned $C_{5-6}$ cycloalkyl groups as well as cyclopropyl ($C_3$) and cyclobutyl ($C_4$). Examples of $C_{3-8}$ cycloalkyl groups include the aforementioned $C_{3-6}$ cycloalkyl groups as well as cycloheptyl ($C_7$) and cyclooctyl ($C_8$). Unless otherwise specified, each instance of a cycloalkyl group is independently unsubstituted (an "unsubstituted cycloalkyl") or substituted (a "substituted cycloalkyl") with one or more substituents. In certain embodiments, the cycloalkyl group is an unsubstituted $C_{3-14}$ cycloalkyl. In certain embodiments, the cycloalkyl group is a substituted $C_{3-14}$ cycloalkyl.

The term "heterocyclyl" or "heterocyclic" refers to a radical of a 3- to 14-membered non-aromatic ring system having ring carbon atoms and 1 to 4 ring heteroatoms, wherein each heteroatom is independently selected from nitrogen, oxygen, and sulfur ("3-14 membered heterocyclyl"). In heterocyclyl groups that contain one or more nitrogen atoms, the point of attachment can be a carbon or nitrogen atom, as valency permits. A heterocyclyl group can either be monocyclic ("monocyclic heterocyclyl") or polycyclic (e.g., a fused, bridged or spiro ring system such as a bicyclic system ("bicyclic heterocyclyl") or tricyclic system ("tricyclic heterocyclyl")), and can be saturated or can contain one or more carbon-carbon double or triple bonds. Heterocyclyl polycyclic ring systems can include one or more heteroatoms in one or both rings. "Heterocyclyl" also includes ring systems wherein the heterocyclyl ring, as defined above, is fused with one or more carbocyclyl groups wherein the point of attachment is either on the carbocyclyl or heterocyclyl ring, or ring systems wherein the heterocyclyl ring, as defined above, is fused with one or more aryl or heteroaryl groups, wherein the point of attachment is on the heterocyclyl ring, and in such instances, the number of ring members continue to designate the number of ring members in the heterocyclyl ring system. Unless otherwise specified, each instance of heterocyclyl is independently unsubstituted (an "unsubstituted heterocyclyl") or substituted (a "substituted heterocyclyl") with one or more substituents. In certain embodiments, the heterocyclyl group is an unsubstituted 3-14 membered heterocyclyl. In certain embodiments, the heterocyclyl group is a substituted 3-14 membered heterocyclyl.

In some embodiments, a heterocyclyl group is a 5-10 membered non-aromatic ring system having ring carbon atoms and 1-4 ring heteroatoms, wherein each heteroatom is independently selected from nitrogen, oxygen, and sulfur ("5-10 membered heterocyclyl"). In some embodiments, a heterocyclyl group is a 5-8 membered non-aromatic ring system having ring carbon atoms and 1-4 ring heteroatoms, wherein each heteroatom is independently selected from nitrogen, oxygen, and sulfur ("5-8 membered heterocyclyl"). In some embodiments, a heterocyclyl group is a 5-6 membered non-aromatic ring system having ring carbon atoms and 1-4 ring heteroatoms, wherein each heteroatom is independently selected from nitrogen, oxygen, and sulfur ("5-6 membered heterocyclyl"). In some embodiments, the 5-6 membered heterocyclyl has 1-3 ring heteroatoms selected from nitrogen, oxygen, and sulfur. In some embodiments, the 5-6 membered heterocyclyl has 1-2 ring heteroatoms selected from nitrogen, oxygen, and sulfur. In some embodiments, the 5-6 membered heterocyclyl has 1 ring heteroatom selected from nitrogen, oxygen, and sulfur.

Exemplary 3-membered heterocyclyl groups containing 1 heteroatom include, without limitation, azirdinyl, oxiranyl, and thiiranyl. Exemplary 4-membered heterocyclyl groups containing 1 heteroatom include, without limitation, azetidinyl, oxetanyl, and thietanyl. Exemplary 5-membered heterocyclyl groups containing 1 heteroatom include, without limitation, tetrahydrofuranyl, dihydrofuranyl, tetrahydrothiophenyl, dihydrothiophenyl, pyrrolidinyl, dihydropyrrolyl, and pyrrolyl-2,5-dione. Exemplary 5-membered heterocyclyl groups containing 2 heteroatoms include, without limitation, dioxolanyl, oxathiolanyl and dithiolanyl. Exemplary 5-membered heterocyclyl groups containing 3 heteroatoms include, without limitation, triazolinyl, oxadiazolinyl, and thiadiazolinyl. Exemplary 6-membered heterocyclyl groups containing 1 heteroatom include, without limitation, piperidinyl, tetrahydropyranyl, dihydropyridinyl, and thianyl. Exemplary 6-membered heterocyclyl groups containing 2 heteroatoms include, without limitation, piperazinyl, morpholinyl, dithianyl, and dioxanyl. Exemplary 6-membered heterocyclyl groups containing 3 heteroatoms include, without limitation, triazinyl. Exemplary 7-membered heterocyclyl groups containing 1 heteroatom include, without limitation, azepanyl, oxepanyl and thiepanyl. Exemplary 8-membered heterocyclyl groups containing 1 heteroatom include, without limitation, azocanyl, oxecanyl and thiocanyl. Exemplary bicyclic heterocyclyl groups include, without limitation, indolinyl, isoindolinyl, dihydrobenzofuranyl, dihydrobenzothienyl, tetrahydrobenzothienyl, tetrahydrobenzofuranyl, tetrahydroindolyl, tetrahydroquinolinyl, tetrahydroisoquinolinyl, decahydroquinolinyl, decahydroisoquinolinyl, octahydrochromenyl, octahydroisochromenyl, decahydronaphthyridinyl, decahydro-1,8-naphthyridinyl, octahydropyrrolo[3,2-b]pyrrole, indolinyl, phthalimidyl, naphthalimidyl, chromanyl, chromenyl, 1H-benzo[e][1,4]diazepinyl, 1,4,5,7-tetrahydropyrano[3,4-b]pyrrolyl, 5,6-dihydro-4H-furo[3,2-b]pyrrolyl, 6,7-dihydro-5H-furo[3,2-b]pyranyl, 5,7-dihydro-4H-thieno[2,3-c]pyranyl, 2,3-dihydro-1H-pyrrolo[2,3-b]pyridinyl, 2,3-dihydrofuro[2,3-b]pyridinyl, 4,5,6,7-tetrahydro-1H-pyrrolo[2,3-b]pyridinyl, 4,5,6,7-tetrahydrofuro[3,2-c]pyridinyl, 4,5,6,7-tetrahydrothieno[3,2-b]pyridinyl, 1,2,3,4-tetrahydro-1,6-naphthyridinyl, and the like.

The term "aryl" refers to a radical of a monocyclic or polycyclic (e.g., bicyclic or tricyclic) 4n+2 aromatic ring system (e.g., having 6, 10, or 14 π electrons shared in a cyclic array) having 6-14 ring carbon atoms and zero heteroatoms provided in the aromatic ring system ("$C_{6-14}$ aryl"). In some embodiments, an aryl group has 6 ring carbon atoms ("$C_6$ aryl"; e.g., phenyl). In some embodiments, an aryl group has 10 ring carbon atoms ("$C_{10}$ aryl"; e.g., naphthyl such as 1-naphthyl and 2-naphthyl). In some embodiments, an aryl group has 14 ring carbon atoms ("$C_{14}$ aryl"; e.g., anthracyl). "Aryl" also includes ring systems wherein the aryl ring, as defined above, is fused with one or more carbocyclyl or heterocyclyl groups wherein the radical or point of attachment is on the aryl ring, and in such instances, the number of carbon atoms continue to designate the number of carbon atoms in the aryl ring system. Unless otherwise specified, each instance of an aryl group is independently unsubstituted (an "unsubstituted aryl") or substituted (a "substituted aryl") with one or more substituents. In certain embodiments, the aryl group is an unsubstituted $C_{6-14}$ aryl. In certain embodiments, the aryl group is a substituted $C_{6-14}$ aryl.

The term "heteroaryl" refers to a radical of a 5-14 membered monocyclic or polycyclic (e.g., bicyclic, tricyclic) 4n+2 aromatic ring system (e.g., having 6, 10, or 14 π electrons shared in a cyclic array) having ring carbon atoms and 1-4 ring heteroatoms provided in the aromatic ring system, wherein each heteroatom is independently selected from nitrogen, oxygen, and sulfur ("5-14 membered heteroaryl"). In heteroaryl groups that contain one or more nitrogen atoms, the point of attachment can be a carbon or nitrogen atom, as valency permits. Heteroaryl polycyclic ring systems can include one or more heteroatoms in one or both rings. "Heteroaryl" includes ring systems wherein the heteroaryl ring, as defined above, is fused with one or more carbocyclyl or heterocyclyl groups wherein the point of attachment is on the heteroaryl ring, and in such instances, the number of ring members continue to designate the number of ring members in the heteroaryl ring system. "Heteroaryl" also includes ring systems wherein the heteroaryl ring, as defined above, is fused with one or more aryl groups wherein the point of attachment is either on the aryl or heteroaryl ring, and in such instances, the number of ring members designates the number of ring members in the fused polycyclic (aryl/heteroaryl) ring system. Polycyclic heteroaryl groups wherein one ring does not contain a heteroatom (e.g., indolyl, quinolinyl, carbazolyl, and the like) the point of attachment can be on either ring, i.e., either the ring bearing a heteroatom (e.g., 2-indolyl) or the ring that does not contain a heteroatom (e.g., 5-indolyl).

In some embodiments, a heteroaryl group is a 5-10 membered aromatic ring system having ring carbon atoms and 1-4 ring heteroatoms provided in the aromatic ring system, wherein each heteroatom is independently selected from nitrogen, oxygen, and sulfur ("5-10 membered heteroaryl"). In some embodiments, a heteroaryl group is a 5-8 membered aromatic ring system having ring carbon atoms and 1-4 ring heteroatoms provided in the aromatic ring system, wherein each heteroatom is independently selected from nitrogen, oxygen, and sulfur ("5-8 membered heteroaryl"). In some embodiments, a heteroaryl group is a 5-6 membered aromatic ring system having ring carbon atoms and 1-4 ring heteroatoms provided in the aromatic ring system, wherein each heteroatom is independently selected from nitrogen, oxygen, and sulfur ("5-6 membered heteroaryl"). In some embodiments, the 5-6 membered heteroaryl has 1-3 ring heteroatoms selected from nitrogen, oxygen, and sulfur. In some embodiments, the 5-6 membered heteroaryl has 1-2 ring heteroatoms selected from nitrogen, oxygen, and sulfur. In some embodiments, the 5-6 membered heteroaryl has 1 ring heteroatom selected from nitrogen, oxygen, and sulfur. Unless otherwise specified, each instance of a heteroaryl group is independently unsubstituted (an "unsubstituted heteroaryl") or substituted (a "substituted heteroaryl") with one or more substituents. In certain embodiments, the heteroaryl group is an unsubstituted 5-14 membered heteroaryl. In certain embodiments, the heteroaryl group is a substituted 5-14 membered heteroaryl.

Exemplary 5-membered heteroaryl groups containing 1 heteroatom include, without limitation, pyrrolyl, furanyl, and thiophenyl. Exemplary 5-membered heteroaryl groups containing 2 heteroatoms include, without limitation, imidazolyl, pyrazolyl, oxazolyl, isoxazolyl, thiazolyl, and isothiazolyl. Exemplary 5-membered heteroaryl groups containing 3 heteroatoms include, without limitation, triazolyl, oxadiazolyl, and thiadiazolyl. Exemplary 5-membered heteroaryl groups containing 4 heteroatoms include, without limitation, tetrazolyl. Exemplary 6-membered heteroaryl groups containing 1 heteroatom include, without limitation, pyridinyl. Exemplary 6-membered heteroaryl groups containing 2 heteroatoms include, without limitation, pyridazinyl, pyrimidinyl, and pyrazinyl. Exemplary 6-membered heteroaryl groups containing 3 or 4 heteroatoms include, without limitation, triazinyl and tetrazinyl, respectively. Exemplary 7-membered heteroaryl groups containing 1 heteroatom include, without limitation, azepinyl, oxepinyl, and thiepinyl. Exemplary 5,6-bicyclic heteroaryl groups include, without limitation, indolyl, isoindolyl, indazolyl, benzotriazolyl, benzothiophenyl, isobenzothiophenyl, benzofuranyl, benzoisofuranyl, benzimidazolyl, benzoxazolyl, benzisoxazolyl, benzoxadiazolyl, benzthiazolyl, benzisothiazolyl, benzthiadiazolyl, indolizinyl, and purinyl. Exemplary 6,6-bicyclic heteroaryl groups include, without limitation, naphthyridinyl, pteridinyl, quinolinyl, isoquinolinyl, cinnolinyl, quinoxalinyl, phthalazinyl, and quinazolinyl. Exemplary tricyclic heteroaryl groups include, without limitation, phenanthridinyl, dibenzofuranyl, carbazolyl, acridinyl, phenothiazinyl, phenoxazinyl, and phenazinyl.

The term "unsaturated" or "partially unsaturated" refers to a moiety that includes at least one double or triple bond.

The term "saturated" refers to a moiety that does not contain a double or triple bond, i.e., the moiety only contains single bonds.

Affixing the suffix "-ene" to a group indicates the group is a divalent moiety, e.g., alkylene is the divalent moiety of alkyl, alkenylene is the divalent moiety of alkenyl, alkynylene is the divalent moiety of alkynyl, heteroalkylene is the divalent moiety of heteroalkyl, heteroalkenylene is the divalent moiety of heteroalkenyl, heteroalkynylene is the divalent moiety of heteroalkynyl, carbocyclylene is the divalent moiety of carbocyclyl, heterocyclylene is the divalent moiety of heterocyclyl, arylene is the divalent moiety of aryl, and heteroarylene is the divalent moiety of heteroaryl.

A group is optionally substituted unless expressly provided otherwise. The term "optionally substituted" refers to being substituted or unsubstituted. "Optionally substituted" refers to a group which may be substituted or unsubstituted (e.g., "substituted" or "unsubstituted" alkyl, "substituted" or "unsubstituted" alkenyl, "substituted" or "unsubstituted" alkynyl, "substituted" or "unsubstituted" heteroalkyl, "substituted" or "unsubstituted" heteroalkenyl, "substituted" or "unsubstituted" heteroalkynyl, "substituted" or "unsubstituted" carbocyclyl, "substituted" or "unsubstituted" heterocyclyl, "substituted" or "unsubstituted" aryl or "substituted" or "unsubstituted" heteroaryl group). In general, the term "substituted" means that at least one hydrogen present on a group is replaced with a permissible substituent, e.g., a substituent which upon substitution results in a stable compound, e.g., a compound which does not spontaneously undergo transformation such as by rearrangement, cyclization, elimination, or other reaction. Unless otherwise indicated, a "substituted" group has a substituent at one or more substitutable positions of the group, and when more than one position in any given structure is substituted, the substituent is either the same or different at each position. The term "substituted" is contemplated to include substitution with all permissible substituents of organic compounds, and includes any of the substituents described herein that results in the formation of a stable compound. The present invention contemplates any and all such combinations in order to arrive at a stable compound. For purposes of this invention, heteroatoms such as nitrogen may have hydrogen substituents and/or any suitable substituent as described herein which satisfy the valencies of the heteroatoms and results in the formation of a stable moiety. The invention is not intended to be limited in any manner by the exemplary substituents described herein.

Exemplary carbon atom substituents include, but are not limited to, halogen, —CN, —NO$_2$, —N$_3$, —SO$_2$H, —SO$_3$H, —OH, —OR$^{aa}$, —ON(R$^{bb}$)$_2$, —N(R$^{bb}$)$_2$, —N(R$^{bb}$)$_3^+$X$^-$, —N(OR$^{cc}$)R$^{bb}$, —SH, —SR$^{aa}$, —SSR$^{cc}$, —C(=O)R$^{aa}$, —CO$_2$H, —CHO, —C(OR$^{cc}$)$_3$, —CO$_2$R$^{aa}$, —OC(=O)R$^{aa}$, —OCO$_2$R$^{aa}$, —C(=O)N(R$^{bb}$)$_2$, —OC(=O)N(R$^{bb}$)$_2$, —NR$^{bb}$C(=O)R$^{aa}$, —NR$^{bb}$CO$_2$R$^{aa}$, —NR$^{bb}$C(=O)N(R$^{bb}$)$_2$, —C(=NR$^{bb}$)R$^{aa}$, —C(=NR$^{bb}$)OR$^{aa}$, —OC(=NR$^{bb}$)R$^{aa}$, —OC(=NR$^{bb}$)OR$^{aa}$, —C(=NR$^{bb}$)N(R$^{bb}$)$_2$, —OC(=NR$^{bb}$)N(R$^{bb}$)$_2$, —NR$^{bb}$C(=NR$^{bb}$)N(R$^{bb}$)$_2$, —C(=O)NR$^{bb}$SO$_2$R$^{aa}$, —NR$^{bb}$SO$_2$R$^{aa}$, —SO$_2$N(R$^{bb}$)$_2$, —SO$_2$R$^{aa}$, —SO$_2$OR$^{aa}$, —OSO$_2$R$^{aa}$, —S(=O)R$^{aa}$, —OS(=O)R$^{aa}$, —Si(R$^{aa}$)$_3$, —OSi(R$^{aa}$)$_3$—C(=S)N(R$^{bb}$)$_2$, —C(=O)SR$^{aa}$, —C(=S)SR$^{aa}$, —SC(=S)SR$^{aa}$, —SC(=O)SR$^{aa}$, —OC(=O)SR$^{aa}$, —SC(=O)OR$^{aa}$, —SC(=O)R$^{aa}$, —P(=O)(R$^{aa}$)$_2$, —P(=O)(OR$^{cc}$)$_2$—OP(=O)(R$^{aa}$)$_2$, —OP(=O)(OR$^{cc}$)$_2$, —P(=O)(N(R$^{bb}$)$_2$)$_2$, —OP(=O)(N(R$^{bb}$)$_2$)$_2$, —NR$^{bb}$P(=O)(R$^{aa}$)$_2$, —NR$^{bb}$P(=O)(OR$^{cc}$)$_2$, —NR$^{bb}$P(=O)(N(R$^{bb}$)$_2$)$_2$, —P(R$^{cc}$)$_2$, —P(OR$^{cc}$)$_2$, —P(R$^{cc}$)$_3^+$X$^-$, —P(OR$^{cc}$)$_3^+$X$^-$, —P(R$^{cc}$)$_4$, —P(OR$^{cc}$)$_4$, —OP(R$^{cc}$)$_2$, —OP(R$^{cc}$)$_3^+$X$^-$, —OP(OR$^{cc}$)$_2$, —OP(OR$^{cc}$)$_3^+$X$^-$, —OP(R$^{cc}$)$_4$, —OP(OR$^{cc}$)$_4$, —B(R$^{aa}$)$_2$, —B(OR$^{cc}$)$_2$, —BR$^{aa}$(OR$^{cc}$), C$_{1-10}$ alkyl, C$_{1-10}$ perhaloalkyl, C$_{2-10}$ alkenyl, C$_{2-10}$ alkynyl, heteroC$_{1-10}$ alkyl, heteroC$_{2-10}$ alkenyl, heteroC$_{2-10}$ alkynyl, C$_{3-10}$ carbocyclyl, 3-14 membered heterocyclyl, C$_{6-14}$ aryl, and 5-14 membered heteroaryl, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 R$^{dd}$ groups; wherein X$^-$ is a counterion;

or two geminal hydrogens on a carbon atom are replaced with the group =O, =S, =NN(R$^{bb}$)$_2$, =NNR$^{bb}$C(=O)R$^{aa}$, =NNR$^{bb}$C(=O)OR$^{aa}$, =NNR$^{bb}$S(=O)$_2$R$^{aa}$, =NR$^{bb}$, or =NOR$^{cc}$;

each instance of R$^{aa}$ is, independently, selected from C$_{1-10}$ alkyl, C$_{1-10}$ perhaloalkyl, C$_{2-10}$ alkenyl, C$_{2-10}$ alkynyl, heteroC$_{1-10}$ alkyl, heteroC$_{2-10}$ alkenyl, heteroC$_{2-10}$ alkynyl, C$_{3-10}$ carbocyclyl, 3-14 membered heterocyclyl, C$_{6-14}$ aryl, and 5-14 membered heteroaryl, or two R$^{aa}$ groups are joined to form a 3-14 membered heterocyclyl or 5-14 membered heteroaryl ring, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 R$^{dd}$ groups;

each instance of R$^{bb}$ is, independently, selected from hydrogen, —OH, —OR$^{aa}$, —N(R$^{cc}$)$_2$, —CN, —C(=O)R$^{aa}$, —C(=O)N(R$^{cc}$)$_2$, —CO$_2$R$^{aa}$, —SO$_2$R$^{aa}$, —C(=NR$^{cc}$)OR$^{aa}$, —C(=NR$^{cc}$)N(R$^{cc}$)$_2$, —SO$_2$N(R$^{cc}$)$_2$, —SO$_2$R$^{cc}$, —SO$_2$OR$^{cc}$, —SOR$^{aa}$, —C(=S)N(R$^{cc}$)$_2$, —C(=O)SR$^{cc}$, —C(=S)SR$^{cc}$, —P(=O)(R$^{aa}$)$_2$, —P(=O)(OR$^{cc}$)$_2$, —P(=O)(N(R$^{cc}$)$_2$)$_2$, C$_{1-10}$ alkyl, C$_{1-10}$ perhaloalkyl, C$_{2-10}$ alkenyl, C$_{2-10}$ alkynyl, heteroC$_{1-10}$ alkyl, heteroC$_{2-10}$ alkenyl, heteroC$_{2-10}$ alkynyl, C$_{3-10}$ carbocyclyl, 3-14 membered heterocyclyl, C$_{6-14}$ aryl, and 5-14 membered heteroaryl, or two R$^{bb}$ groups are joined to form a 3-14 membered heterocyclyl or 5-14 membered heteroaryl ring, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 R$^{dd}$ groups; wherein X$^-$ is a counterion;

each instance of R$^{cc}$ is, independently, selected from hydrogen, C$_{1-10}$ alkyl, C$_{1-10}$ perhaloalkyl, C$_{2-10}$ alkenyl, C$_{2-10}$ alkynyl, heteroC$_{1-10}$ alkyl, heteroC$_{2-10}$ alkenyl, heteroC$_{2-10}$ alkynyl, C$_{3-10}$ carbocyclyl, 3-14 membered heterocyclyl, C$_{6-14}$ aryl, and 5-14 membered heteroaryl, or two R$^{cc}$ groups are joined to form a 3-14 membered heterocyclyl or 5-14 membered heteroaryl ring, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 R$^{dd}$ groups;

each instance of R$^{dd}$ is, independently, selected from halogen, —CN, —NO$_2$, —N$_3$, —SO$_2$H, —SO$_3$H, —OH, —OR$^{ee}$, —ON(R$^{ff}$)$_2$, —N(R$^{ff}$)$_2$, —N(R$^{ff}$)$_3^+$X$^-$, —N(OR$^{ee}$)R$^{ff}$, —SH, —SR$^{ee}$, —SSR$^{ee}$, —C(=O)R$^{ee}$, —CO$_2$H, —CO$_2$R$^{ee}$, —OC(=O)R$^{ee}$, —OCO$_2$R$^{ee}$, —C(=O)N(R$^{ff}$)$_2$, —OC(=O)N(R$^{ff}$)$_2$, —NR$^{ff}$C(=O)R$^{ee}$, —NR$^{ff}$CO$_2$R$^{ee}$, —NR$^{ff}$C(=O)N(R$^{ff}$)$_2$, —C(=NR$^{ff}$)OR$^{ee}$, —OC(=NR$^{ff}$)R$^{ee}$, —OC(=NR$^{ff}$)OR$^{ee}$, —C(=NR$^{ff}$)N(R$^{ff}$)$_2$, —OC(=NR$^{ff}$)N(R$^{ff}$)$_2$, —NR$^{ff}$C(=NR$^{ff}$)N(R$^{ff}$)$_2$, —NR$^{ff}$SO$_2$R$^{ee}$, —SO$_2$N(R$^{ff}$)$_2$, —SO$_2$R$^{ee}$, —SO$_2$OR$^{ee}$, —OSO$_2$R$^{ee}$, —S(=O)R$^{ee}$, —Si(R$^{ee}$)$_3$, —OSi(R$^{ee}$)$_3$, —C(=S)N(R$^{ff}$)$_2$, —C(=O)SR$^{ee}$, —C(=S)SR$^{ee}$, —SC(=S)SR$^{ee}$, —P(=O)(OR$^{ee}$)$_2$, —P(=O)(R$^{ee}$)$_2$, —OP(=O)(R$^{ee}$)$_2$, —OP(=O)(OR$^{ee}$)$_2$, C$_{1-6}$ alkyl, C$_{1-6}$ perhaloalkyl, C$_{2-6}$ alkenyl, C$_{2-6}$ alkynyl, heteroC$_{1-6}$ alkyl, heteroC$_{2-6}$ alkenyl, heteroC$_{2-6}$ alkynyl, C$_{3-10}$ carbocyclyl, 3-10 membered heterocyclyl, C$_{6-10}$ aryl, 5-10 membered heteroaryl, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 R$^{gg}$ groups, or two geminal R$^{dd}$ substituents can be joined to form =O or =S; wherein X$^-$ is a counterion;

each instance of R$^{ee}$ is, independently, selected from C$_{1-6}$ alkyl, C$_{1-6}$ perhaloalkyl, C$_{2-6}$ alkenyl, C$_{2-6}$ alkynyl, heteroC$_{1-6}$ alkyl, heteroC$_{2-6}$ alkenyl, heteroC$_{2-6}$ alkynyl, C$_{3-10}$ carbocyclyl, C$_{6-10}$ aryl, 3-10 membered heterocyclyl, and 3-10 membered heteroaryl, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 R$^{gg}$ groups;

each instance of R$^{ff}$ is, independently, selected from hydrogen, C$_{1-6}$ alkyl, C$_{1-6}$ perhaloalkyl, C$_{2-6}$ alkenyl, C$_{2-6}$ alkynyl, heteroC$_{1-6}$ alkyl, heteroC$_{2-6}$ alkenyl, heteroC$_{2-6}$ alkynyl, C$_{3-10}$ carbocyclyl, 3-10 membered heterocyclyl, C$_{6-10}$ aryl and 5-10 membered heteroaryl, or two R$^{ff}$ groups are joined to form a 3-10 membered heterocyclyl or 5-10 membered heteroaryl ring, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 R$^{gg}$ groups; and each instance of R$^{gg}$ is, independently, halogen, —CN, —NO$_2$, —N$_3$, —SO$_2$H, —SO$_3$H, —OH, —OC$_{1-6}$ alkyl, —ON(C$_{1-6}$ alkyl)$_2$, —N(C$_{1-6}$ alkyl)$_2$, —N(C$_{1-6}$ alkyl)$_3$$^+$X$^-$, —NH(C$_{1-6}$ alkyl)$_2$$^+$X$^-$, —NH$_2$(C$_{1-6}$ alkyl)$^+$X$^-$, —NH$_3$$^+$X$^-$, —N(OC$_{1-6}$ alkyl)(C$_{1-6}$ alkyl), —N(OH)(C$_{1-6}$ alkyl), —NH(OH), —SH, —SC$_{1-6}$ alkyl, —SS(C$_{1-6}$ alkyl), —C(=O)(C$_{1-6}$ alkyl), —CO$_2$H, —CO$_2$(C$_{1-6}$ alkyl), —OC(=O)(C$_{1-6}$ alkyl), —OCO$_2$(C$_{1-6}$ alkyl), —C(=O)NH$_2$, —C(=O)N(C$_{1-6}$ alkyl)$_2$, —OC(=O)NH(C$_{1-6}$ alkyl), —NHC(=O)(C$_{1-6}$ alkyl), —N(C$_{1-6}$ alkyl)C(=O)(C$_{1-6}$ alkyl), —NHCO$_2$(C$_{1-6}$ alkyl), —NHC(=O)N(C$_{1-6}$ alkyl)$_2$, —NHC(=O)NH(C$_{1-6}$ alkyl), —NHC(=O)NH$_2$, —C(=NH)O(C$_{1-6}$ alkyl), —OC(=NH)(C$_{1-6}$ alkyl), —OC(=NH)OC$_{1-6}$ alkyl, —C(=NH)N(C$_{1-6}$ alkyl)$_2$, —C(=NH)NH(C$_{1-6}$ alkyl), —C(=NH)NH$_2$, —OC(=NH)N(C$_{1-6}$ alkyl)$_2$, —OC(=NH)NH(C$_{1-6}$ alkyl), —OC(=NH)NH$_2$, —NHC(=NH)N(C$_{1-6}$ alkyl)$_2$, —NHC(=NH)NH$_2$, —NHSO$_2$(C$_{1-6}$ alkyl), —SO$_2$N(C$_{1-6}$ alkyl)$_2$, —SO$_2$NH(C$_{1-6}$ alkyl), —SO$_2$NH$_2$, —SO$_2$(C$_{1-6}$ alkyl), —SO$_2$O(C$_{1-6}$ alkyl), —OSO$_2$(C$_{1-6}$ alkyl), —SO(C$_{1-6}$ alkyl), —Si(C$_{1-6}$ alkyl)$_3$, —OSi(C$_{1-6}$ alkyl)$_3$ —C(=S)N(C$_{1-6}$ alkyl)$_2$, C(=S)NH(C$_{1-6}$ alkyl), C(=S)NH$_2$, —C(=O)S(C$_{1-6}$ alkyl), —C(=S)SC$_{1-6}$ alkyl, —SC(=S)SC$_{1-6}$ alkyl, —P(=O)(OC$_{1-6}$ alkyl)$_2$, —P(=O)(C$_{1-6}$ alkyl)$_2$, —OP(=O)(C$_{1-6}$ alkyl)$_2$, —OP(=O)(OC$_{1-6}$ alkyl)$_2$, C$_{1-6}$ alkyl, C$_{1-6}$ perhaloalkyl, C$_{2-6}$ alkenyl, C$_{2-6}$ alkynyl, heteroC$_{1-6}$ alkyl, heteroC$_{2-6}$ alkenyl, heteroC$_{2-6}$ alkynyl, C$_{3-10}$ carbocyclyl, C$_{6-10}$ aryl, 3-10 membered heterocyclyl, 5-10 membered heteroaryl; or two geminal R$^{gg}$ substituents can be joined to form =O or =S; wherein X$^-$ is a counterion.

The term "halo" or "halogen" refers to fluorine (fluoro, —F), chlorine (chloro, —Cl), bromine (bromo, —Br), or iodine (iodo, —I).

A "counterion" or "anionic counterion" is a negatively charged group associated with a positively charged group in order to maintain electronic neutrality. An anionic counterion may be monovalent (i.e., including one formal negative charge). An anionic counterion may also be multivalent (i.e., including more than one formal negative charge), such as divalent or trivalent. Exemplary counterions include halide ions (e.g., F$^-$, Cl$^-$, Br$^-$, I$^-$), NO$_3$$^-$, ClO$_4$$^-$, OH$^-$, H$_2$PO$_4$$^-$, HCO$_3$$^-$, HSO$_4$$^-$, sulfonate ions (e.g., methansulfonate, trifluoromethanesulfonate, p-toluenesulfonate, benzenesulfonate, 10-camphor sulfonate, naphthalene-2-sulfonate, naphthalene-1-sulfonic acid-5-sulfonate, ethan-1-sulfonic acid-2-sulfonate, and the like), carboxylate ions (e.g., acetate, propanoate, benzoate, glycerate, lactate, tartrate, glycolate, gluconate, and the like), BF$_4$$^-$, PF$_4$$^-$, PF$_6$$^-$, AsF$_6$$^-$, SbF$_6$$^-$, B[3,5-(CF$_3$)$_2$C$_6$H$_3$]$_4$]$^-$, B(C$_6$F$_5$)$_4$$^-$, BPh$_4$$^-$, Al(OC(CF$_3$)$_3$)$_4$$^-$, and carborane anions (e.g., CB$_{11}$H$_{12}$$^-$ or (HCB$_{11}$Me$_5$Br$_6$)$^-$). Exemplary counterions which may be multivalent include CO$_3$$^{2-}$, HPO$_4$$^{2-}$, PO$_4$$^{3-}$, B$_4$O$_7$$^{2-}$, SO$_4$$^{2-}$, S$_2$O$_3$$^{2-}$, carboxylate anions (e.g., tartrate, citrate, fumarate, maleate, malate, malonate, gluconate, succinate, glutarate, adipate, pimelate, suberate, azelate, sebacate, salicylate, phthalates, aspartate, glutamate, and the like), and carboranes.

These and other exemplary substituents are described in more detail in the Detailed Description, Examples, and Claims. The invention is not intended to be limited in any manner by the above exemplary listing of substituents.

Other Definitions

The following definitions are more general terms used throughout the present application.

The term "solvate" refers to forms of the compound, or a salt thereof, that are associated with a solvent, usually by a solvolysis reaction. This physical association may include hydrogen bonding. Conventional solvents include water, methanol, ethanol, acetic acid, DMSO, THF, diethyl ether, and the like. The compounds described herein may be prepared, e.g., in crystalline form, and may be solvated. Suitable solvates include pharmaceutically acceptable solvates and further include both stoichiometric solvates and non-stoichiometric solvates. In certain instances, the solvate will be capable of isolation, for example, when one or more solvent molecules are incorporated in the crystal lattice of a crystalline solid. "Solvate" encompasses both solution-phase and isolatable solvates. Representative solvates include hydrates, ethanolates, and methanolates.

The term "hydrate" refers to a compound that is associated with water molecules. Typically, the number of the water molecules contained in a hydrate of a compound is in a definite ratio to the number of the compound molecules in the hydrate. Therefore, a hydrate of a compound may be represented, for example, by the general formula R·x H$_2$O, wherein R is the compound, and x is a number greater than 0. A given compound may form more than one type of hydrate, including, e.g., monohydrates (x is 1), lower hydrates (x is a number greater than 0 and smaller than 1, e.g., hemihydrates (R·0.5 H$_2$O)), and polyhydrates (x is a number greater than 1, e.g., dihydrates (R·2 H$_2$O) and hexahydrates (R·6 H$_2$O)).

The term "tautomers" or "tautomeric" refers to two or more interconvertible compounds resulting from at least one formal migration of a hydrogen atom and at least one change in valency (e.g., a single bond to a double bond, a triple bond to a single bond, or vice versa). The exact ratio of the tautomers depends on several factors, including temperature, solvent, and pH. Tautomerizations (i.e., the reaction providing a tautomeric pair) may catalyzed by acid or base. Exemplary tautomerizations include keto-to-enol, amide-toimide, lactam-to-lactim, enamine-to-imine, and enamine-to-(a different enamine) tautomerizations.

It is also to be understood that compounds that have the same molecular formula but differ in the nature or sequence of bonding of their atoms or the arrangement of their atoms in space are termed "isomers". Isomers that differ in the arrangement of their atoms in space are termed "stereoisomers".

Stereoisomers that are not mirror images of one another are termed "diastereomers" and those that are non-superimposable mirror images of each other are termed "enantiomers". When a compound has an asymmetric center, for example, it is bonded to four different groups, a pair of enantiomers is possible. An enantiomer can be characterized by the absolute configuration of its asymmetric center and is described by the R- and S-sequencing rules of Cahn and Prelog, or by the manner in which the molecule rotates the plane of polarized light and designated as dextrorotatory or levorotatory (i.e., as (+) or (−)-isomers respectively). A chiral compound can exist as either individual enantiomer or as a mixture thereof. A mixture containing equal proportions of the enantiomers is called a "racemic mixture".

The term "polymorph" refers to a crystalline form of a compound (or a salt, hydrate, or solvate thereof). Many compounds can adopt a variety of different crystal forms (i.e., different polymorphs). Typically, such different crystalline forms have different X-ray diffraction patterns, infra-red spectra, and/or can vary in some or all properties such as melting points, density, hardness, crystal shape, optical and electrical properties, stability, solubility, and bioavailability. Recrystallization solvent, rate of crystallization, storage temperature, and other factors may cause one crystal form to dominate a given preparation. Various polymorphs of a compound can be prepared by crystallization under different conditions.

The term "co-crystal" refers to a crystalline structure composed of at least two components. In certain embodiments, a co-crystal contains a compound of the present disclosure and one or more other component(s), including, but not limited to, atoms, ions, molecules, or solvent molecules. In certain embodiments, a co-crystal contains a compound of the present disclosure and one or more solvent molecules. In certain embodiments, a co-crystal contains a compound of the present disclosure and one or more acid or base. In certain embodiments, a co-crystal contains a compound of the present disclosure and one or more components related to said compound, including, but not limited to, an isomer, tautomer, salt, solvate, hydrate, synthetic precursor, synthetic derivative, fragment, or impurity of said compound.

The term "prodrugs" refers to compounds that have cleavable groups that are removed, by solvolysis or under physiological conditions, to provide the compounds described herein, which are pharmaceutically active in vivo. Such examples include, but are not limited to, choline ester derivatives and the like, N-alkylmorpholine esters and the like. Other derivatives of the compounds described herein have activity in both their acid and acid derivative forms, but in the acid sensitive form often offer advantages of solubility, tissue compatibility, or delayed release in the mammalian organism (see, Bundgard, H., *Design of Prodrugs*, pp. 7-9, 21-24, Elsevier, Amsterdam 1985). Prodrugs include acid derivatives well known to practitioners of the art, such as, for example, esters prepared by reaction of the parent acid with a suitable alcohol, or amides prepared by reaction of the parent acid compound with a substituted or unsubstituted amine, or acid anhydrides, or mixed anhydrides. Simple aliphatic or aromatic esters, amides, and anhydrides derived from acidic groups pendant on the compounds described herein are particular prodrugs. In some cases it is desirable to prepare double ester type prodrugs such as (acyloxy)alkyl esters or ((alkoxycarbonyl)oxy)alkylesters. $C_{1-8}$ alkyl, $C_{2-8}$ alkenyl, $C_{2-8}$ alkynyl, aryl, $C_{7-12}$ substituted aryl, and $C_{7-12}$ arylalkyl esters of the compounds described herein may be preferred.

The terms "composition" and "formulation" are used interchangeably.

A "subject" to which administration is contemplated refers to a human (i.e., male or female of any age group, e.g., pediatric subject (e.g., infant, child, or adolescent) or adult subject (e.g., young adult, middle-aged adult, or senior adult)) or non-human animal. In certain embodiments, the non-human animal is a mammal (e.g., primate (e.g., cynomolgus monkey or rhesus monkey), commercially relevant mammal (e.g., cattle, pig, horse, sheep, goat, cat, or dog), or bird (e.g., commercially relevant bird, such as chicken, duck, goose, or turkey)). In certain embodiments, the non-human animal is a fish, reptile, or amphibian. The non-human animal may be a male or female at any stage of development. The non-human animal may be a transgenic animal or genetically engineered animal. The term "patient" refers to a human subject in need of treatment of a disease. The subject may also be a plant. In certain embodiments, the plant is a land plant. In certain embodiments, the plant is a non-vascular land plant. In certain embodiments, the plant is a vascular land plant. In certain embodiments, the plant is a seed plant. In certain embodiments, the plant is a cultivated plant. In certain embodiments, the plant is a dicot. In certain embodiments, the plant is a monocot. In certain embodiments, the plant is a flowering plant. In some embodiments, the plant is a cereal plant, e.g., maize, corn, wheat, rice, oat, barley, rye, or millet. In some embodiments, the plant is a legume, e.g., a bean plant, e.g., soybean plant. In some embodiments, the plant is a tree or shrub.

The term "biological sample" refers to any sample including tissue samples (such as tissue sections and needle biopsies of a tissue); cell samples (e.g., cytological smears (such as Pap or blood smears) or samples of cells obtained by microdissection); samples of whole organisms (such as samples of yeasts or bacteria); or cell fractions, fragments or organelles (such as obtained by lysing cells and separating the components thereof by centrifugation or otherwise). Other examples of biological samples include blood, serum, urine, semen, fecal matter, cerebrospinal fluid, interstitial fluid, mucous, tears, sweat, pus, biopsied tissue (e.g., obtained by a surgical biopsy or needle biopsy), nipple aspirates, milk, vaginal fluid, saliva, swabs (such as buccal swabs), or any material containing biomolecules that is derived from a first biological sample.

The term "administer," "administering," or "administration" refers to implanting, absorbing, ingesting, injecting, inhaling, or otherwise introducing a compound described herein, or a composition thereof, in or on a subject.

The terms "treatment," "treat," and "treating" refer to reversing, alleviating, delaying the onset of, or inhibiting the progress of a disease described herein. In some embodiments, treatment may be administered after one or more signs or symptoms of the disease have developed or have been observed. In other embodiments, treatment may be administered in the absence of signs or symptoms of the disease. For example, treatment may be administered to a susceptible subject prior to the onset of symptoms (e.g., in light of a history of symptoms). Treatment may also be continued after symptoms have resolved, for example, to delay or prevent recurrence.

The terms "condition," "disease," and "disorder" are used interchangeably.

An "effective amount" of a compound described herein refers to an amount sufficient to elicit the desired biological response. An effective amount of a compound described herein may vary depending on such factors as the desired biological endpoint, the pharmacokinetics of the compound, the condition being treated, the mode of administration, and the age and health of the subject. In certain embodiments, an effective amount is a therapeutically effective amount. In certain embodiments, an effective amount is the amount of a compound described herein in a single dose. In certain embodiments, an effective amount is the combined amounts of a compound described herein in multiple doses.

A "therapeutically effective amount" of a compound described herein is an amount sufficient to provide a therapeutic benefit. In certain embodiments, a therapeutically effective amount is an amount sufficient for inducing sensory nerve blockade. In certain embodiments, a therapeutically effective amount is an amount sufficient for inducing selective sensory nerve blockade.

The term "therapeutic agent" refers to any substance having therapeutic properties that produce a desired, usually beneficial, effect. For example, therapeutic agents may treat, ameliorate, and/or prevent disease. Therapeutic agents, as disclosed herein, may be biologics or small molecule therapeutics, or combinations thereof.

The term "local anesthetic" refers to any agent that produces nerve blockade within a specific area, region or site.

The term "sensory nerve blockade" may also be referred to as "nociceptive blockade," both of which refer to deficits in apparent perception of a painful stimulus, herein detected by modified hotplate testing, and presumably due to impairment of signal conduction in nerves.

The term "motor function blockade" refers to deficits in motor function, here detected by a weight-bearing test, and presumably due to impairment of signal conduction in nerves.

DETAILED DESCRIPTION OF CERTAIN EMBODIMENTS

Figure 1:
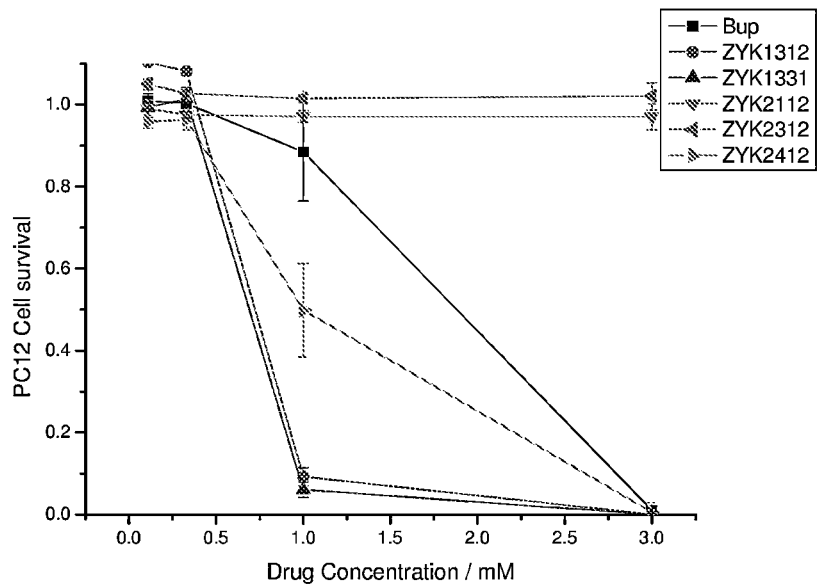
FIG. 1 is a plot showing the cytotoxicity of exemplary compounds in comparison to ropivacaine and bupivacaine in PC12 cells.

Provided herein are compounds that are local anesthetics. The compounds described herein possess advantageous properties, such as selective blockade of sensory nerves over motor function, that allow the compounds to be useful as local anesthetics in a variety of settings (e.g., childbirth, dental procedures, treatment of nociceptor-driven chronic pain). In one aspect, the provided anesthetics are compounds of Formula (I), (II), and (III), and pharmaceutically acceptable solvates, hydrates, polymorphs, co-crystals, tautomers, stereoisomers, isotopically labeled derivatives, prodrugs, and pharmaceutical compositions thereof. In another aspect, compounds of Formula (I), (II), and (III), and pharmaceutically acceptable solvates, hydrates, polymorphs, co-crystals, tautomers, stereoisomers, isotopically labeled derivatives, prodrugs, and pharmaceutical compositions thereof, are particularly useful in methods of inducing selective sensory nerve blockade. Accordingly, the compounds are useful as local anesthesia in a subject in need thereof, and have surprisingly superior anesthetic properties (e.g., duration of sensory nerve blockade, selectivity of sensory nerve blockade over motor function, low cytotoxicity) over existing anesthetics. The compounds may be provided for use in any composition, kit, or method described herein as a pharmaceutically acceptable co-crystal, tautomer, stereoisomer, solvate, hydrate, polymorph, isotopically enriched derivative, or prodrug thereof.

Compounds of Formula (I)

In one aspect, disclosed is a compound of Formula (I):

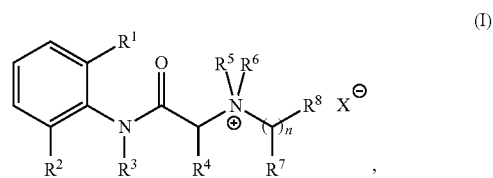

or a pharmaceutically acceptable co-crystal, tautomer, stereoisomer, solvate, hydrate, polymorph, isotopically enriched derivative, or prodrug thereof, wherein:

$R^1$ is substituted or unsubstituted alkyl;

$R^2$ is substituted or unsubstituted alkyl;

$R^3$ is hydrogen or substituted or unsubstituted alkyl;

$R^4$ is hydrogen, substituted or unsubstituted alkyl, or is joined with $R^5$ or $R^6$ to form a heterocyclyl ring;

$R^5$ is substituted or unsubstituted alkyl, or is joined with $R^4$ or $R^6$ to form a heterocyclyl ring;

$R^6$ is substituted or unsubstituted alkyl, or is joined with $R^4$ or $R^5$ to form a heterocyclyl ring;

each $R^7$ is independently hydrogen, substituted or unsubstituted alkyl, or halogen;

$R^9$ is —(C=O)-A-$R^8$ or -$A^1$-(C=O)—$R^{10}$;

$R^8$ is substituted or unsubstituted alkyl, substituted or unsubstituted carbocyclyl, substituted or unsubstituted heterocyclyl, substituted or unsubstituted heteroaryl, or substituted or unsubstituted aryl;

$R^{10}$ is substituted or unsubstituted alkyl, substituted or unsubstituted carbocyclyl, substituted or unsubstituted heterocyclyl, substituted or unsubstituted heteroaryl, or substituted or unsubstituted aryl;

A is O, S, or $NR^A$;

$A^1$ is O, S, or $NR^A$;

$R^A$ is hydrogen or substituted or unsubstituted alkyl;

$X^-$ is a counterion; and n is 1, 2, 3, 4, 5, or 6.

In certain embodiments, disclosed is a compound of Formula (I-a):

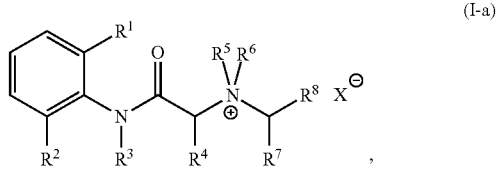

or a pharmaceutically acceptable co-crystal, tautomer, stereoisomer, solvate, hydrate, polymorph, isotopically enriched derivative, or prodrug thereof, wherein:

$R^1$ is substituted or unsubstituted alkyl;

$R^2$ is substituted or unsubstituted alkyl;

$R^3$ is hydrogen or substituted or unsubstituted alkyl;

$R^4$ is hydrogen, substituted or unsubstituted alkyl, or is joined with $R^5$ or $R^6$ to form a heterocyclyl ring;

$R^5$ is substituted or unsubstituted alkyl, or is joined with $R^4$ or $R^6$ to form a heterocyclyl ring;

$R^6$ is substituted or unsubstituted alkyl, or is joined with $R^4$ or $R^5$ to form a heterocyclyl ring;

$R^7$ is hydrogen, substituted or unsubstituted alkyl, or halogen;

$R^9$ is —(C=O)-A-$R^8$ or -$A^1$-(C=O)—$R^{10}$;

$R^8$ is substituted or unsubstituted alkyl, substituted or unsubstituted carbocyclyl, substituted or unsubstituted heterocyclyl, substituted or unsubstituted heteroaryl, or substituted or unsubstituted aryl;

$R^{10}$ is substituted or unsubstituted alkyl, substituted or unsubstituted carbocyclyl, substituted or unsubstituted heterocyclyl, substituted or unsubstituted heteroaryl, or substituted or unsubstituted aryl;

A is O, S, or $NR^A$;

$A^1$ is O, S, or $NR^A$;

$R^A$ is hydrogen or substituted or unsubstituted alkyl; and $X^-$ is a counterion.

$R^1$ and $R^2$

As described herein, $R^1$ is substituted or unsubstituted alkyl. In certain embodiments, $R^1$ is unsubstituted alkyl. In certain embodiments, $R^1$ is unsubstituted $C_{1-6}$ alkyl. In certain embodiments, $R^1$ is unsubstituted $C_{1-4}$ alkyl. In certain embodiments, $R^1$ is unsubstituted $C_{1-3}$ alkyl. In certain embodiments, $R^1$ is unsubstituted $C_{1-2}$ alkyl. In certain embodiments, $R^1$ is methyl.

As described herein, $R^2$ is substituted or unsubstituted alkyl. In certain embodiments, $R^2$ is unsubstituted alkyl. In certain embodiments, $R^2$ is unsubstituted $C_{1-6}$ alkyl. In certain embodiments, $R^2$ is unsubstituted $C_{1-4}$ alkyl. In certain embodiments, $R^2$ is unsubstituted $C_{1-3}$ alkyl. In certain embodiments, $R^2$ is unsubstituted $C_{1-2}$ alkyl. In certain embodiments, $R^2$ is methyl.

In certain embodiments, $R^1$ is unsubstituted alkyl; and $R^2$ is unsubstituted alkyl. In certain embodiments, $R^1$ is unsubstituted $C_{1-6}$ alkyl; and $R^2$ is unsubstituted $C_{1-6}$ alkyl. In certain embodiments, $R^1$ is unsubstituted $C_{1-4}$ alkyl; and $R^2$ is unsubstituted $C_{1-4}$ alkyl. In certain embodiments, $R^1$ is unsubstituted $C_{1-3}$ alkyl; and $R^2$ is unsubstituted $C_{1-3}$ alkyl. In certain embodiments, $R^1$ is unsubstituted $C_{1-2}$ alkyl; and $R^2$ is unsubstituted $C_{1-2}$ alkyl. In certain embodiments, $R^1$ is methyl; $R^2$ is methyl.

$R^3$

As described herein, $R^3$ is hydrogen, or substituted or unsubstituted alkyl. In certain embodiments, $R^3$ is hydrogen. In certain embodiments, $R^3$ is substituted or unsubstituted alkyl. In certain embodiments, $R^3$ is unsubstituted alkyl. In certain embodiments, $R^3$ is unsubstituted $C_{1-6}$ alkyl. In certain embodiments, $R^3$ is unsubstituted $C_{1-4}$ alkyl. In certain embodiments, $R^3$ is unsubstituted $C_{1-3}$ alkyl. In certain embodiments, $R^3$ is unsubstituted $C_{1-2}$ alkyl. In certain embodiments, $R^3$ is methyl.

$R^4$, $R^5$, and $R^6$

As described herein, $R^4$ is hydrogen, substituted or unsubstituted alkyl, or is joined with $R^5$ or $R^6$ to form a heterocyclyl ring; $R^5$ is substituted or unsubstituted alkyl, or is joined with $R^4$ or $R^6$ to form a heterocyclyl ring; and $R^6$ is substituted or unsubstituted alkyl, or is joined with $R^4$ or $R^5$ to form a heterocyclyl ring.

In certain embodiments, $R^4$ is hydrogen. In certain embodiments, $R^4$ is substituted or unsubstituted alkyl. In certain embodiments, $R^4$ is unsubstituted alkyl. In certain embodiments, $R^4$ is unsubstituted $C_{1-6}$ alkyl.

In certain embodiments, $R^4$ is hydrogen, or is joined with $R^5$ or $R^6$ to form a heterocyclyl ring. In certain embodiments, $R^4$ is joined with $R^5$ or $R^6$ to form a heterocyclyl ring. In certain embodiments, $R^4$ is joined with $R^5$ or $R^6$ to form a 4-7 membered heterocyclyl ring. In certain embodiments, $R^4$ is joined with $R^5$ or $R^6$ to form a 4-6 membered heterocyclyl ring. In certain embodiments, $R^4$ is joined with $R^5$ or $R^6$ to form a 4-5 membered heterocyclyl ring. In certain embodiments, $R^4$ is joined with $R^5$ or $R^6$ to form a 5-6 membered heterocyclyl ring. In certain embodiments, $R^4$ is joined with $R^5$ or $R^6$ to form a 5 membered heterocyclyl ring. In certain embodiments, $R^4$ is joined with $R^5$ or $R^6$ to form a 6 membered heterocyclyl ring. In certain embodiments, $R^4$ is joined with $R^5$ or $R^6$ to form a piperidinium ring.

When $R^4$ is joined with $R^5$ or $R^6$ to form a heterocyclyl ring, the remaining variable of $R^5$ and $R^6$ that does not form the heterocyclyl ring is a substituted or unsubstituted alkyl. In certain embodiments, $R^4$ is joined with $R^5$ or $R^6$ to form a heterocyclyl ring, and the remaining variable of $R^5$ and $R^6$ that does not form the heterocyclyl ring is an unsubstituted alkyl. In certain embodiments, $R^4$ is joined with $R^5$ or $R^6$ to form a heterocyclyl ring, and the remaining variable of $R^5$ and $R^6$ that does not form the heterocyclyl ring is an unsubstituted $C_{1-6}$ alkyl. In certain embodiments, $R^4$ is joined with $R^5$ or $R^6$ to form a heterocyclyl ring, and the remaining variable of $R^5$ and $R^6$ that does not form the heterocyclyl ring is an unsubstituted $C_{1-4}$ alkyl. In certain embodiments, $R^4$ is joined with $R^5$ or $R^6$ to form a heterocyclyl ring, and the remaining variable of $R^5$ and $R^6$ that does not form the heterocyclyl ring is an unsubstituted $C_{1-3}$ alkyl. In certain embodiments, $R^4$ is joined with $R^5$ or $R^6$ to form a heterocyclyl ring, and the remaining variable of $R^5$ and $R^6$ that does not form the heterocyclyl ring is an unsubstituted $C_{1-2}$ alkyl. In certain embodiments, $R^4$ is joined with $R^5$ or $R^6$ to form a heterocyclyl ring, and the remaining variable of $R^5$ and $R^6$ that does not form the heterocyclyl ring is methyl, ethyl, n-propyl, or n-butyl. In certain embodiments, $R^4$ is joined with $R^5$ or $R^6$ to form a heterocyclyl ring, and the remaining variable of $R^5$ and $R^6$ that does not form the heterocyclyl ring is methyl. In certain embodiments, $R^4$ is joined with $R^5$ or $R^6$ to form a heterocyclyl ring, and the remaining variable of $R^5$ and $R^6$ that does not form the heterocyclyl ring is n-propyl. In certain embodiments, $R^4$ is joined with $R^5$ or $R^6$ to form a heterocyclyl ring, and the remaining variable of $R^5$ and $R^6$ that does not form the heterocyclyl ring is n-butyl.

In certain embodiments, $R^4$ is joined with $R^5$ to form a heterocyclyl ring. In certain embodiments, $R^4$ is joined with $R^5$ to form a 4-7 membered heterocyclyl ring. In certain embodiments, $R^4$ is joined with $R^5$ to form a 4-6 membered heterocyclyl ring. In certain embodiments, $R^4$ is joined with $R^5$ to form a 4-5 membered heterocyclyl ring. In certain embodiments, $R^4$ is joined with $R^5$ to form a 5-6 membered heterocyclyl ring. In certain embodiments, $R^4$ is joined with $R^5$ to form a 5 membered heterocyclyl ring. In certain embodiments, $R^4$ is joined with $R^5$ to form a 6 membered heterocyclyl ring. In certain embodiments, $R^4$ is joined with $R^5$ to form a piperidinium ring.

In certain embodiments, $R^4$ is joined with $R^6$ to form a heterocyclyl ring. In certain embodiments, $R^4$ is joined with $R^6$ to form a 4-7 membered heterocyclyl ring. In certain embodiments, $R^4$ is joined with $R^6$ to form a 4-6 membered heterocyclyl ring. In certain embodiments, $R^4$ is joined with $R^6$ to form a 4-5 membered heterocyclyl ring. In certain embodiments, $R^4$ is joined with $R^6$ to form a 5-6 membered heterocyclyl ring. In certain embodiments, $R^4$ is joined with $R^6$ to form a 5 membered heterocyclyl ring. In certain embodiments, $R^4$ is joined with $R^6$ to form a 6 membered heterocyclyl ring. In certain embodiments, $R^4$ is joined with $R^6$ to form a piperidinium ring.

In certain embodiments, when $R^4$ is joined with $R^5$ or $R^6$ to form a heterocyclyl ring, the heterocyclyl ring is further substituted. In certain embodiments, when $R^4$ is joined with $R^5$ or $R^6$ to form a heterocyclyl ring, the heterocyclyl ring is not further substituted.

In certain embodiments, $R^5$ is substituted or unsubstituted alkyl. In certain embodiments, $R^5$ is unsubstituted alkyl. In certain embodiments, $R^5$ is unsubstituted $C_{1-6}$ alkyl. In certain embodiments, $R^5$ is unsubstituted $C_{1-4}$ alkyl. In certain embodiments, $R^5$ is unsubstituted $C_{1-3}$ alkyl. In certain embodiments, $R^5$ is unsubstituted $C_{1-2}$ alkyl. In certain embodiments, $R^5$ is n-butyl, n-propyl, ethyl, or methyl. In certain embodiments, $R^5$ is n-butyl. In certain embodiments, $R^5$ is n-propyl. In certain embodiments, $R^5$ is ethyl. In certain embodiments, $R^5$ is methyl.

In certain embodiments, $R^6$ is substituted or unsubstituted alkyl. In certain embodiments, $R^6$ is unsubstituted alkyl. In certain embodiments, $R^6$ is unsubstituted $C_{1-6}$ alkyl. In certain embodiments, $R^6$ is unsubstituted $C_{1-4}$ alkyl. In certain embodiments, $R^6$ is unsubstituted $C_{1-3}$ alkyl. In certain embodiments, $R^6$ is unsubstituted $C_{1-2}$ alkyl. In certain embodiments, $R^6$ is n-butyl, n-propyl, ethyl, or methyl. In certain embodiments, $R^6$ is n-butyl. In certain embodiments, $R^6$ is n-propyl. In certain embodiments, $R^6$ is ethyl. In certain embodiments, $R^6$ is methyl.

In certain embodiments, $R^5$ is unsubstituted alkyl; and $R^6$ is unsubstituted alkyl. In certain embodiments, $R^5$ is $C_{1-6}$ unsubstituted alkyl; and $R^6$ is $C_{1-6}$ unsubstituted alkyl. In certain embodiments, $R^5$ is $C_{1-4}$ unsubstituted alkyl; and $R^6$ is $C_{1-4}$ unsubstituted alkyl. In certain embodiments, $R^5$ is $C_{1-3}$ unsubstituted alkyl; and $R^6$ is $C_{1-3}$ unsubstituted alkyl. In certain embodiments, $R^5$ is $C_{1-2}$ unsubstituted alkyl; and $R^6$ is $C_{1-2}$ unsubstituted alkyl. In certain embodiments, $R^5$ is $C_{1-6}$ ethyl; and $R^6$ is $C_{1-6}$ ethyl.

As described herein, $R^4$ is hydrogen, substituted or unsubstituted alkyl, or is joined with $R^5$ or $R^6$ to form a heterocyclyl ring.

$R^7$

As described herein, $R^7$ is hydrogen, substituted or unsubstituted alkyl, or halogen. In certain embodiments, $R^7$ is hydrogen. In certain embodiments, $R^7$ is halogen. In certain embodiments, $R^7$ is fluoro. In certain embodiments, $R^7$ is substituted or unsubstituted alkyl. unsubstituted alkyl. In certain embodiments, $R^7$ is unsubstituted $C_{1-6}$ alkyl. In certain embodiments, $R^7$ is unsubstituted $C_{1-4}$ alkyl. In certain embodiments, $R^7$ is unsubstituted $C_{1-3}$ alkyl. In certain embodiments, $R^7$ is unsubstituted $C_{1-2}$ alkyl.

$R^9$

As described herein, $R^9$ is —(C=O)-A-$R^8$ or -$A^1$-(C=O)—$R^{10}$; $R^8$ is substituted or unsubstituted alkyl, substituted or unsubstituted carbocyclyl, substituted or unsubstituted heterocyclyl, substituted or unsubstituted heteroaryl, or substituted or unsubstituted aryl; $R^{10}$ is substituted or unsubstituted alkyl, substituted or unsubstituted carbocyclyl, substituted or unsubstituted heterocyclyl, substituted or unsubstituted heteroaryl, or substituted or unsubstituted aryl; A is O, S, or $NR^A$; $A^1$ is O, S, or $NR^A$; and $R^A$ is hydrogen or substituted or unsubstituted alkyl.

In certain embodiments, $R^9$ is —(C=O)-A-$R^8$; $R^8$ is substituted or unsubstituted alkyl, substituted or unsubstituted carbocyclyl, substituted or unsubstituted heterocyclyl, substituted or unsubstituted heteroaryl, or substituted or unsubstituted aryl; A is O, S, or $NR^A$; and $R^A$ is hydrogen or substituted or unsubstituted alkyl. In certain embodiments, $R^9$ is —(C=O)-A-$R^B$; $R^8$ is substituted or unsubstituted alkyl, or substituted or unsubstituted aryl; A is O, S, or $NR^A$; and $R^A$ is hydrogen or substituted or unsubstituted alkyl. In certain embodiments, $R^9$ is —(C=O)-A-$R^8$; $R^8$ is substituted or unsubstituted alkyl, or substituted or unsubstituted aryl; A is O, S, or $NR^A$; and $R^A$ is hydrogen or substituted or unsubstituted alkyl. In certain embodiments, $R^9$ is —(C=O)-A-$R^8$; $R^8$ is substituted or unsubstituted alkyl; A is O, S, or $NR^A$; and $R^A$ is hydrogen or substituted or unsubstituted alkyl. In certain embodiments, $R^9$ is —(C=O)-A-$R^8$; $R^8$ is unsubstituted alkyl; A is O, S, or $NR^A$; and $R^A$ is hydrogen or substituted or unsubstituted alkyl. In certain embodiments, $R^9$ is —(C=O)-A-$R^8$; $R^8$ is unsubstituted $C_{1-6}$ alkyl; A is O, S, or $NR^A$; and $R^A$ is hydrogen or substituted or unsubstituted alkyl. In certain embodiments, $R^9$ is —(C=O)-A-$R^8$; $R^8$ is unsubstituted $C_{1-4}$ alkyl; A is O, S, or $NR^A$; and $R^A$ is hydrogen or substituted or unsubstituted alkyl.

In certain embodiments, $R^9$ is —(C=O)-A-$R^8$; $R^8$ is substituted or unsubstituted alkyl, substituted or unsubstituted carbocyclyl, substituted or unsubstituted heterocyclyl, substituted or unsubstituted heteroaryl, or substituted or unsubstituted aryl; and A is O or S. In certain embodiments, $R^9$ is —(C=O)-A-$R^8$; $R^8$ is substituted or unsubstituted alkyl, or substituted or unsubstituted aryl; and A is O or S. In certain embodiments, $R^9$ is —(C=O)-A-$R^8$; $R^8$ is substituted or unsubstituted alkyl; and A is O or S. In certain embodiments, $R^9$ is —(C=O)-A-$R^8$; $R^8$ is unsubstituted alkyl; and A is O or S. In certain embodiments, $R^9$ is —(C=O)-A-$R^8$; $R^8$ is unsubstituted $C_{1-6}$ alkyl; and A is O or S. In certain embodiments, $R^9$ is —(C=O)-A-$R^8$; $R^8$ is unsubstituted $C_{1-4}$ alkyl; and A is O or S.

In certain embodiments, $R^9$ is —(C=O)-A-$R^8$; $R^8$ is substituted or unsubstituted alkyl, substituted or unsubstituted carbocyclyl, substituted or unsubstituted heterocyclyl, substituted or unsubstituted heteroaryl, or substituted or unsubstituted aryl; A is O or $NR^A$; and $R^A$ is hydrogen or substituted or unsubstituted alkyl. In certain embodiments, $R^9$ is —(C=O)-A-$R^8$; $R^8$ is substituted or unsubstituted alkyl, or substituted or unsubstituted aryl; A is O or $NR^A$; and $R^A$ is hydrogen or substituted or unsubstituted alkyl. In certain embodiments, $R^9$ is —(C=O)-A-$R^8$; $R^8$ is substituted or unsubstituted alkyl; A is O or $NR^A$; and $R^A$ is hydrogen or substituted or unsubstituted alkyl. In certain embodiments, $R^9$ is —(C=O)-A-$R^8$; $R^8$ is unsubstituted alkyl; A is O or $NR^A$; and $R^A$ is hydrogen or substituted or unsubstituted alkyl. In certain embodiments, $R^9$ is —(C=O)-A-$R^8$; $R^8$ is unsubstituted $C_{1-6}$ alkyl; A is O or $NR^A$; and $R^A$ is hydrogen or substituted or unsubstituted alkyl. In certain embodiments, $R^9$ is —(C=O)-A-$R^8$; $R^8$ is unsubstituted $C_{1-4}$ alkyl; A is O or $NR^A$; and $R^A$ is hydrogen or substituted or unsubstituted alkyl.

In certain embodiments, $R^9$ is —(C=O)-A-$R^B$; $R^8$ is substituted or unsubstituted alkyl, substituted or unsubstituted carbocyclyl, substituted or unsubstituted heterocyclyl, substituted or unsubstituted heteroaryl, or substituted or unsubstituted aryl; A is $NR^A$; and $R^A$ is hydrogen or substituted or unsubstituted alkyl. In certain embodiments, $R^9$ is —(C═O)-A-R$^8$. R$^8$ is substituted or unsubstituted alkyl, or substituted or unsubstituted aryl; A is NR$^A$; and R$^A$ is hydrogen or substituted or unsubstituted alkyl. In certain embodiments, R$^9$ is —(C═O)-A-R$^8$; R$^8$ is substituted or unsubstituted alkyl; A is NR$^A$; and R$^A$ is hydrogen or substituted or unsubstituted alkyl. In certain embodiments, R$^9$ is —(C═O)-A-R$^8$; R$^8$ is unsubstituted alkyl; A is NR$^A$; and R$^A$ is hydrogen or substituted or unsubstituted alkyl. In certain embodiments, R$^9$ is —(C═O)-A-R$^8$; R$^8$ is unsubstituted $C_{1-6}$ alkyl; A is NR$^A$; and R$^A$ is hydrogen or substituted or unsubstituted alkyl. In certain embodiments, R$^9$ is —(C═O)-A-R$^8$; R$^8$ is unsubstituted $C_{1-4}$ alkyl; A is NR$^A$; and R$^A$ is hydrogen or substituted or unsubstituted alkyl. In certain embodiments, R$^9$ is —(C═O)-A-R$^8$; R$^8$ is unsubstituted $C_{1-4}$ alkyl; A is NR$^A$; and R$^A$ is hydrogen or substituted or unsubstituted alkyl. In certain embodiments, R$^9$ is —(C═O)-A-R$^8$; R$^8$ is methyl; A is NR$^A$; and R$^A$ is hydrogen or substituted or unsubstituted alkyl.

In certain embodiments, if A is NR$^A$, then R$^3$ is hydrogen. In certain embodiments, if A is NR$^A$, then R$^8$ is not substituted or unsubstituted aryl. In certain embodiments, if A is NR$^A$, then R$^3$ is hydrogen, and R$^8$ is not substituted or unsubstituted aryl. In certain embodiments, if A is NR$^A$, then neither R$^8$ nor R$^A$ is substituted or unsubstituted $C_{12}$ alkyl.

In certain embodiments, R$^9$ is —(C═O)-A-R$^8$; R$^8$ is substituted or unsubstituted alkyl, substituted or unsubstituted carbocyclyl, substituted or unsubstituted heterocyclyl, substituted or unsubstituted heteroaryl, or substituted or unsubstituted aryl; and A is O. In certain embodiments, R$^9$ is —(C═O)-A-R$^8$; R$^8$ is substituted or unsubstituted alkyl, or substituted or unsubstituted aryl; and A is O. In certain embodiments, R$^9$ is —(C═O)-A-R$^8$; R$^8$ is substituted or unsubstituted alkyl; and A is O. In certain embodiments, R$^9$ is —(C═O)-A-R$^8$; R$^8$ is substituted or unsubstituted $C_{1-6}$ alkyl; and A is O. In certain embodiments, R$^9$ is —(C═O)-A-R$^8$; R$^8$ is unsubstituted $C_{1-4}$ alkyl; and A is O. In certain embodiments, R$^9$ is —(C═O)-A-R$^8$; R$^8$ is benzyl, t-butyl, n-butyl, isopropyl, n-propyl, ethyl, or methyl; and A is O. In certain embodiments, R$^9$ is —(C═O)-A-R$^8$; R$^8$ is t-butyl, n-butyl, isopropyl, n-propyl, ethyl, or methyl; and A is O. In certain embodiments, R$^9$ is —(C═O)-A-R$^8$; R$^8$ is n-butyl, isopropyl, n-propyl, ethyl, or methyl; and A is O. In certain embodiments, R$^9$ is —(C═O)-A-R$^8$; R$^8$ is n-butyl, isopropyl, n-propyl, or methyl; and A is O. In certain embodiments, R$^9$ is —(C═O)-A-R$^8$; R$^8$ is n-butyl; and A is O. In certain embodiments, R$^9$ is —(C═O)-A-R$^8$; R$^8$ is isopropyl; and A is O. In certain embodiments, R$^9$ is —(C═O)-A-R$^8$; R$^8$ is n-propyl; and A is O. In certain embodiments, R$^9$ is —(C═O)-A-R$^8$; R$^8$ is methyl; and A is O. In certain embodiments, R$^9$ is —(C═O)-A-R$^8$; R$^8$ is benzyl; and A is O.

In certain embodiments, R$^9$ is -A$^1$-(C═O)—R$^{10}$; R$^{10}$ is substituted or unsubstituted alkyl, substituted or unsubstituted carbocyclyl, substituted or unsubstituted heterocyclyl, substituted or unsubstituted heteroaryl, or substituted or unsubstituted aryl; A$^1$ is O, S, or NR$^A$; and R$^A$ is hydrogen or substituted or unsubstituted alkyl. In certain embodiments, R$^9$ is -A$^1$-(C═O)—R$^{10}$; R$^{10}$ is substituted or unsubstituted alkyl, or substituted or unsubstituted aryl; A$^1$ is O, S, or NR$^A$; and R$^A$ is hydrogen or substituted or unsubstituted alkyl. In certain embodiments, R$^9$ is -A$^1$-(C═O)—R$^{10}$; R$^{10}$ is substituted or unsubstituted alkyl; A$^1$ is O, S, or NR$^A$; and R$^A$ is hydrogen or substituted or unsubstituted alkyl. In certain embodiments, R$^9$ is -A$^1$-(C═O)—R$^{10}$; R$^{10}$ is unsubstituted alkyl; A$^1$ is O, S, or NR$^A$; and R$^A$ is hydrogen or substituted or unsubstituted alkyl. In certain embodiments, R$^9$ is -A$^1$-(C═O)—R$^{10}$; R$^{10}$ is unsubstituted $C_{1-4}$ alkyl; A$^1$ is O, S, or NR$^A$; and R$^A$ is hydrogen or substituted or unsubstituted alkyl.

In certain embodiments, R$^9$ is -A$^1$-(C═O)—R$^{10}$; R$^{10}$ is substituted or unsubstituted alkyl, substituted or unsubstituted carbocyclyl, substituted or unsubstituted heterocyclyl, substituted or unsubstituted heteroaryl, or substituted or unsubstituted aryl; and A$^1$ is O or S. In certain embodiments, R$^9$ is -A$^1$-(C═O)—R$^{10}$; R$^{10}$ is substituted or unsubstituted alkyl, or substituted or unsubstituted aryl; and A$^1$ is O or S. In certain embodiments, R$^9$ is -A$^1$-(C═O)—R$^{10}$; R$^{10}$ is substituted or unsubstituted alkyl; A$^1$ is O or S. In certain embodiments, R$^9$ is -A$^1$-(C═O)—R$^{10}$; R$^{10}$ is unsubstituted alkyl; and A$^1$ is O or S. In certain embodiments, R$^9$ is -A$^1$-(C═O)—R$^{10}$; R$^{10}$ is unsubstituted $C_{1-4}$ alkyl; and A$^1$ is O or S.

In certain embodiments, R$^9$ is -A$^1$-(C═O)—R$^{10}$; R$^{10}$ is substituted or unsubstituted alkyl, substituted or unsubstituted carbocyclyl, substituted or unsubstituted heterocyclyl, substituted or unsubstituted heteroaryl, or substituted or unsubstituted aryl; and A$^1$ is O. In certain embodiments, R$^9$ is -A$^1$-(C═O)—R$^{10}$; R$^{10}$ is substituted or unsubstituted alkyl, or substituted or unsubstituted aryl; and A$^1$ is O. In certain embodiments, R$^9$ is -A$^1$-(C═O)—R$^{10}$; R$^{10}$ is substituted or unsubstituted alkyl; and A$^1$ is O. In certain embodiments, R$^9$ is -A$^1$-(C═O)—R$^{10}$; R$^{10}$ is substituted or unsubstituted $C_{1-4}$ alkyl; and A$^1$ is O. In certain embodiments, R$^9$ is -A$^1$-(C═O)—R$^{10}$; R$^{10}$ is unsubstituted $C_{1-4}$ alkyl; and A$^1$ is O. In certain embodiments, R$^9$ is -A$^1$-(C═O)—R$^{10}$; R$^{10}$ is t-butyl, n-butyl, isopropyl, n-propyl, ethyl, or methyl; and A$^1$ is O. In certain embodiments, R$^9$ is -A$^1$-(C═O)—R$^{10}$; R$^{10}$ is n-butyl, n-propyl, ethyl, or methyl; and A$^1$ is O. In certain embodiments, R$^9$ is -A$^1$-(C═O)—R$^{10}$; R$^{10}$ is n-butyl; and A$^1$ is O. In certain embodiments, R$^9$ is -A$^1$-(C═O)—R$^{10}$; R$^{10}$ is n-propyl; and A$^1$ is O. In certain embodiments, R$^9$ is -A$^1$-(C═O)—R$^{10}$; R$^{10}$ is ethyl; and A$^1$ is O. In certain embodiments, R$^9$ is -A$^1$-(C═O)—R$^{10}$; R$^{10}$ is methyl; and A$^1$ is O.

X$^-$

As described herein, X$^-$ is a counterion. In certain embodiments, X$^-$ is a halide ion. In certain embodiments, X$^-$ is F$^-$, Cl$^-$, Br$^-$, or I$^-$. In certain embodiments, X$^-$ is Cl$^-$ or Br$^-$. In certain embodiments, X$^-$ is Cl$^-$. In certain embodiments, X$^-$ is Br$^-$.

n

As described herein, n is 1, 2, 3, 4, 5, or 6. In certain embodiments, n is 1, 2, 3, 4, or 5. In certain embodiments, n is 1, 2, 3, or 4. In certain embodiments, n is 1, 2, or 3. In certain embodiments, n is 1 or 2. In certain embodiments, n is 1. In certain embodiments, n is 2. In certain embodiments, n is 3. In certain embodiments, n is 4. In certain embodiments, n is 5. In certain embodiments, n is 6.

CERTAIN EMBODIMENTS

In certain embodiments, the compound of Formula (I) is of Formula (II):

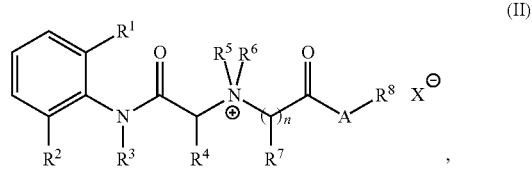

(II)

or a pharmaceutically acceptable co-crystal, tautomer, stereoisomer, solvate, hydrate, polymorph, isotopically enriched derivative, or prodrug thereof; wherein $R^1$, $R^2$, $R^3$, $R^4$, $R^5$, $R^6$, $R^7$, $R^8$, A, n, and $X^-$ are as defined herein.

In certain embodiments, the compound of Formula (I) is of Formula (II):

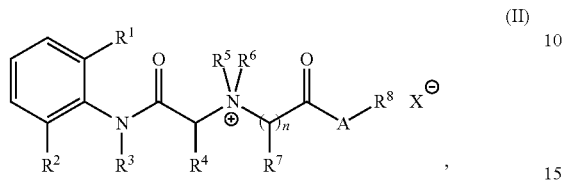

(II)

or a pharmaceutically acceptable co-crystal, tautomer, stereoisomer, solvate, hydrate, polymorph, isotopically enriched derivative, or prodrug thereof; wherein
$R^1$ is substituted or unsubstituted alkyl;
$R^2$ is substituted or unsubstituted alkyl;
$R^3$ is hydrogen, or substituted or unsubstituted alkyl;
$R^4$ is hydrogen, substituted or unsubstituted alkyl, or is joined with $R^5$ or $R^6$ to form a heterocyclyl ring;
$R^5$ is substituted or unsubstituted alkyl, or is joined with $R^4$ to form a heterocyclyl ring;
$R^6$ is substituted or unsubstituted alkyl, or is joined with $R^4$ to form a heterocyclyl ring;
$R^7$ is hydrogen, substituted or unsubstituted alkyl, or halogen;
$R^8$ is substituted or unsubstituted alkyl, substituted or unsubstituted carbocyclyl, substituted or unsubstituted heterocyclyl, substituted or unsubstituted heteroaryl, or substituted or unsubstituted aryl;
A is O, S, or $NR^A$;
$R^A$ is hydrogen or substituted or unsubstituted alkyl;
$X^-$ is a counterion; and
n is 1, 2, 3, 4, 5, or 6.

In certain embodiments, the compound of Formula (I) is of Formula (II):

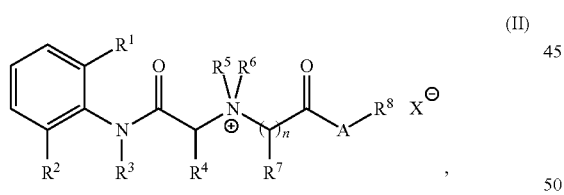

(II)

or a pharmaceutically acceptable co-crystal, tautomer, stereoisomer, solvate, hydrate, polymorph, isotopically enriched derivative, or prodrug thereof; wherein
$R^1$ is substituted or unsubstituted alkyl;
$R^2$ is substituted or unsubstituted alkyl;
$R^3$ is hydrogen, or substituted or unsubstituted alkyl;
$R^4$ is hydrogen, substituted or unsubstituted alkyl, or is joined with $R^5$ or $R^6$ to form a heterocyclyl ring;
$R^5$ is substituted or unsubstituted alkyl, or is joined with $R^4$ to form a heterocyclyl ring;
$R^6$ is substituted or unsubstituted alkyl, or is joined with $R^4$ to form a heterocyclyl ring;
$R^7$ is hydrogen, substituted or unsubstituted alkyl, or halogen;
$R^8$ is substituted or unsubstituted alkyl, substituted or unsubstituted carbocyclyl, substituted or unsubstituted heterocyclyl, substituted or unsubstituted heteroaryl, or substituted or unsubstituted aryl;
A is O, S, or $NR^A$;
$R^A$ is hydrogen or substituted or unsubstituted alkyl;
$X^-$ is a counterion; and
n is 1, 2, 3, 4, 5, or 6;
provided that if A is $NR^A$, then $R^3$ is H; $R^8$ is not substituted or unsubstituted aryl; and the compound is not:

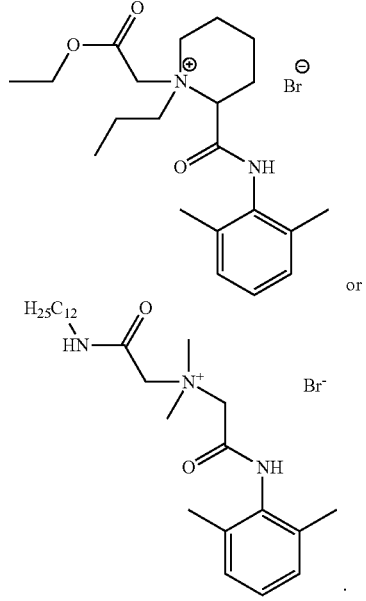

In certain embodiments of the compound of Formula (II),
$R^1$ is substituted or unsubstituted alkyl;
$R^2$ is substituted or unsubstituted alkyl;
$R^3$ is hydrogen, or substituted or unsubstituted alkyl;
$R^4$ is hydrogen, substituted or unsubstituted alkyl, or is joined with $R^5$ or $R^6$ to form a heterocyclyl ring;
$R^5$ is substituted or unsubstituted alkyl, or is joined with $R^4$ to form a heterocyclyl ring;
$R^6$ is substituted or unsubstituted alkyl, or is joined with $R^4$ to form a heterocyclyl ring;
$R^7$ is hydrogen, substituted or unsubstituted alkyl, or halogen;
$R^8$ is substituted or unsubstituted alkyl, substituted or unsubstituted carbocyclyl, substituted or unsubstituted heterocyclyl, substituted or unsubstituted heteroaryl, or substituted or unsubstituted aryl;
A is O or S;
$X^-$ is a counterion; and
n is 1, 2, 3, 4, 5, or 6.

In certain embodiments, the compound of Formula (I) is of Formula (II):

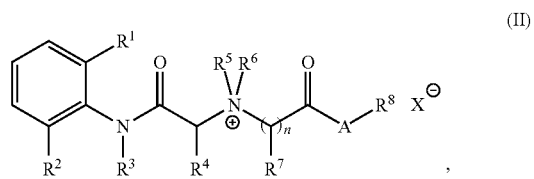

(II)

or a pharmaceutically acceptable co-crystal, tautomer, stereoisomer, solvate, hydrate, polymorph, isotopically enriched derivative, or prodrug thereof; wherein
$R^1$ is substituted or unsubstituted alkyl;
$R^2$ is substituted or unsubstituted alkyl;
$R^3$ is hydrogen, or substituted or unsubstituted alkyl;
$R^4$ is hydrogen, substituted or unsubstituted alkyl, or is joined with $R^5$ or $R^6$ to form a heterocyclyl ring;
$R^5$ is substituted or unsubstituted alkyl, or is joined with $R^4$ to form a heterocyclyl ring;
$R^6$ is substituted or unsubstituted alkyl, or is joined with $R^4$ to form a heterocyclyl ring;
$R^7$ is hydrogen, substituted or unsubstituted alkyl, or halogen;
$R^8$ is substituted or unsubstituted alkyl, substituted or unsubstituted carbocyclyl, substituted or unsubstituted heterocyclyl, substituted or unsubstituted heteroaryl, or substituted or unsubstituted aryl;
A is O or S; and
$X^-$ is a counterion; provided that the compound is not:

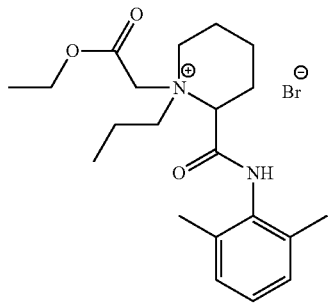

In certain embodiments, the compound of Formula (I) is of Formula (II-a):

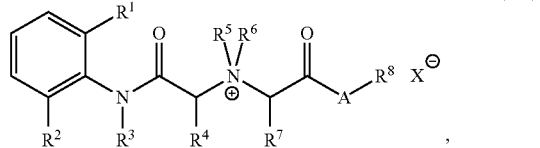

(II-a)

or a pharmaceutically acceptable co-crystal, tautomer, stereoisomer, solvate, hydrate, polymorph, isotopically enriched derivative, or prodrug thereof; wherein $R^1$, $R^2$, $R^3$, $R^4$, $R^5$, $R^6$, $R^7$, $R^8$, A, and $X^-$ are as defined herein.

In certain embodiments of the compound of Formula (II-a),
$R^1$ is substituted or unsubstituted alkyl;
$R^2$ is substituted or unsubstituted alkyl;
$R^3$ is hydrogen, or substituted or unsubstituted alkyl;
$R^4$ is hydrogen, substituted or unsubstituted alkyl, or is joined with $R^5$ or $R^6$ to form a heterocyclyl ring;
$R^5$ is substituted or unsubstituted alkyl, or is joined with $R^4$ to form a heterocyclyl ring;
$R^6$ is substituted or unsubstituted alkyl, or is joined with $R^4$ to form a heterocyclyl ring;
$R^7$ is hydrogen, substituted or unsubstituted alkyl, or halogen;
$R^8$ is substituted or unsubstituted alkyl, substituted or unsubstituted carbocyclyl, substituted or unsubstituted heterocyclyl, substituted or unsubstituted heteroaryl, or substituted or unsubstituted aryl;
A is O or S; and
$X^-$ is a counterion.

In certain embodiments, the compound of Formula (II) is of Formula (II-a):

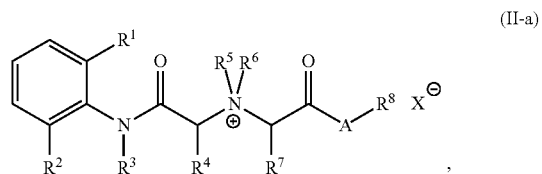

(II-a)

or a pharmaceutically acceptable co-crystal, tautomer, stereoisomer, solvate, hydrate, polymorph, isotopically enriched derivative, or prodrug thereof; wherein
$R^1$ is substituted or unsubstituted alkyl;
$R^2$ is substituted or unsubstituted alkyl;
$R^3$ is hydrogen, or substituted or unsubstituted alkyl;
$R^4$ is hydrogen, substituted or unsubstituted alkyl, or is joined with $R^5$ or $R^6$ to form a heterocyclyl ring;
$R^5$ is substituted or unsubstituted alkyl, or is joined with $R^4$ to form a heterocyclyl ring;
$R^6$ is substituted or unsubstituted alkyl, or is joined with $R^4$ to form a heterocyclyl ring;
$R^7$ is hydrogen, substituted or unsubstituted alkyl, or halogen;
$R^8$ is substituted or unsubstituted alkyl, substituted or unsubstituted carbocyclyl, substituted or unsubstituted heterocyclyl, substituted or unsubstituted heteroaryl, or substituted or unsubstituted aryl;
A is O or S; and
$X^-$ is a counterion; provided that the compound is not:

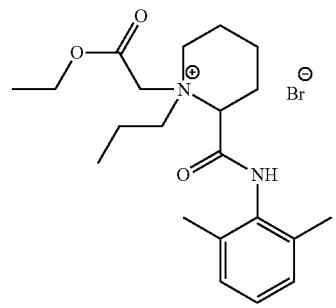

In certain embodiments, the compound of Formula (II) is of Formula (II-b):

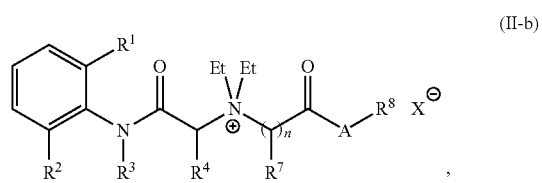

(II-b)

or a pharmaceutically acceptable co-crystal, tautomer, stereoisomer, solvate, hydrate, polymorph, isotopically enriched derivative, or prodrug thereof; wherein $R^1$, $R^2$, $R^3$, $R^4$, $R^7$, $R^8$, n, and $X^-$ are as defined herein.

In certain embodiments, the compound of Formula (II) is of Formula (II-b-1):

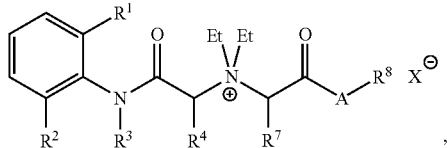

(II-b-1)

or a pharmaceutically acceptable co-crystal, tautomer, stereoisomer, solvate, hydrate, polymorph, isotopically enriched derivative, or prodrug thereof; wherein $R^1$, $R^2$, $R^3$, $R^4$, $R^7$, $R^8$, and $X^-$ are as defined herein.

In certain embodiments, the compound of Formula (II) is of Formula (II-c):

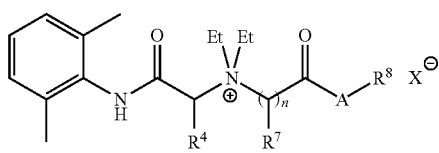

(II-c)

or a pharmaceutically acceptable co-crystal, tautomer, stereoisomer, solvate, hydrate, polymorph, isotopically enriched derivative, or prodrug thereof; wherein $R^4$, $R^7$, $R^8$, n, A, and $X^-$ are as defined herein.

In certain embodiments, the compound of Formula (II) is of Formula (II-c-1):

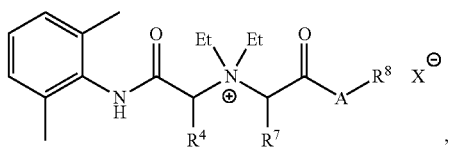

(II-c-1)

or a pharmaceutically acceptable co-crystal, tautomer, stereoisomer, solvate, hydrate, polymorph, isotopically enriched derivative, or prodrug thereof; wherein $R^4$, $R^7$, $R^8$, A, and $X^-$ are as defined herein.

In certain embodiments, the compound of Formula (II) is of Formula (II-d):

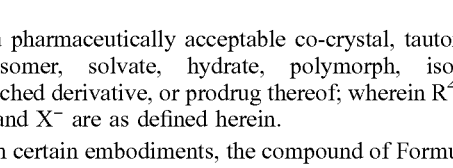

(II-d)

or a pharmaceutically acceptable co-crystal, tautomer, stereoisomer, solvate, hydrate, polymorph, isotopically enriched derivative, or prodrug thereof; wherein $R^4$, $R^7$, $R^8$, n, and $X^-$ are as defined herein.

In certain embodiments, the compound of Formula (II) is of Formula (II-d-1):

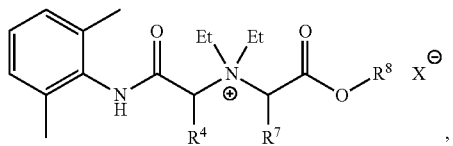

(II-d-1)

or a pharmaceutically acceptable co-crystal, tautomer, stereoisomer, solvate, hydrate, polymorph, isotopically enriched derivative, or prodrug thereof; wherein $R^4$, $R^7$, $R^8$, and $X^-$ are as defined herein.

In certain embodiments, the compound of Formula (II) is of Formula (II-e):

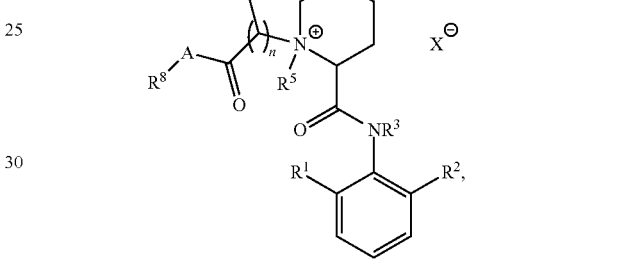

(II-e)

or a pharmaceutically acceptable co-crystal, tautomer, stereoisomer, solvate, hydrate, polymorph, isotopically enriched derivative, or prodrug thereof; wherein $R^1$, $R^2$, $R^3$, $R^5$, $R^7$, $R^8$, A, n, and $X^-$ are as defined herein.

In certain embodiments, the compound of Formula (II) is of Formula (II-e-1):

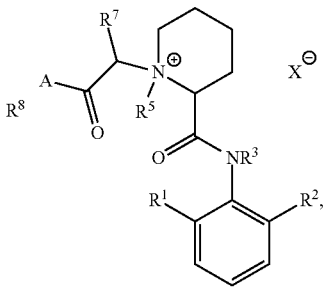

(II-e-1)

or a pharmaceutically acceptable co-crystal, tautomer, stereoisomer, solvate, hydrate, polymorph, isotopically enriched derivative, or prodrug thereof; wherein $R^1$, $R^2$, $R^3$, $R^5$, $R^7$, $R^8$, and $X^-$ are as defined herein.

In certain embodiments, the compound of Formula (II) is of Formula (II-f):

(II-f)

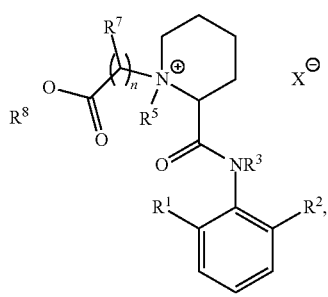

or a pharmaceutically acceptable co-crystal, tautomer, stereoisomer, solvate, hydrate, polymorph, isotopically enriched derivative, or prodrug thereof; wherein $R^1$, $R^2$, $R^3$, $R^5$, $R^7$, $R^8$, A, n, and $X^-$ are as defined herein.

In certain embodiments, the compound of Formula (II) is of Formula (II-f-1):

(II-f-1)

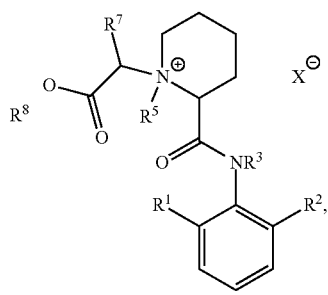

or a pharmaceutically acceptable co-crystal, tautomer, stereoisomer, solvate, hydrate, polymorph, isotopically enriched derivative, or prodrug thereof; wherein $R^1$, $R^2$, $R^3$, $R^5$, $R^7$, $R^8$, and $X^-$ are as defined herein.

In certain embodiments, the compound of Formula (II) is of Formula (II-g):

(II-g)

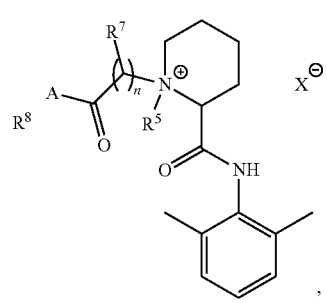

or a pharmaceutically acceptable co-crystal, tautomer, stereoisomer, solvate, hydrate, polymorph, isotopically enriched derivative, or prodrug thereof; wherein $R^5$, $R^7$, $R^8$, A, n, and $X^-$ are as defined herein.

In certain embodiments, the compound of Formula (II) is of Formula (II-g-1):

(II-g-1)

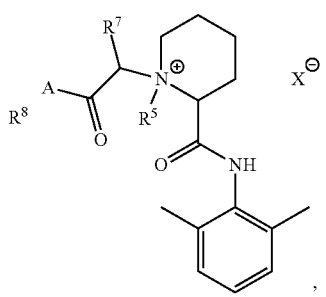

or a pharmaceutically acceptable co-crystal, tautomer, stereoisomer, solvate, hydrate, polymorph, isotopically enriched derivative, or prodrug thereof; wherein $R^5$, $R^7$, $R^8$, A, and $X^-$ are as defined herein.

In certain embodiments, the compound of Formula (II) is of Formula (II-h):

(II-h)

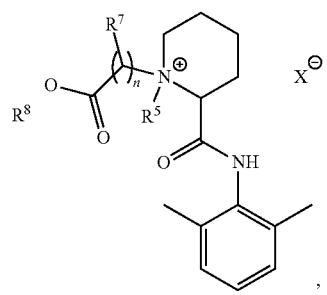

or a pharmaceutically acceptable co-crystal, tautomer, stereoisomer, solvate, hydrate, polymorph, isotopically enriched derivative, or prodrug thereof; wherein $R^5$, $R^7$, $R^8$, n, and $X^-$ are as defined herein.

In certain embodiments, the compound of Formula (II) is of Formula (II-h-1):

(II-h-1)

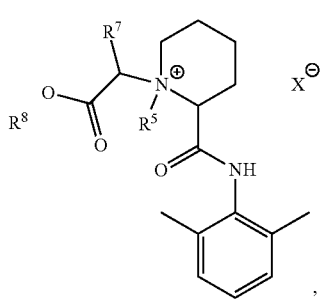

or a pharmaceutically acceptable co-crystal, tautomer, stereoisomer, solvate, hydrate, polymorph, isotopically enriched derivative, or prodrug thereof; wherein $R^5$, $R^7$, $R^8$, and $X^-$ are as defined herein.

In certain embodiments, the compound of Formula (II) is of Formula (II-i):

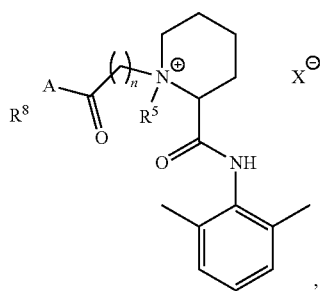

(II-i)

or a pharmaceutically acceptable co-crystal, tautomer, stereoisomer, solvate, hydrate, polymorph, isotopically enriched derivative, or prodrug thereof; wherein $R^5$, $R^8$, A, n, and $X^-$ are as defined herein.

In certain embodiments, the compound of Formula (II) is of Formula (II-i-1):

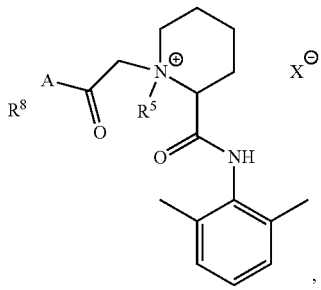

(II-i-1)

or a pharmaceutically acceptable co-crystal, tautomer, stereoisomer, solvate, hydrate, polymorph, isotopically enriched derivative, or prodrug thereof; wherein $R^5$, $R^8$, A, and $X^-$ are as defined herein.

In certain embodiments, the compound of Formula (II) is of Formula (II-j):

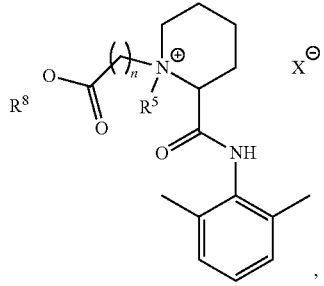

(II-j)

or a pharmaceutically acceptable co-crystal, tautomer, stereoisomer, solvate, hydrate, polymorph, isotopically enriched derivative, or prodrug thereof; wherein $R^5$, $R^8$, n, and $X^-$ are as defined herein.

In certain embodiments, the compound of Formula (II) is of Formula (II-j-1):

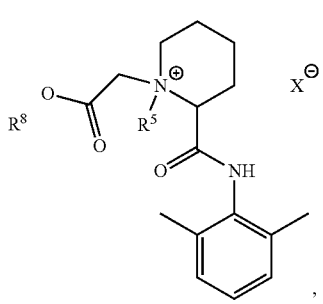

(II-j-1)

or a pharmaceutically acceptable co-crystal, tautomer, stereoisomer, solvate, hydrate, polymorph, isotopically enriched derivative, or prodrug thereof; wherein $R^5$, $R^8$, and $X^-$ are as defined herein.

In certain embodiments, the compound of Formula (I) is of Formula (III):

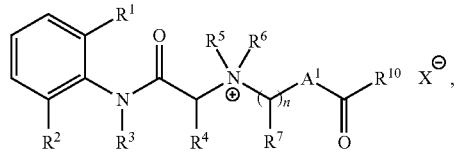

(III)

or a pharmaceutically acceptable co-crystal, tautomer, stereoisomer, solvate, hydrate, polymorph, isotopically enriched derivative, or prodrug thereof; wherein $R^1$, $R^2$, $R^3$, $R^4$, $R^5$, $R^6$, $R^7$, $R^{10}$, $A^1$, n, and $X^-$ are as defined herein.

In certain embodiments, the compound of Formula (I) is of Formula (III-a):

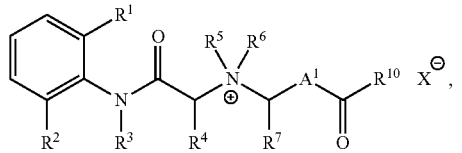

(III-a)

or a pharmaceutically acceptable co-crystal, tautomer, stereoisomer, solvate, hydrate, polymorph, isotopically enriched derivative, or prodrug thereof; wherein $R^1$, $R^2$, $R^3$, $R^4$, $R^5$, $R^6$, $R^7$, $R^{10}$, $A^1$, and $X^-$ are as defined herein.

In certain embodiments, the compound of Formula (III) is of Formula (III-b):

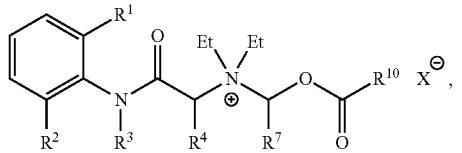

(III-b)

or a pharmaceutically acceptable co-crystal, tautomer, stereoisomer, solvate, hydrate, polymorph, isotopically enriched derivative, or prodrug thereof; wherein $R^1$, $R^2$, $R^3$, $R^4$, $R^7$, $R^{10}$, and $X^-$ are as defined herein.

In certain embodiments, the compound of Formula (III) is of Formula (III-c):

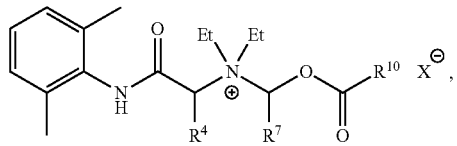
(II-c)

or a pharmaceutically acceptable co-crystal, tautomer, stereoisomer, solvate, hydrate, polymorph, isotopically enriched derivative, or prodrug thereof; wherein $R^4$, $R^7$, $R^{10}$, and $X^-$ are as defined herein.

In certain embodiments, the compound of Formula (III) is of Formula (III-d):

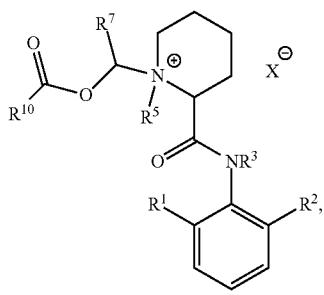
(III-d)

or a pharmaceutically acceptable co-crystal, tautomer, stereoisomer, solvate, hydrate, polymorph, isotopically enriched derivative, or prodrug thereof; wherein $R^1$, $R^2$, $R^3$, $R^5$, $R^7$, $R^{10}$, and $X^-$ are as defined herein.

In certain embodiments, the compound of Formula (III) is of Formula (III-e):

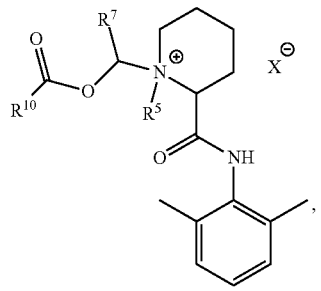
(III-e)

or a pharmaceutically acceptable co-crystal, tautomer, stereoisomer, solvate, hydrate, polymorph, isotopically enriched derivative, or prodrug thereof; wherein $R^5$, $R^7$, $R^{10}$, and $X^-$ are as defined herein.

In certain embodiments, the compound of Formula (III) is of Formula (III-f):

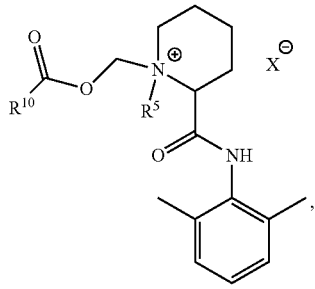
(III-f)

or a pharmaceutically acceptable co-crystal, tautomer, stereoisomer, solvate, hydrate, polymorph, isotopically enriched derivative, or prodrug thereof; wherein $R^5$, $R^{10}$, and $X^-$ are as defined herein.

In certain embodiments, the compound of Formula (I) is one of the following compounds, or a pharmaceutically acceptable co-crystal, tautomer, stereoisomer, solvate, hydrate, polymorph, isotopically enriched derivative, or prodrug thereof:

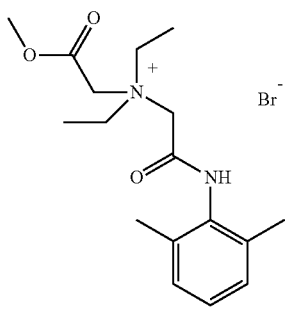
1

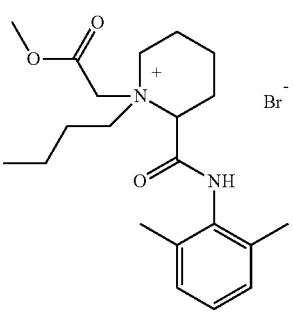
2

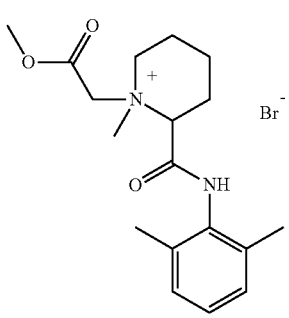
3

4
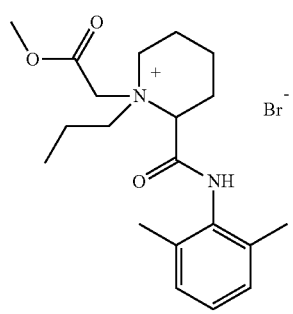
5
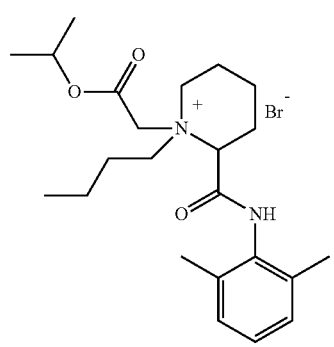
6
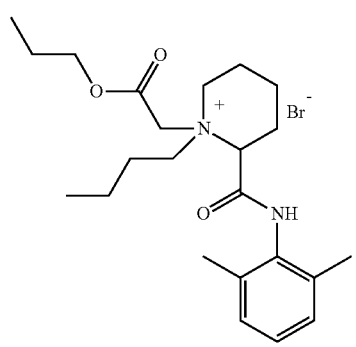
7
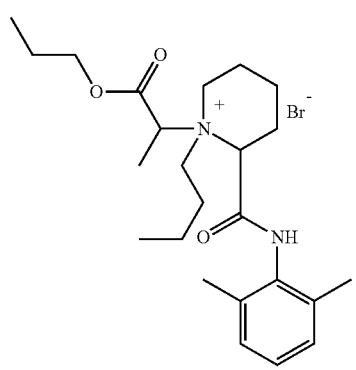
8
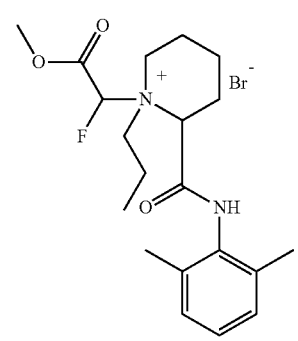
9
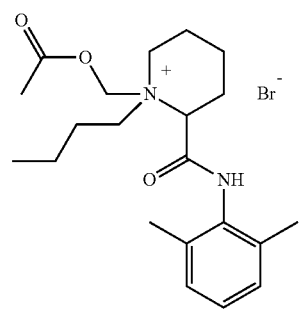
10
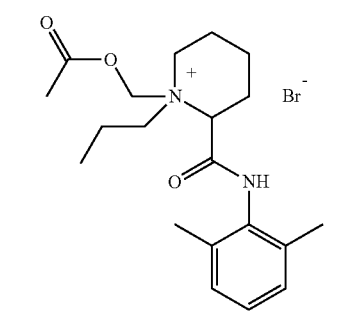
11
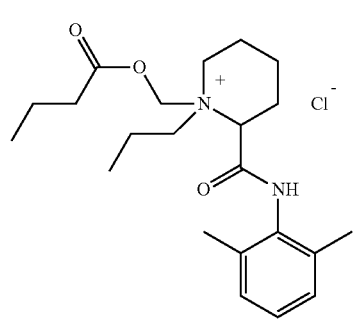
12
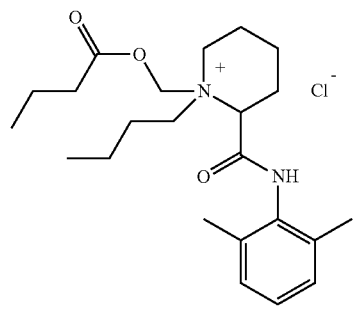

13
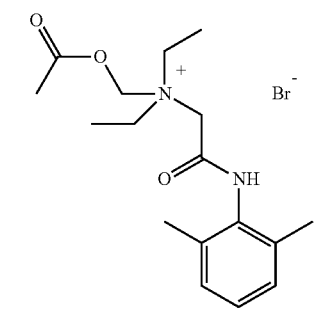
14
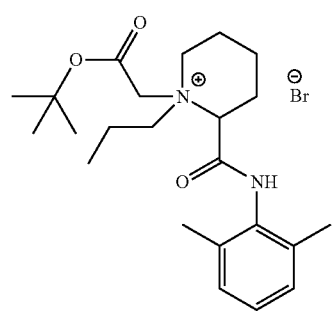
15
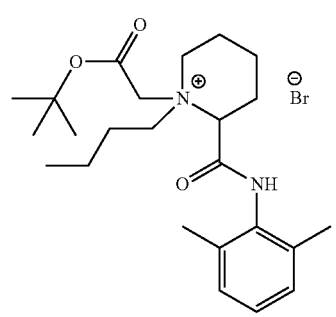
16
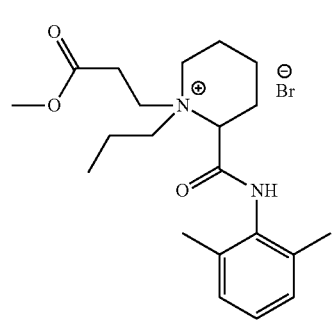
17
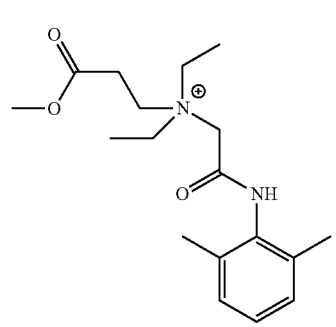
18
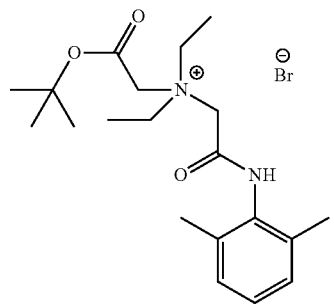
19
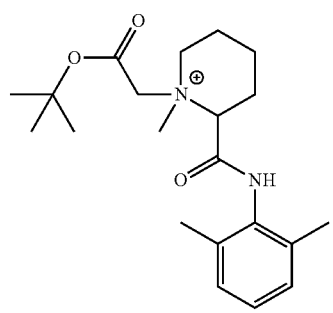
20
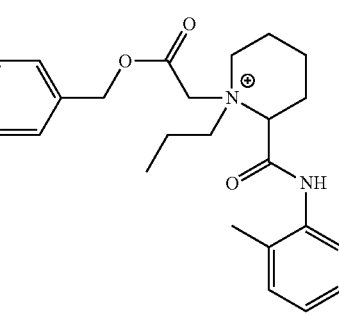
21
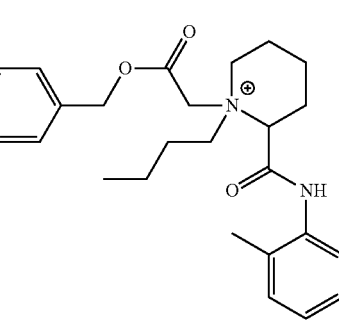
22
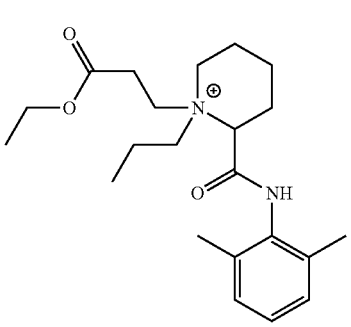

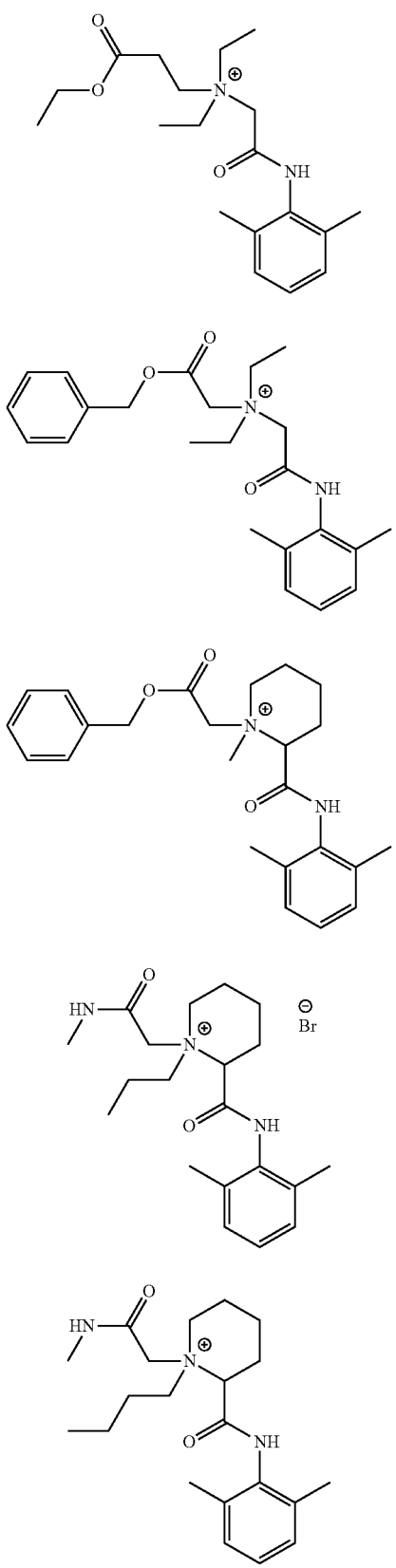
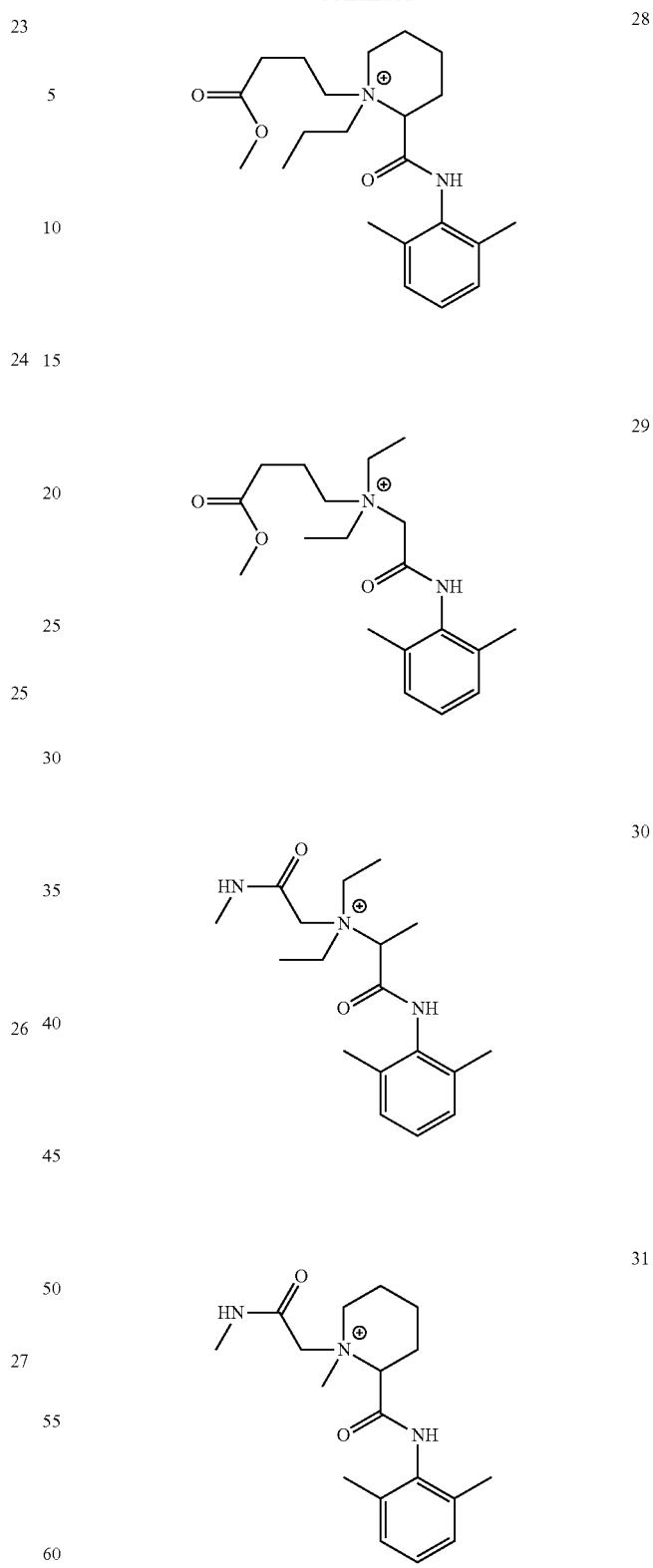
In certain embodiments, the compound of Formula (I) is one of the following compounds, or a pharmaceutically acceptable co-crystal, tautomer, stereoisomer, solvate, hydrate, polymorph, isotopically enriched derivative, or prodrug thereof:

1
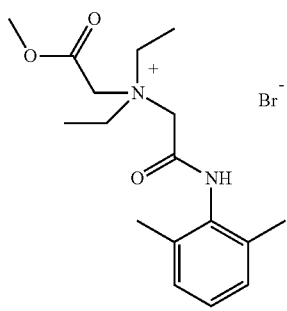
2
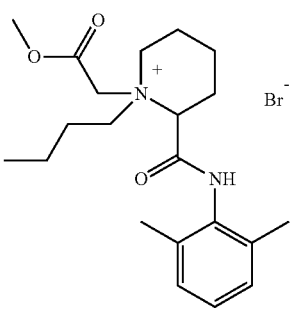
3
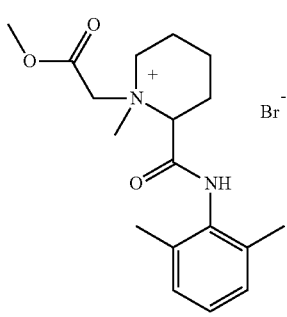
4
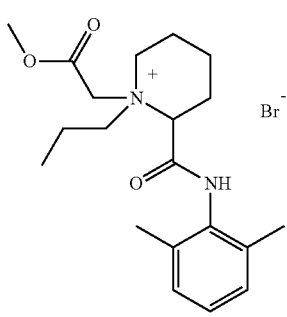
5
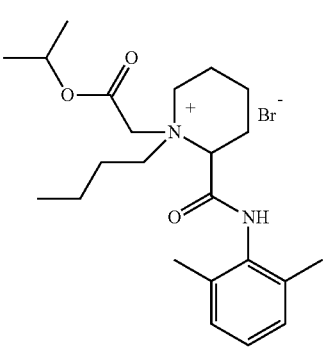
-continued
6
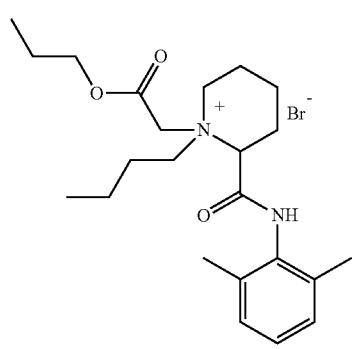
7
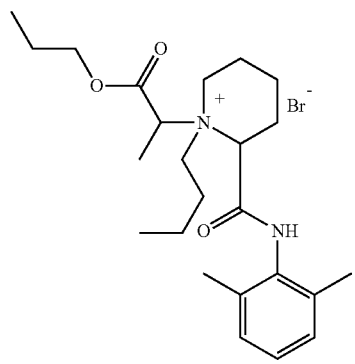
8
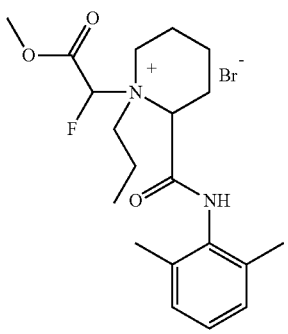
9
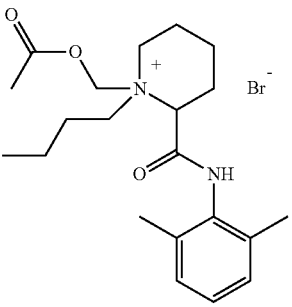
10
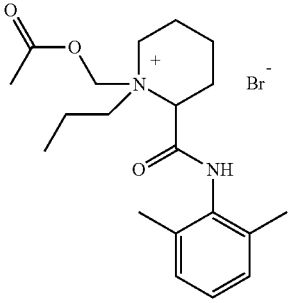

11
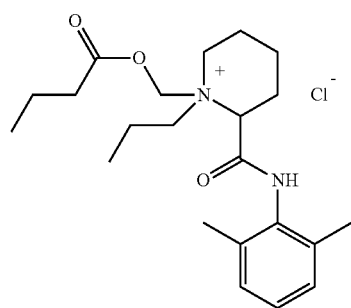
12
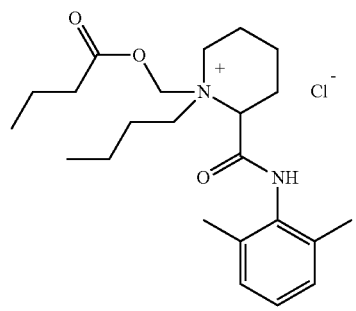
14
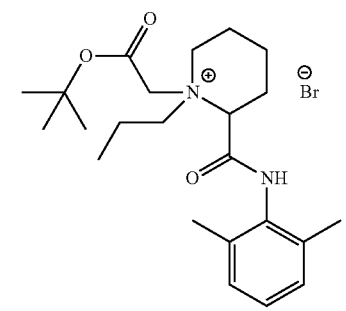
15
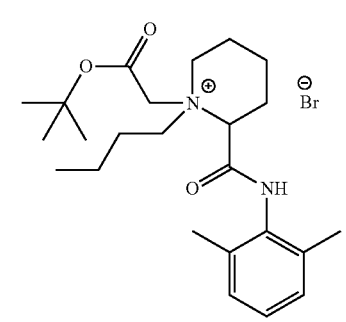
16
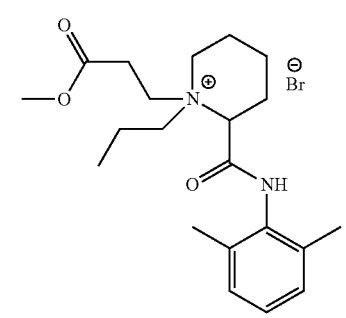
17
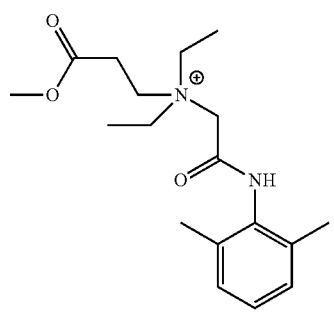
18
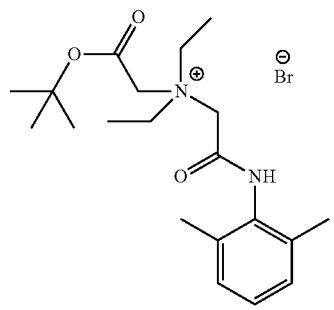
19
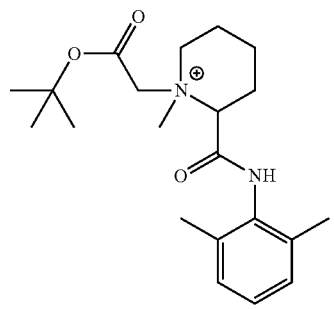
20
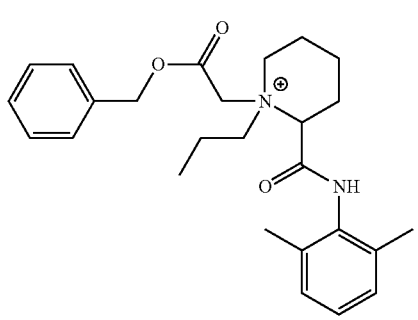
21
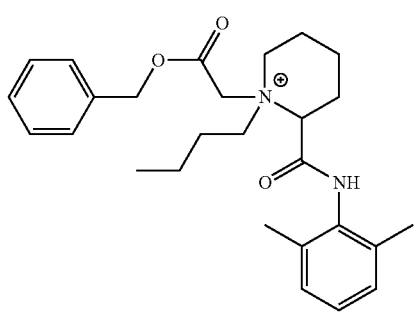

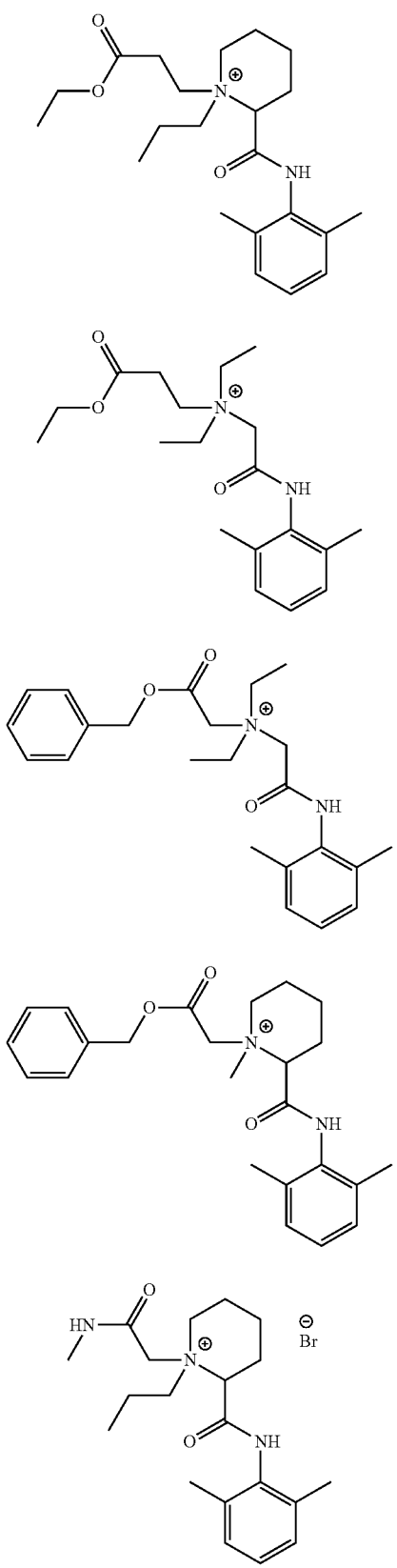
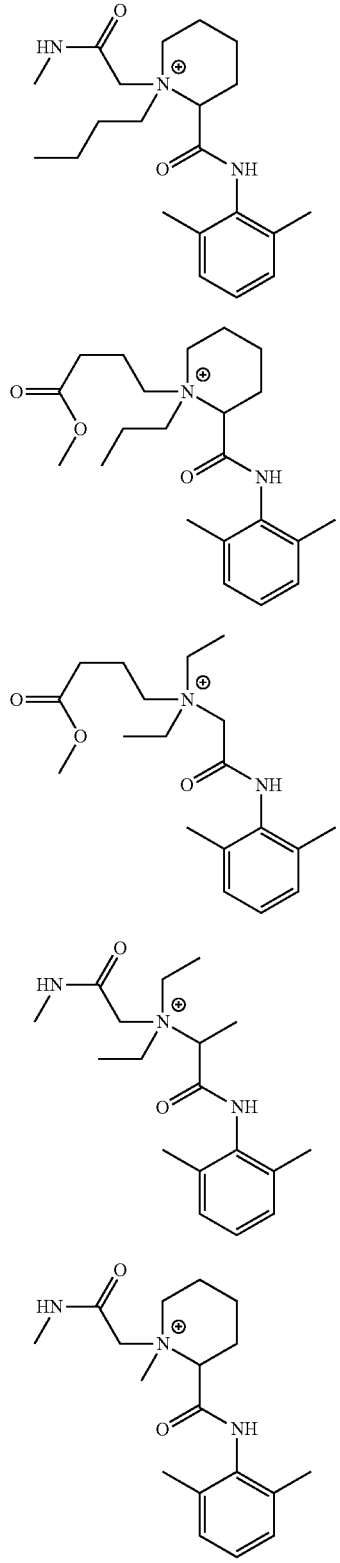
In certain embodiments, the compound of Formula (I) is one of the following compounds, or a pharmaceutically acceptable co-crystal, tautomer, stereoisomer, solvate, hydrate, polymorph, isotopically enriched derivative, or prodrug thereof:

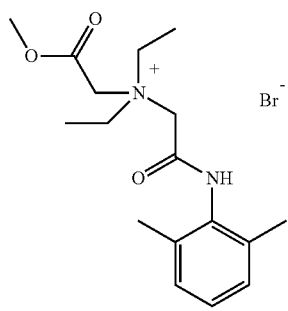
1
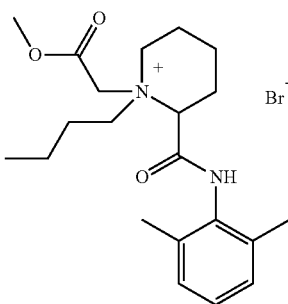
2
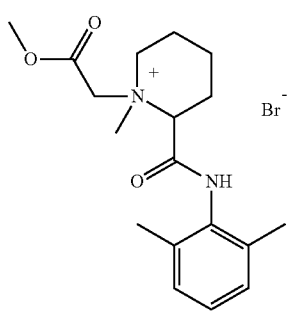
3
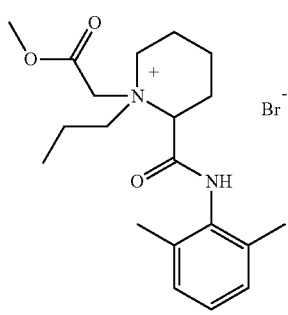
4
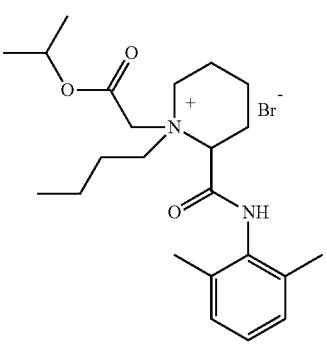
5
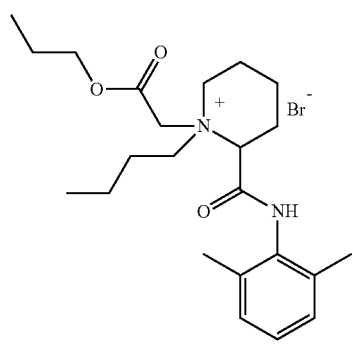
6
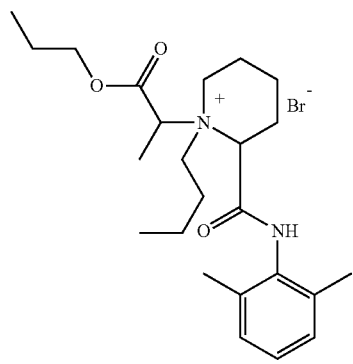
7
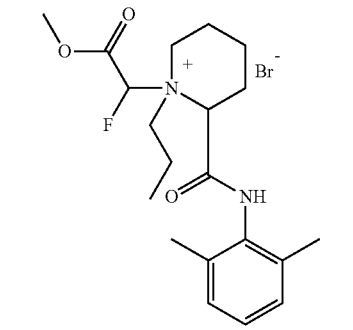
8
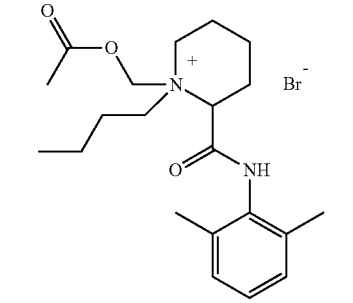
9
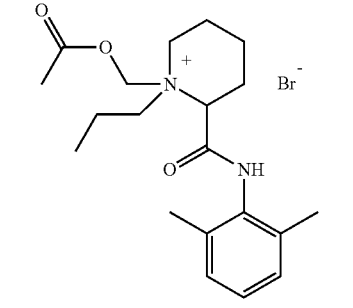
10

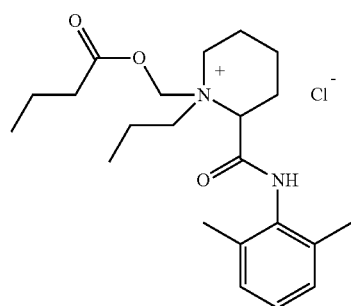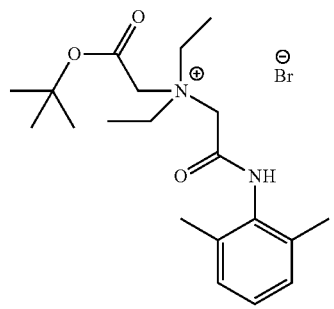

23
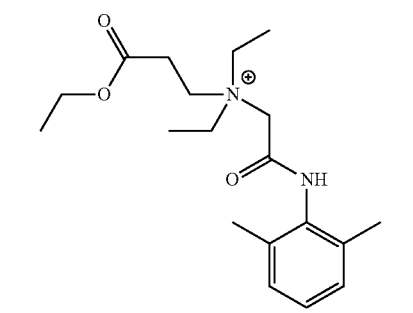
24
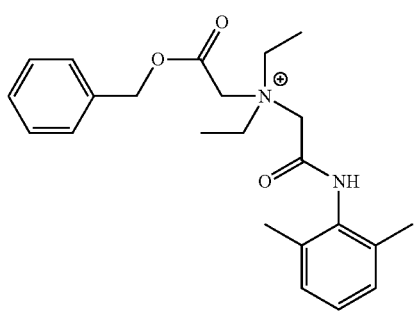
25
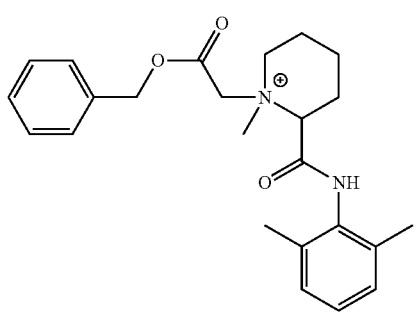
26
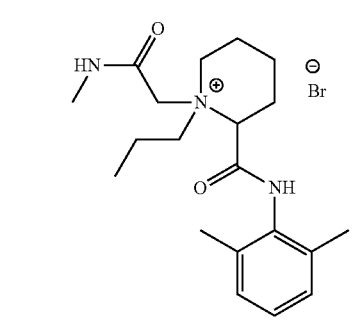
27
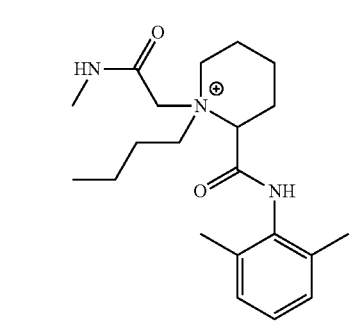
28
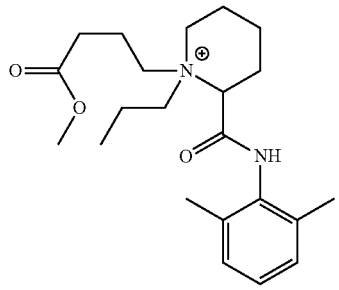
29
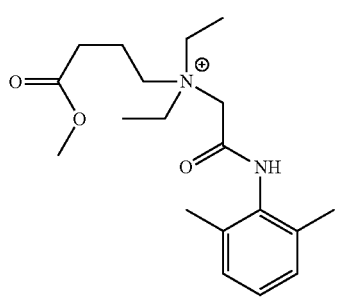
30
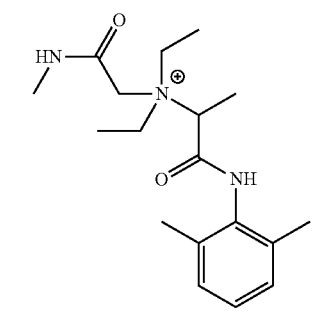
31
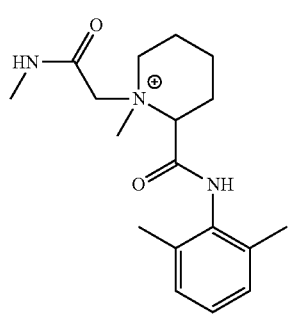
In certain embodiments, the compound of Formula (I) is one of the following compounds, or a pharmaceutically acceptable co-crystal, tautomer, stereoisomer, solvate, hydrate, polymorph, isotopically enriched derivative, or prodrug thereof:

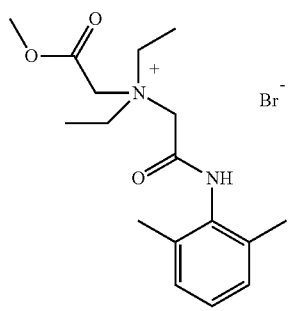
1
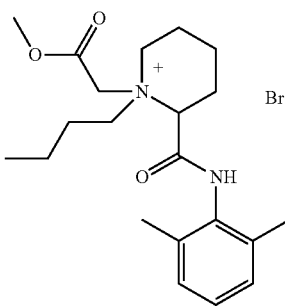
2
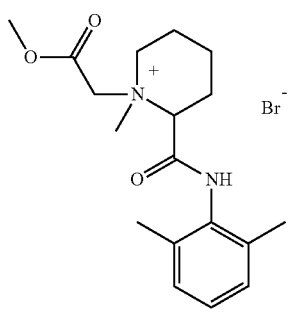
3
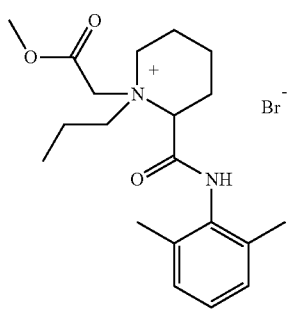
4
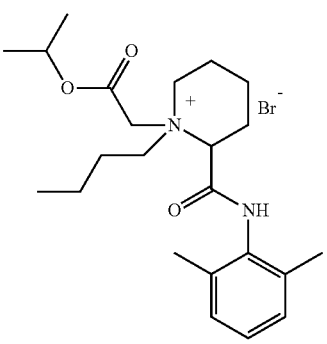
5
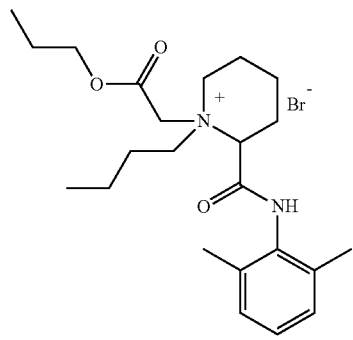
6
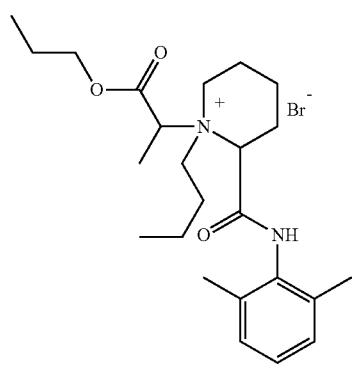
7
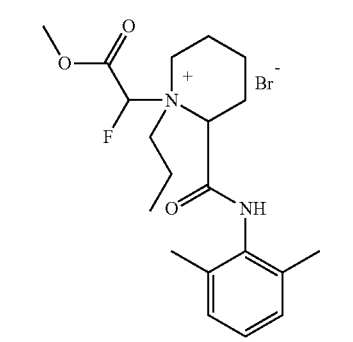
8
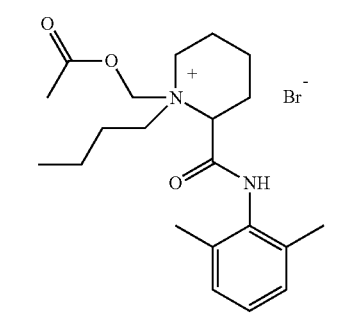
9
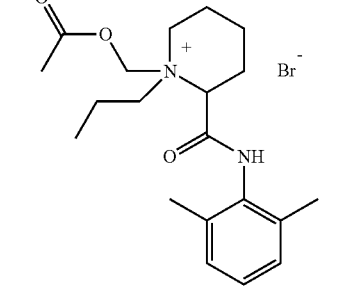
10

75
-continued
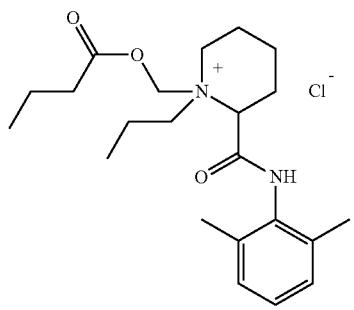
11
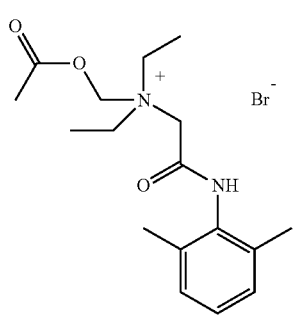
12
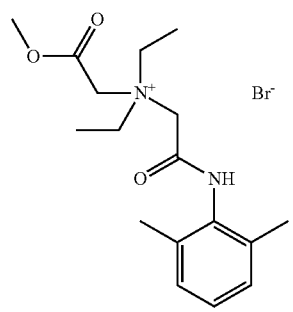
13
In certain embodiments, the compound of Formula (I) is one of the following compounds, or a pharmaceutically acceptable co-crystal, tautomer, stereoisomer, solvate, hydrate, polymorph, isotopically enriched derivative, or prodrug thereof:
1
76
-continued
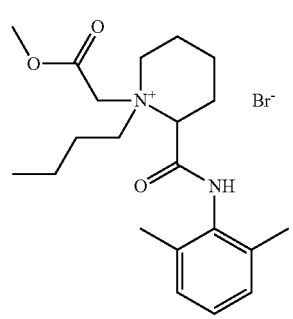
2
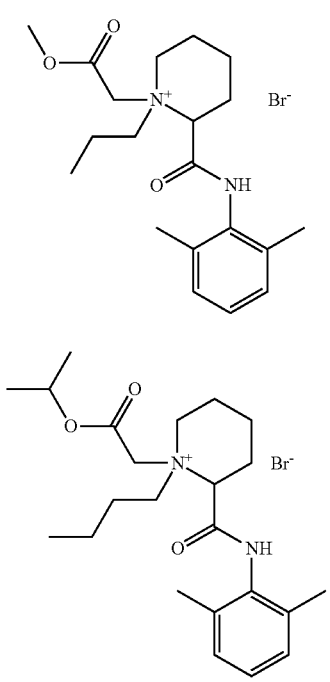

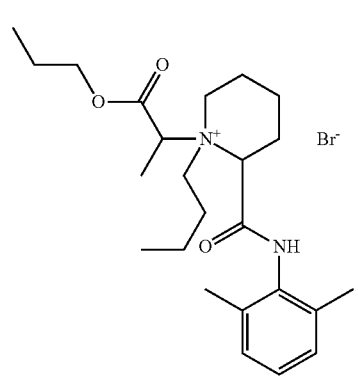
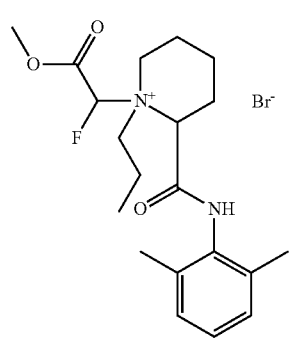
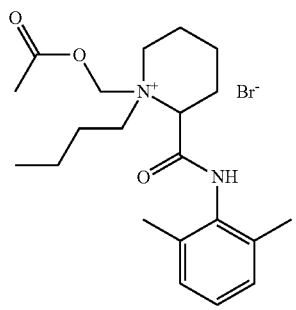
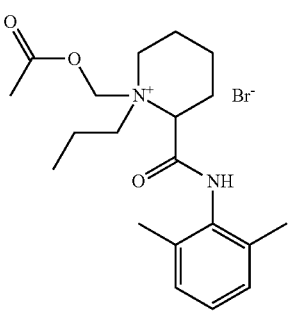
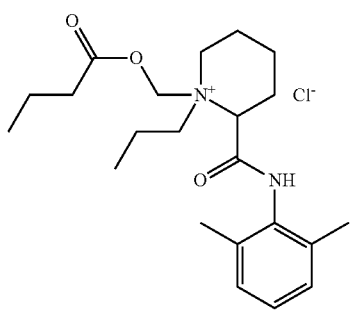
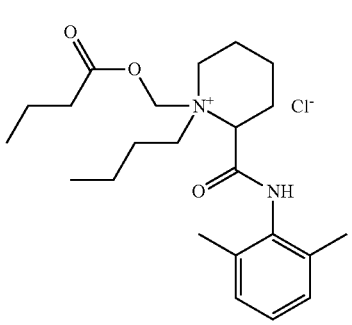
In certain embodiments, the compound of Formula (I) is one of the following compounds, or a pharmaceutically acceptable co-crystal, tautomer, stereoisomer, solvate, hydrate, polymorph, isotopically enriched derivative, or prodrug thereof:
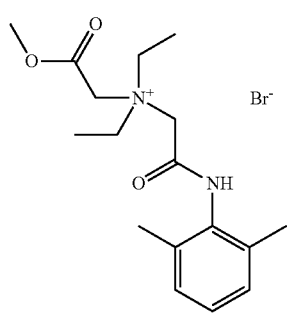
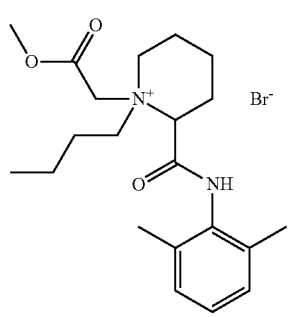
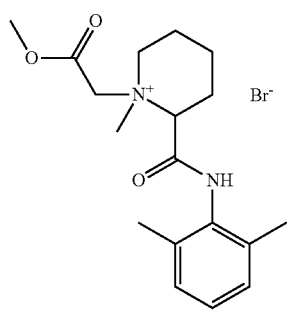

-continued
4
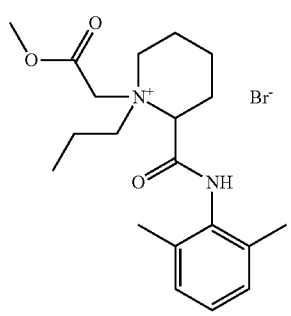
5
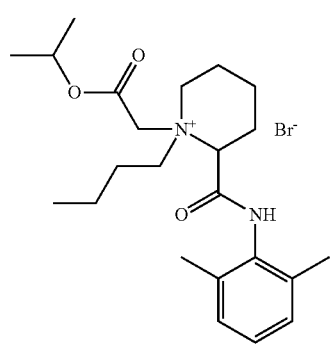
6
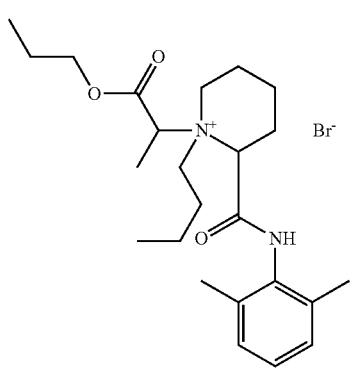
7
-continued
8
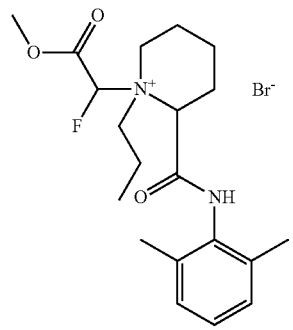
9
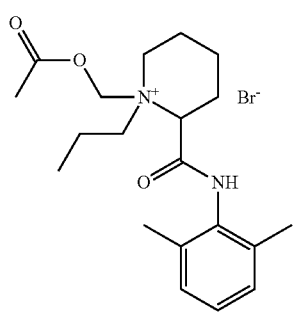
10
11
In certain embodiments, the compound of Formula (I) is one of the following compounds, or a pharmaceutically acceptable co-crystal, tautomer, stereoisomer, solvate, hydrate, polymorph, isotopically enriched derivative, or prodrug thereof:

1
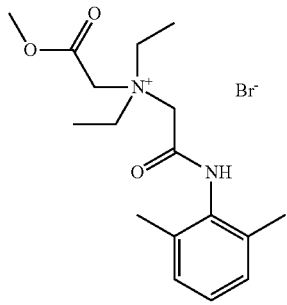
2
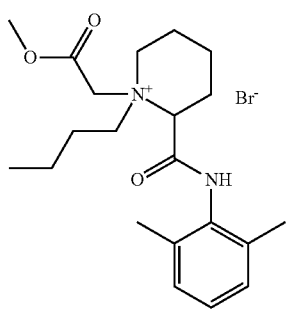
3
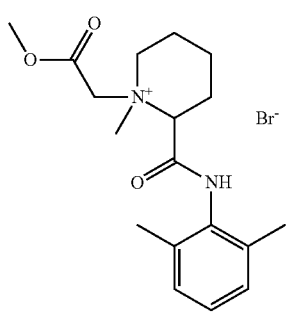
4
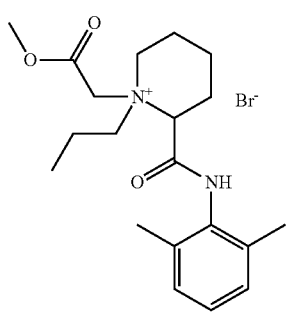
9
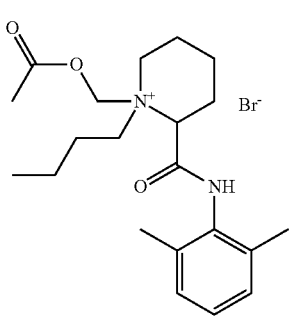
10
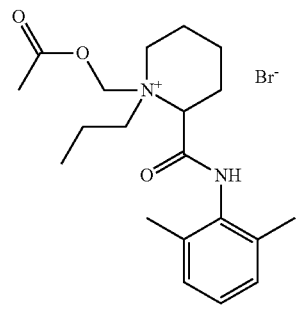
11
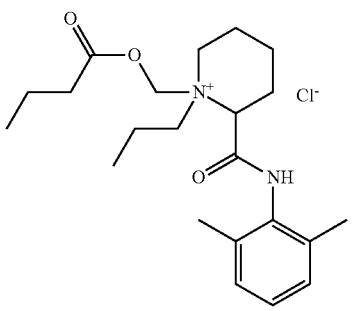
12
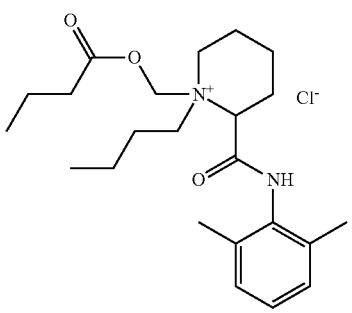
13
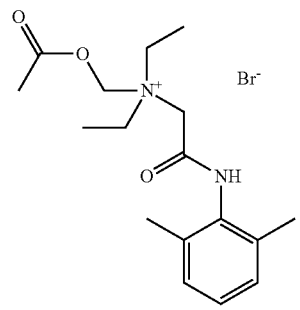
In certain embodiments, the compound of Formula (I) is one of the following compounds, or a pharmaceutically acceptable co-crystal, tautomer, stereoisomer, solvate, hydrate, polymorph, isotopically enriched derivative, or prodrug thereof:

1
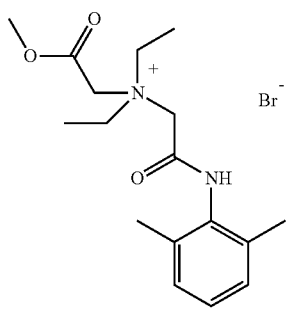
2
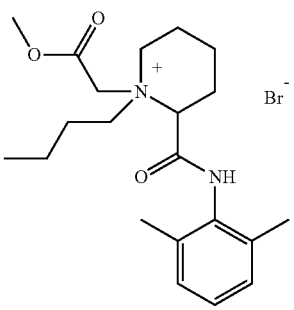
3
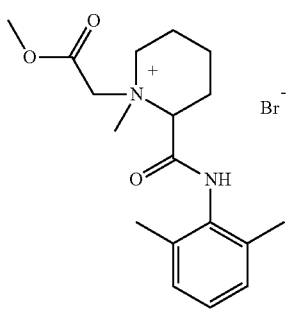
4
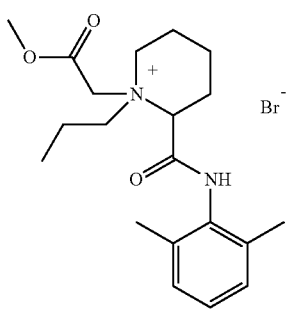
9
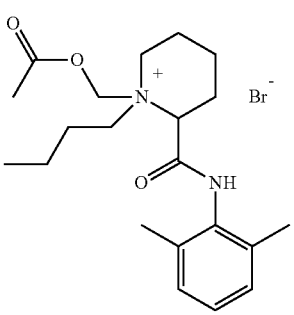
10
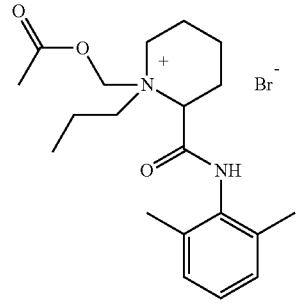
11
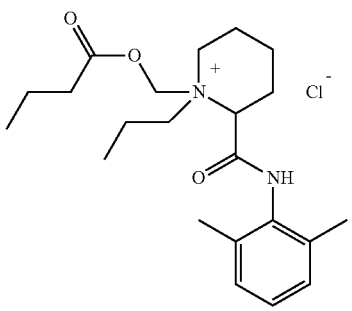
12
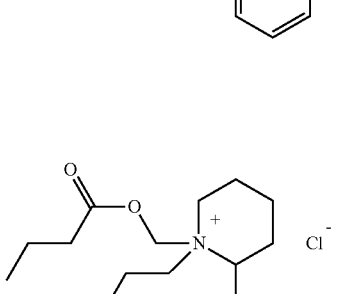
In certain embodiments, the compound of Formula (I) is one of the following compounds, or a pharmaceutically acceptable co-crystal, tautomer, stereoisomer, solvate, hydrate, polymorph, isotopically enriched derivative, or prodrug thereof:
1
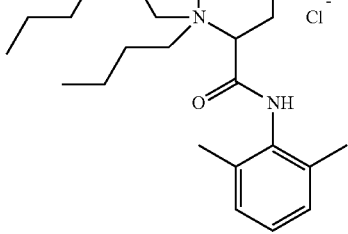

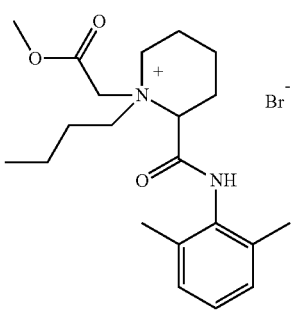

2

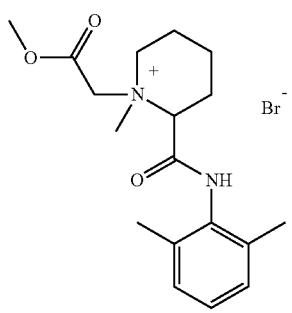

3

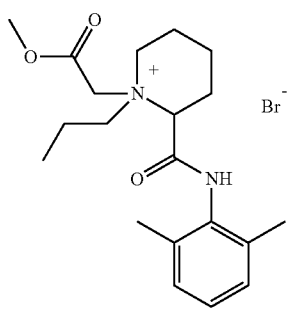

4

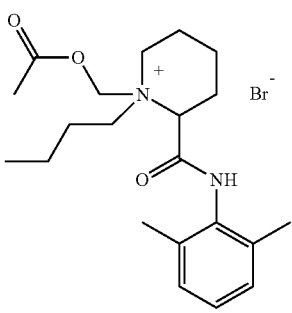

9

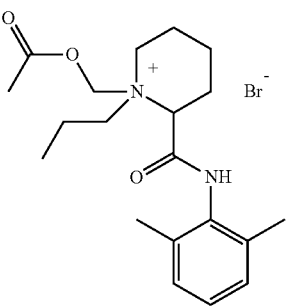

10

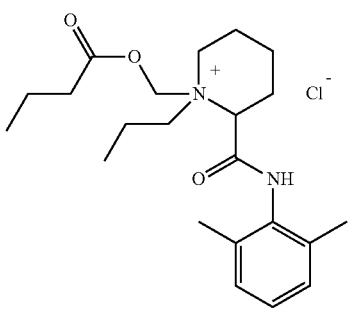

11

In certain embodiments, the compound of Formula (I) is one of the following compounds, or a pharmaceutically acceptable co-crystal, tautomer, stereoisomer, solvate, hydrate, polymorph, isotopically enriched derivative, or prodrug thereof:

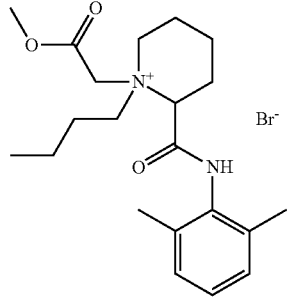

2

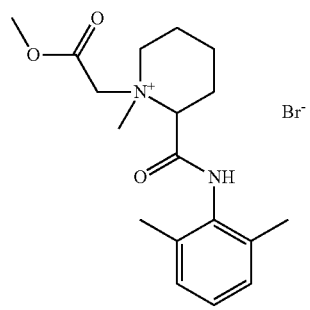

3

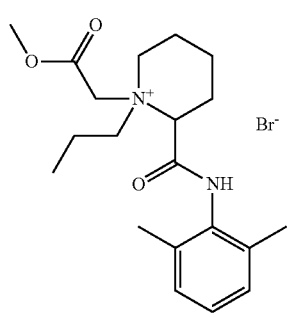

4

In certain embodiments, the compound of Formula (I) is the following compound, or a pharmaceutically acceptable co-crystal, tautomer, stereoisomer, solvate, hydrate, polymorph, isotopically enriched derivative, or prodrug thereof:

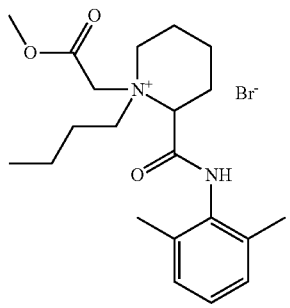

In certain embodiments, the compound of Formula (I) is a mixture of the following compounds, or pharmaceutically acceptable co-crystals, tautomers, solvates, hydrates, polymorphs, isotopically enriched derivatives, or prodrugs thereof:

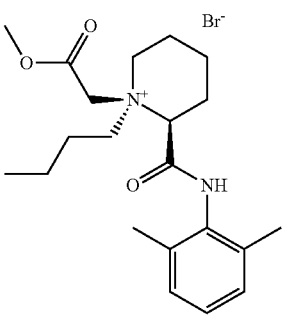

2a

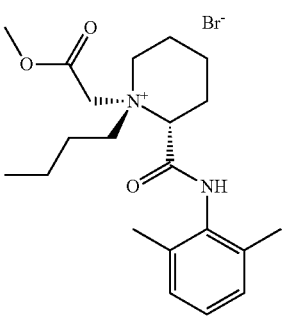

2a

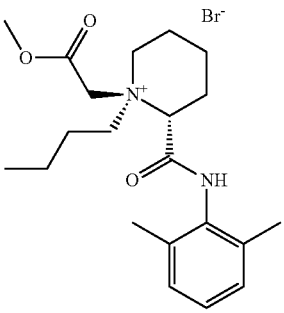

2b

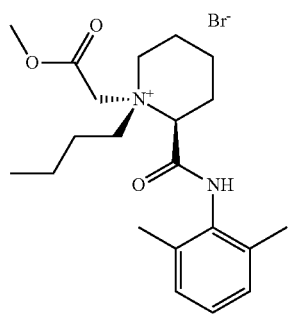

2b

In certain embodiments, the compound of Formula (I) is a mixture of the following compounds, or pharmaceutically acceptable co-crystals, tautomers, solvates, hydrates, polymorphs, isotopically enriched derivatives, or prodrugs thereof:

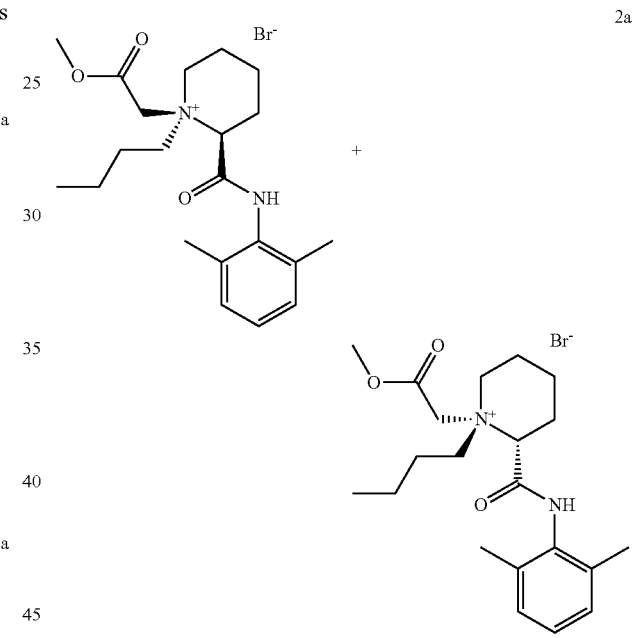

2a

+

2b

In certain embodiments, the compound of Formula (I) is a mixture of the following compounds, or pharmaceutically acceptable co-crystals, tautomers, solvates, hydrates, polymorphs, isotopically enriched derivatives, or prodrugs thereof:

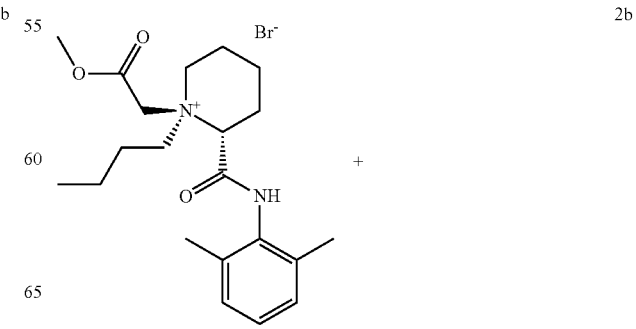

2b

+

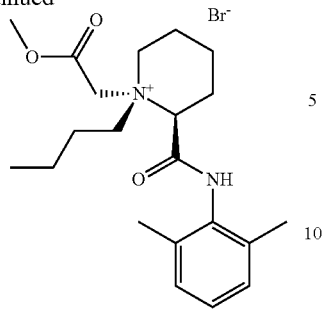

In certain embodiments, the compound of Formula (I) is the following compound, or a pharmaceutically acceptable co-crystal, tautomer, stereoisomer, solvate, hydrate, polymorph, isotopically enriched derivative, or prodrug thereof:

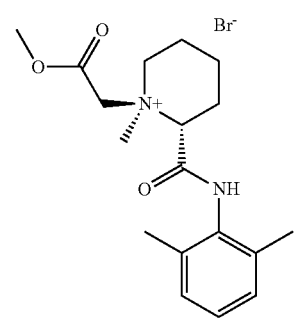

3

In certain embodiments, the compound of Formula (I) is a mixture of the following compounds, or pharmaceutically acceptable co-crystals, tautomers, solvates, hydrates, polymorphs, isotopically enriched derivatives, or prodrugs thereof:

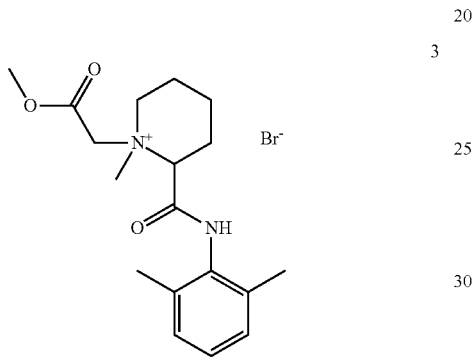

In certain embodiments, the compound of Formula (I) is a mixture of the following compounds, or pharmaceutically acceptable co-crystals, tautomers, solvates, hydrates, polymorphs, isotopically enriched derivatives, or prodrugs thereof:

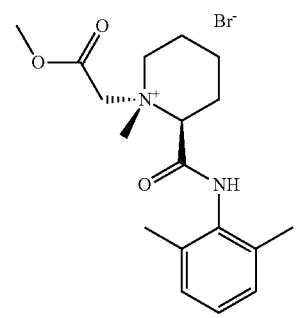

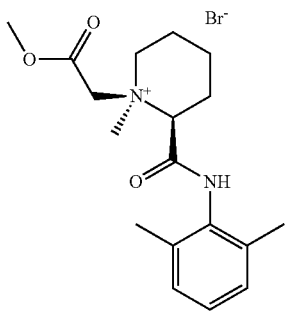

In certain embodiments, the compound of Formula (I) is a mixture of the following compounds, or pharmaceutically acceptable co-crystals, tautomers, solvates, hydrates, polymorphs, isotopically enriched derivatives, or prodrugs thereof:

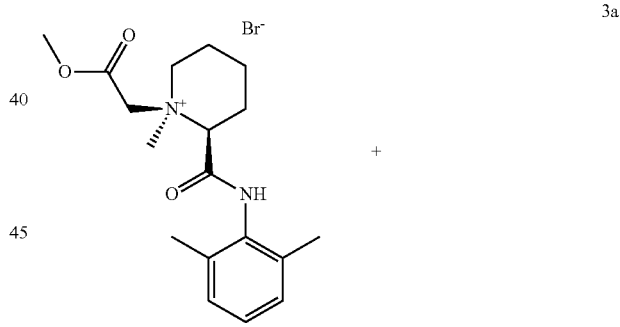

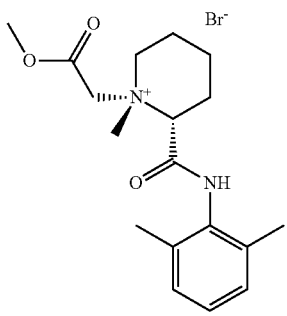

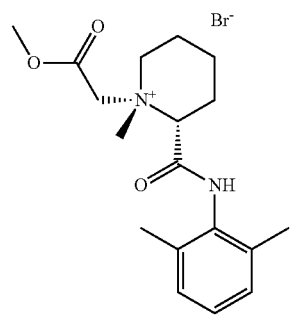

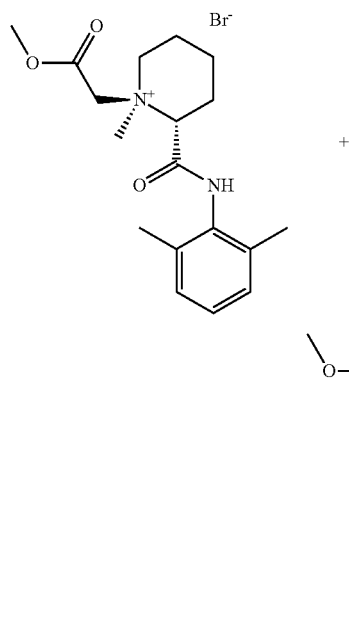

3b

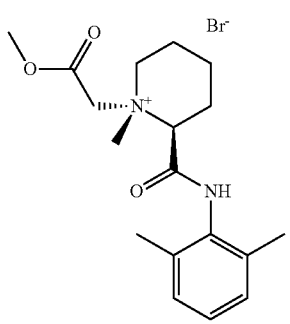

In certain embodiments, the compound of Formula (I) is the following compound, or a pharmaceutically acceptable co-crystal, tautomer, stereoisomer, solvate, hydrate, polymorph, isotopically enriched derivative, or prodrug thereof:

4

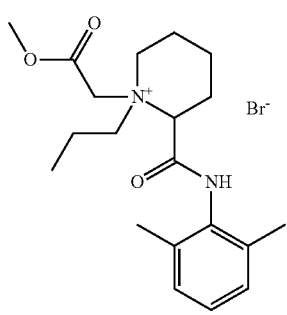

In certain embodiments, the compound of Formula (I) is the following compound, or a pharmaceutically acceptable co-crystal, tautomer, stereoisomer, solvate, hydrate, polymorph, isotopically enriched derivative, or prodrug thereof:

4S

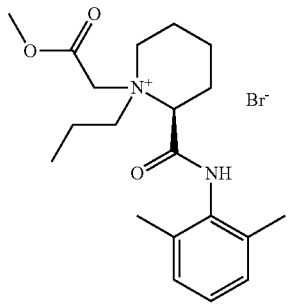

In certain embodiments, the compound of Formula (I) is the following compound, or a pharmaceutically acceptable co-crystal, tautomer, solvate, hydrate, polymorph, isotopically enriched derivative, or prodrug thereof:

4Sa

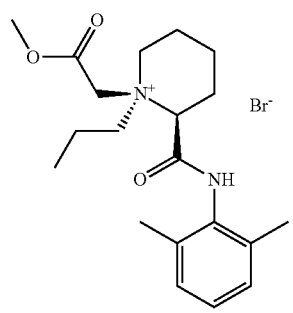

In certain embodiments, the compound of Formula (I) is the following compound, or a pharmaceutically acceptable co-crystal, tautomer, solvate, hydrate, polymorph, isotopically enriched derivative, or prodrug thereof:

4Sb

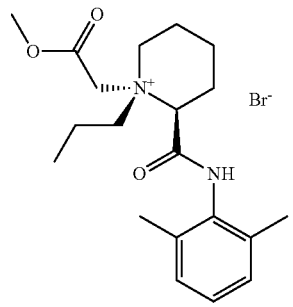

In certain embodiments, the compound of Formula (I) is a mixture of the following compounds, or pharmaceutically acceptable co-crystals, tautomers, solvates, hydrates, polymorphs, isotopically enriched derivatives, or prodrugs thereof:

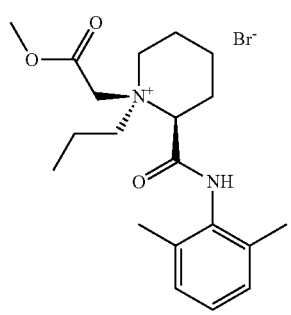

+

In certain embodiments, the compound of Formula (I) is the following compound, or a pharmaceutically acceptable co-crystal, tautomer, stereoisomer, solvate, hydrate, polymorph, isotopically enriched derivative, or prodrug thereof:

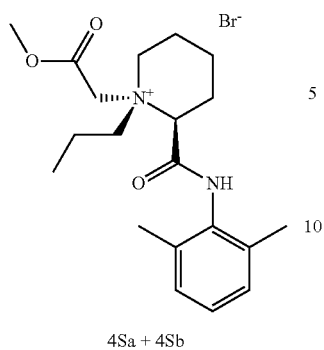

4Sa + 4Sb

In certain embodiments, the compound of Formula (I) is the following compound, or a pharmaceutically acceptable co-crystal, tautomer, stereoisomer, solvate, hydrate, polymorph, isotopically enriched derivative, or prodrug thereof:

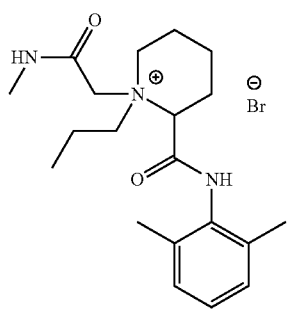

26

In certain embodiments, the compound of Formula (I) is the following compound, or a pharmaceutically acceptable co-crystal, tautomer, stereoisomer, solvate, hydrate, polymorph, isotopically enriched derivative, or prodrug thereof:

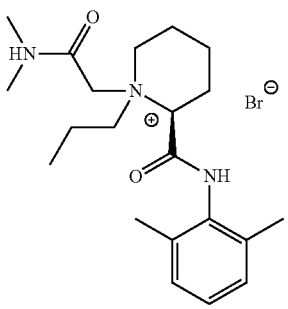

26S

In certain embodiments, the compound of Formula (I) is the following compound, or a pharmaceutically acceptable co-crystal, tautomer, solvate, hydrate, polymorph, isotopically enriched derivative, or prodrug thereof:

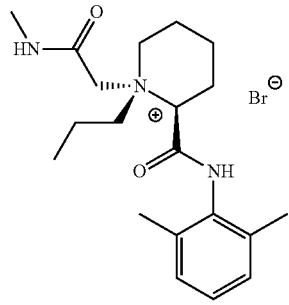

26Sa

In certain embodiments, the compound of Formula (I) is the following compound, or a pharmaceutically acceptable co-crystal, tautomer, solvate, hydrate, polymorph, isotopically enriched derivative, or prodrug thereof:

26Sb

In certain embodiments, the compound of Formula (I) is a mixture of the following compounds, or pharmaceutically acceptable co-crystals, tautomers, solvates, hydrates, polymorphs, isotopically enriched derivatives, or prodrugs thereof:

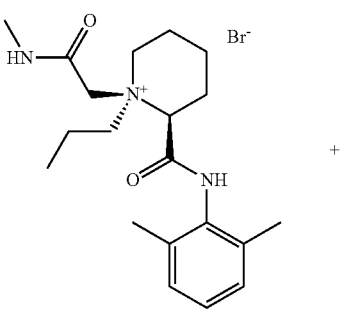

+

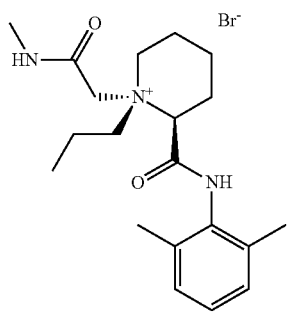

26Sa + 26Sb

In certain embodiments, the compound of Formula (I) is not one or more of the following compounds:
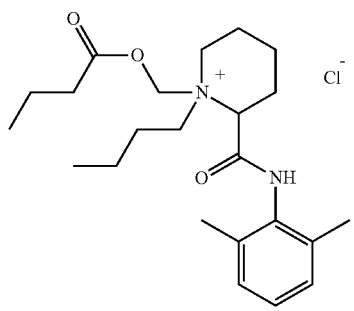
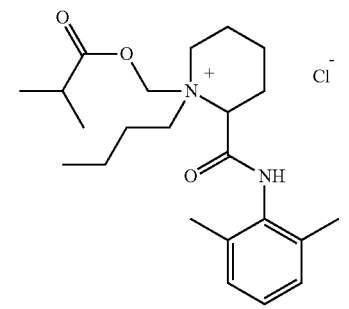
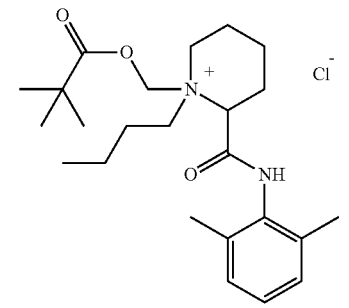
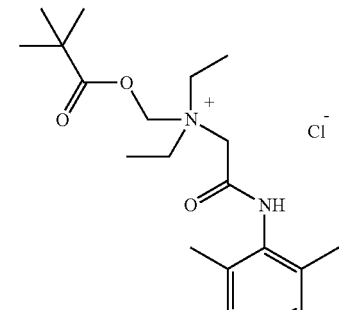
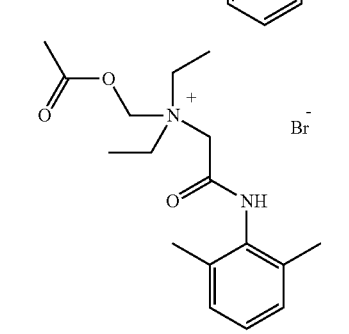
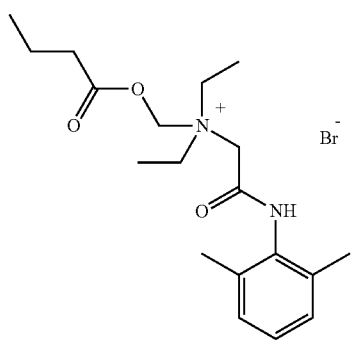
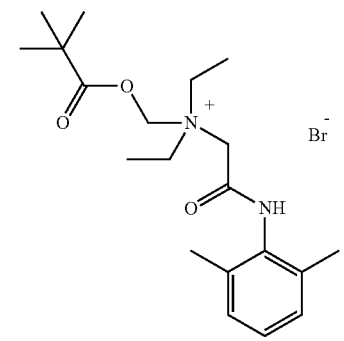
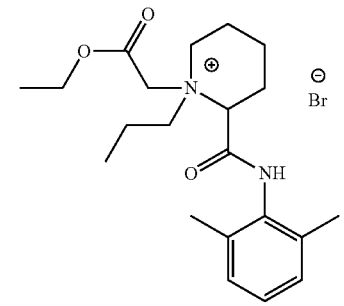
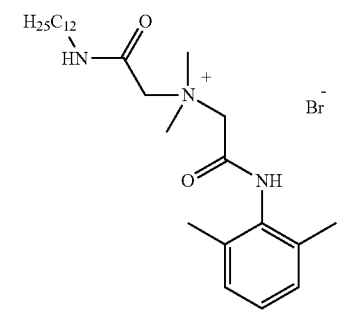
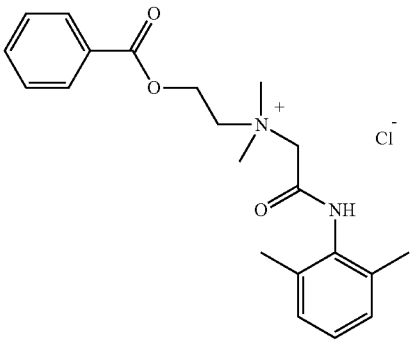
In certain embodiments, the compound of Formula (II) is one of the following compounds, or a pharmaceutically acceptable co-crystal, tautomer, stereoisomer, solvate, hydrate, polymorph, isotopically enriched derivative, or prodrug thereof:
1
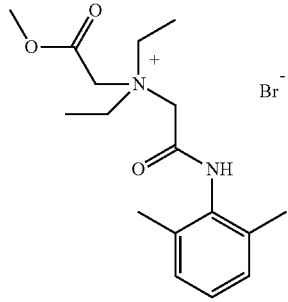
2
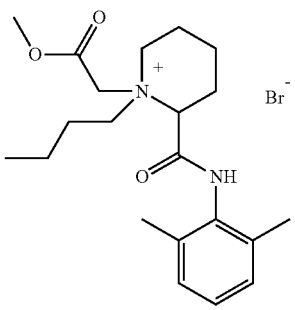
3
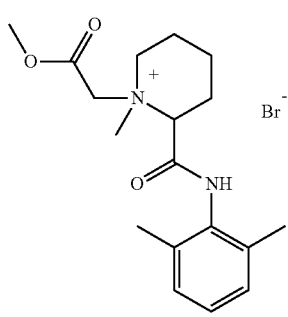
4
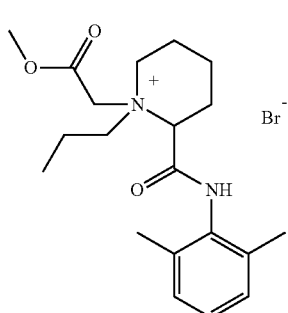
-continued
5
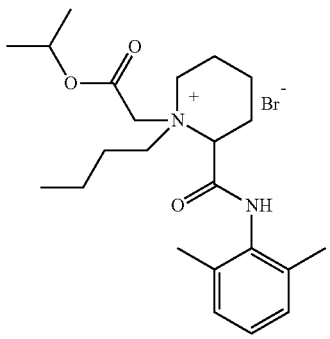
6
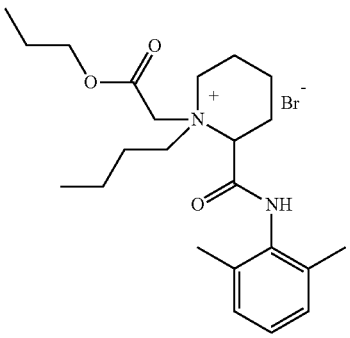
7
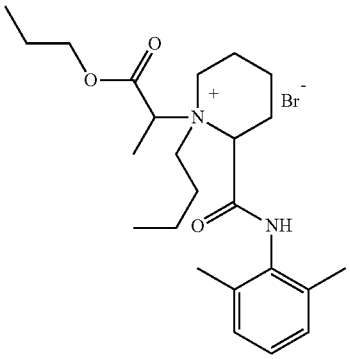
8
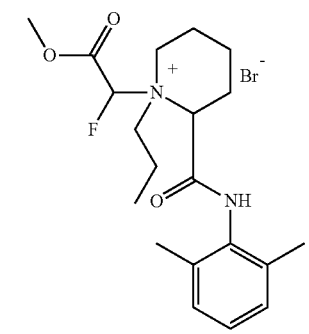

14
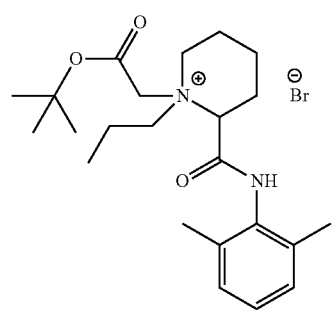
15
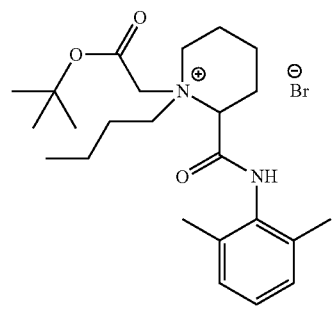
16
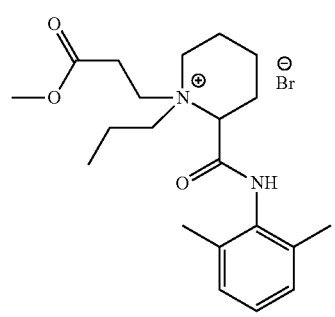
17
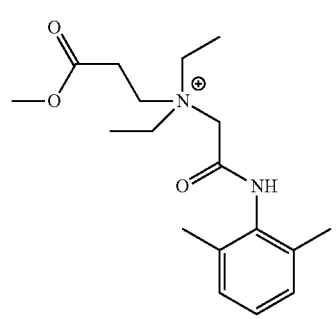
18
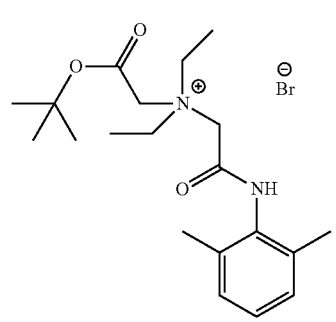
19
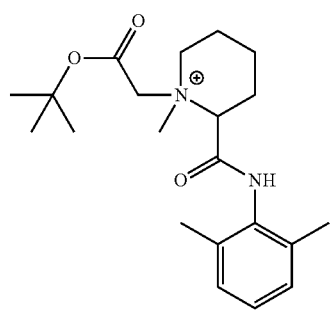
20
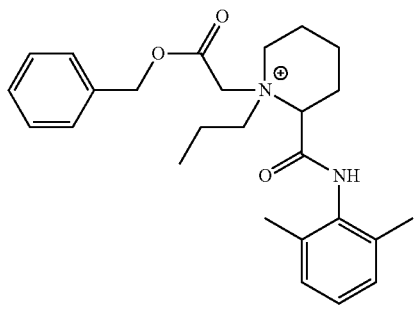
21
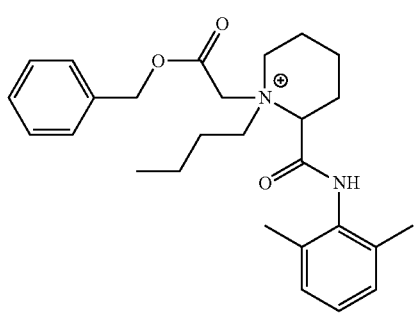
22
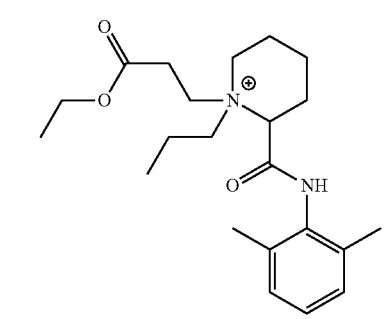
23
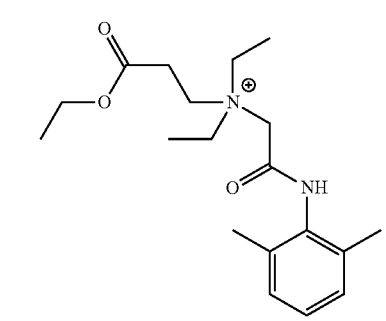

24
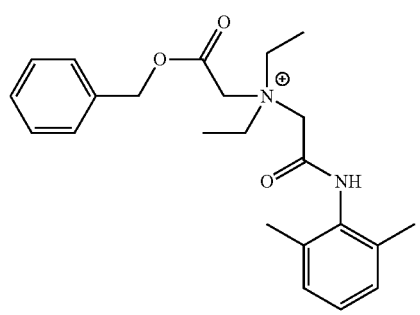
25
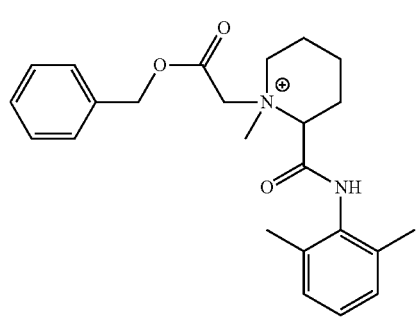
26
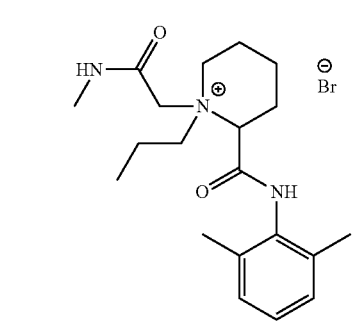
27
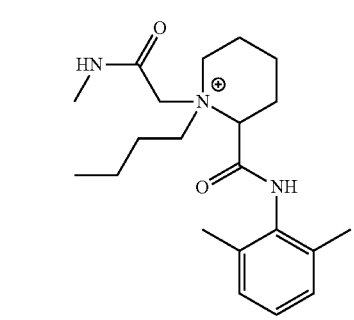
28
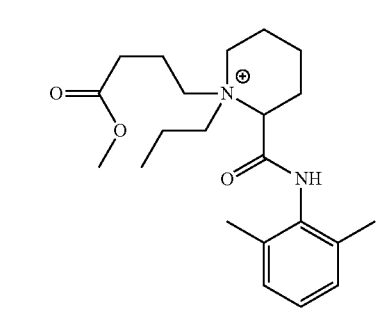
29
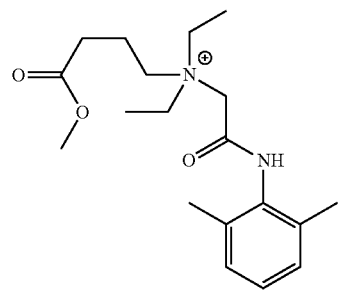
30
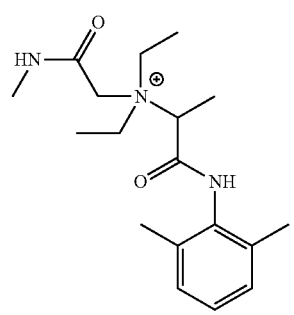
31
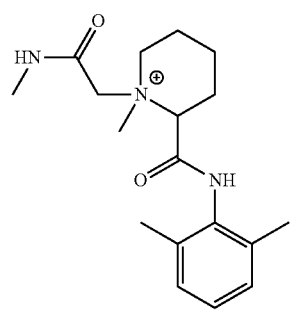
In certain embodiments, the compound of Formula (II) is one of the following compounds, or a pharmaceutically acceptable co-crystal, tautomer, stereoisomer, solvate, hydrate, polymorph, isotopically enriched derivative, or prodrug thereof:
1
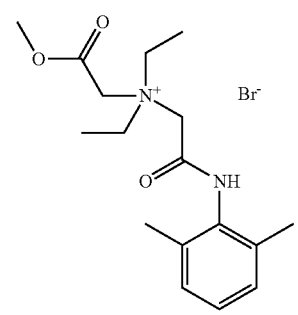

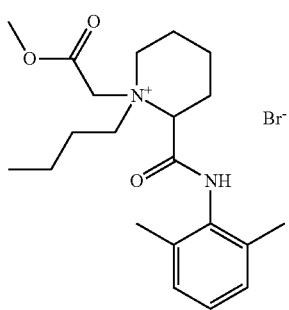
2
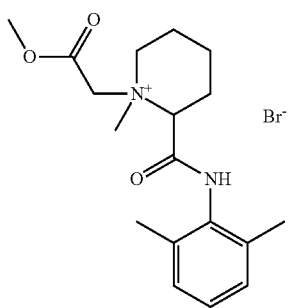
3
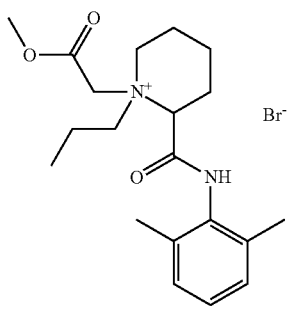
4
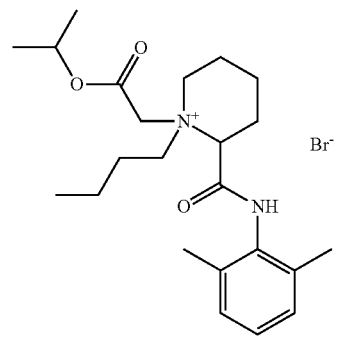
5
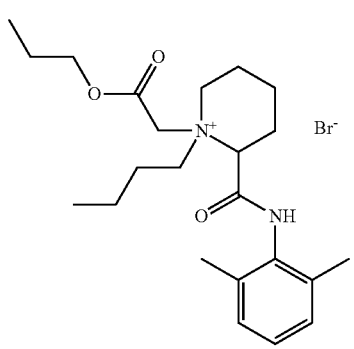
6
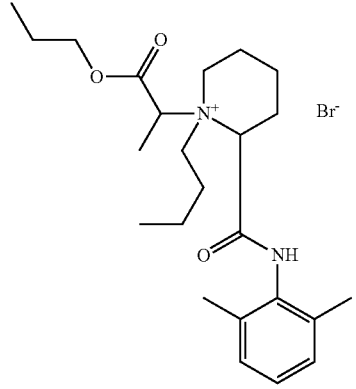
7
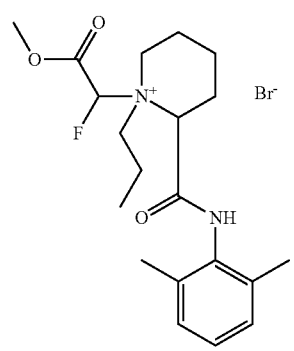
8
In certain embodiments, the compound of Formula (II) is one of the following compounds, or a pharmaceutically acceptable co-crystal, tautomer, stereoisomer, solvate, hydrate, polymorph, isotopically enriched derivative, or prodrug thereof:
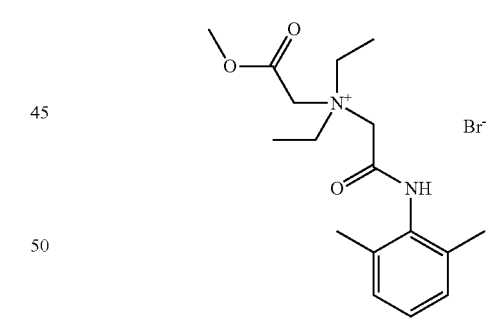
1
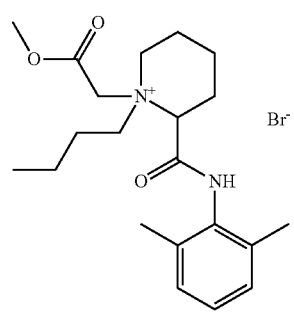
2

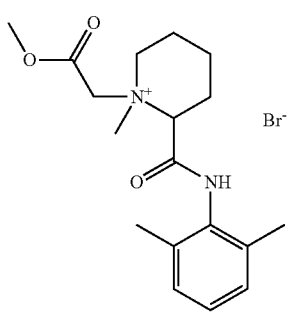

3

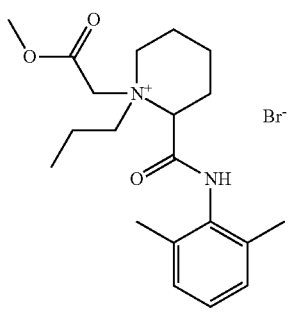

4

In certain embodiments, the compound of Formula (II) is one of the following compounds, or a pharmaceutically acceptable co-crystal, tautomer, stereoisomer, solvate, hydrate, polymorph, isotopically enriched derivative, or prodrug thereof:

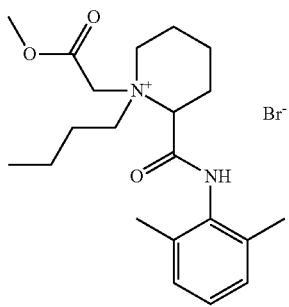

2

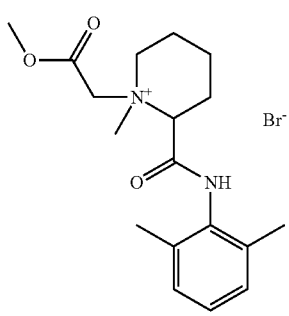

3

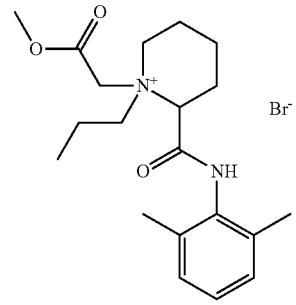

4

In certain embodiments, the compound of Formula (II) is the following compound, or a pharmaceutically acceptable co-crystal, tautomer, stereoisomer, solvate, hydrate, polymorph, isotopically enriched derivative, or prodrug thereof:

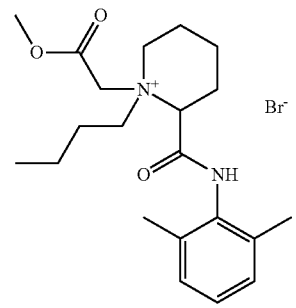

2

In certain embodiments, the compound of Formula (II) is a mixture of the following compounds, or pharmaceutically acceptable co-crystals, tautomers, solvates, hydrates, polymorphs, isotopically enriched derivatives, or prodrugs thereof:

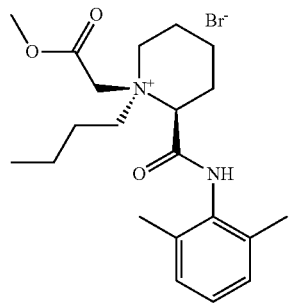

2a

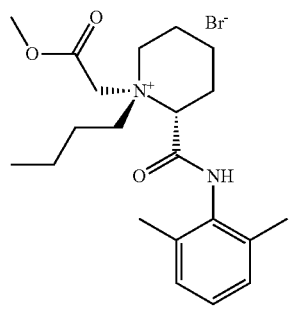

2a

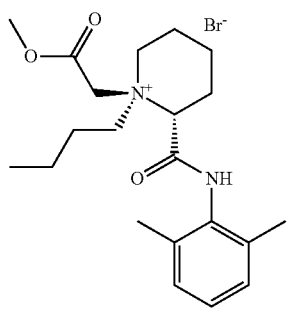

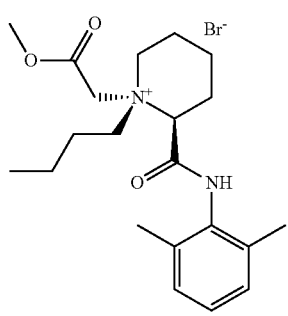

In certain embodiments, the compound of Formula (II) is a mixture of the following compounds, or pharmaceutically acceptable co-crystals, tautomers, solvates, hydrates, polymorphs, isotopically enriched derivatives, or prodrugs thereof:

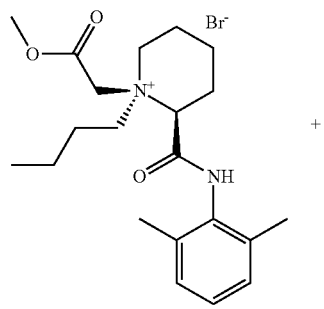

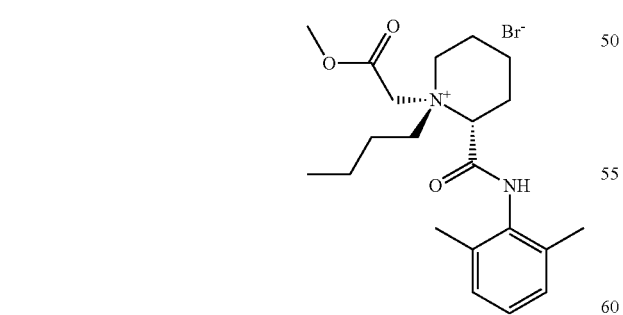

In certain embodiments, the compound of Formula (II) is a mixture of the following compounds, or pharmaceutically acceptable co-crystals, tautomers, solvates, hydrates, polymorphs, isotopically enriched derivatives, or prodrugs thereof:

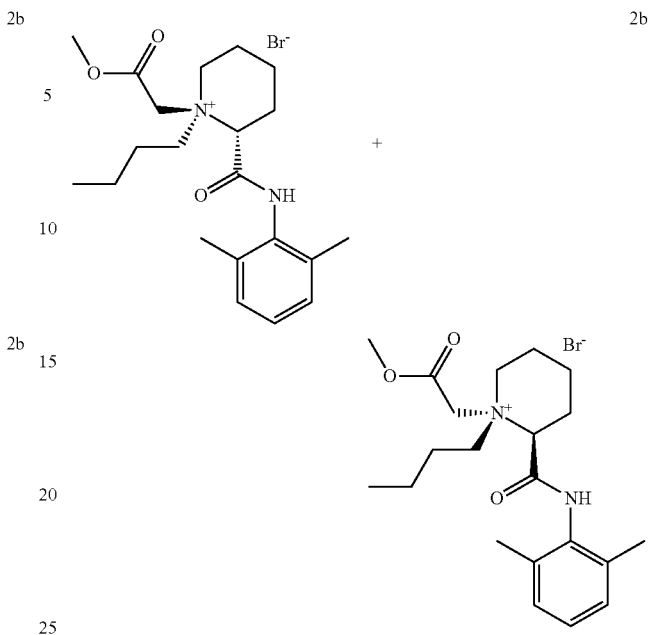

In certain embodiments, the compound of Formula (II) is the following compound, or a pharmaceutically acceptable co-crystal, tautomer, stereoisomer, solvate, hydrate, polymorph, isotopically enriched derivative, or prodrug thereof:

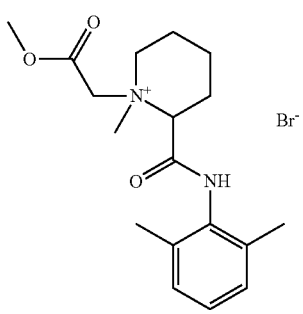

In certain embodiments, the compound of Formula (II) is a mixture of the following compounds, or pharmaceutically acceptable co-crystals, tautomers, solvates, hydrates, polymorphs, isotopically enriched derivatives, or prodrugs thereof:

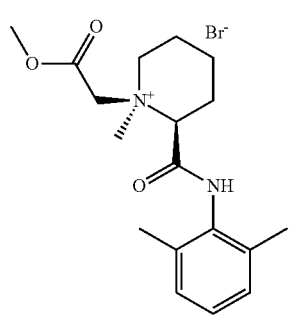

-continued

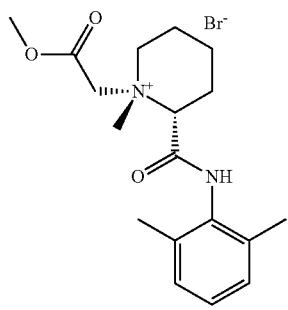
3a

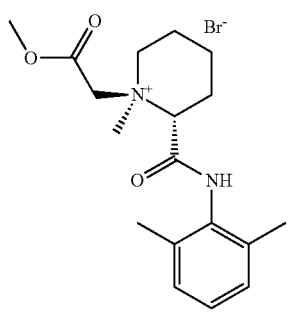
3b

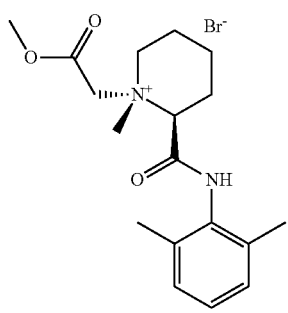
3b

In certain embodiments, the compound of Formula (II) is a mixture of the following compounds, or pharmaceutically acceptable co-crystals, tautomers, solvates, hydrates, polymorphs, isotopically enriched derivatives, or prodrugs thereof:

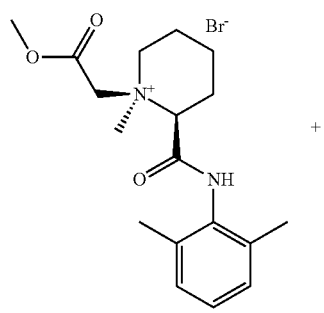
3a

+

-continued

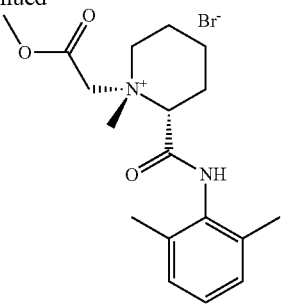

In certain embodiments, the compound of Formula (II) is a mixture of the following compounds, or pharmaceutically acceptable co-crystals, tautomers, solvates, hydrates, polymorphs, isotopically enriched derivatives, or prodrugs thereof:

3b

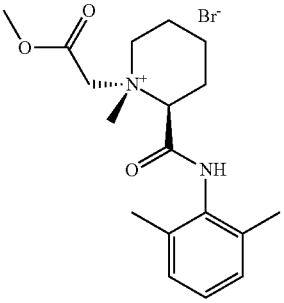

+

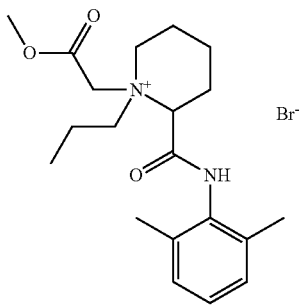

In certain embodiments, the compound of Formula (II) is the following compound, or a pharmaceutically acceptable co-crystal, tautomer, stereoisomer, solvate, hydrate, polymorph, isotopically enriched derivative, or prodrug thereof:

4

In certain embodiments, the compound of Formula (II) is the following compound, or a pharmaceutically acceptable co-crystal, tautomer, stereoisomer, solvate, hydrate, polymorph, isotopically enriched derivative, or prodrug thereof:

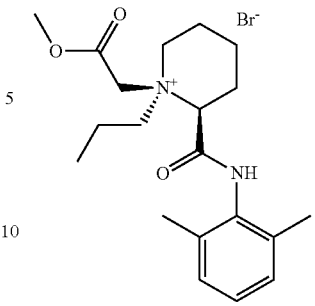

4S

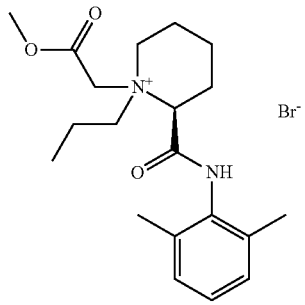

In certain embodiments, the compound of Formula (II) is the following compound, or a pharmaceutically acceptable co-crystal, tautomer, solvate, hydrate, polymorph, isotopically enriched derivative, or prodrug thereof:

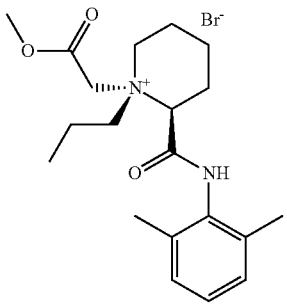

4Sa + 4Sb

4Sa

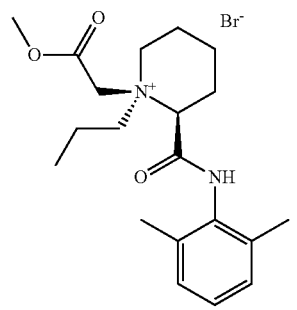

In certain embodiments, the compound of Formula (II) is the following compound, or a pharmaceutically acceptable co-crystal, tautomer, stereoisomer, solvate, hydrate, polymorph, isotopically enriched derivative, or prodrug thereof:

26

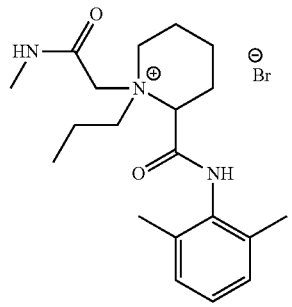

In certain embodiments, the compound of Formula (II) is the following compound, or a pharmaceutically acceptable co-crystal, tautomer, solvate, hydrate, polymorph, isotopically enriched derivative, or prodrug thereof:

4Sb

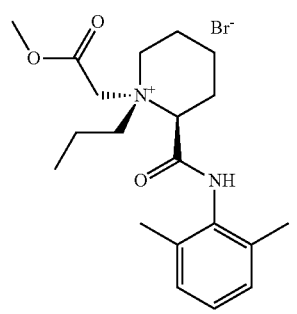

In certain embodiments, the compound of Formula (II) is the following compound, or a pharmaceutically acceptable co-crystal, tautomer, stereoisomer, solvate, hydrate, polymorph, isotopically enriched derivative, or prodrug thereof:

26S

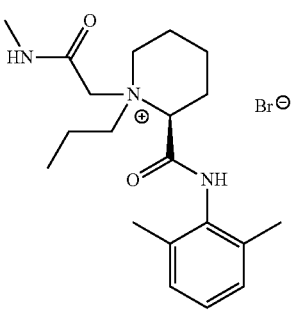

In certain embodiments, the compound of Formula (II) is a mixture of the following compounds, or pharmaceutically acceptable co-crystals, tautomers, solvates, hydrates, polymorphs, isotopically enriched derivatives, or prodrugs thereof:

In certain embodiments, the compound of Formula (II) is the following compound, or a pharmaceutically acceptable co-crystal, tautomer, solvate, hydrate, polymorph, isotopically enriched derivative, or prodrug thereof:

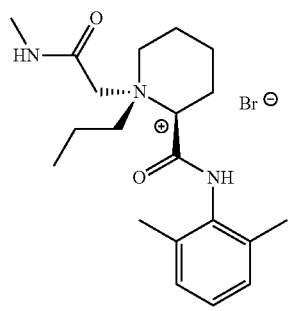

26Sa

In certain embodiments, the compound of Formula (II) is the following compound, or a pharmaceutically acceptable co-crystal, tautomer, solvate, hydrate, polymorph, isotopically enriched derivative, or prodrug thereof:

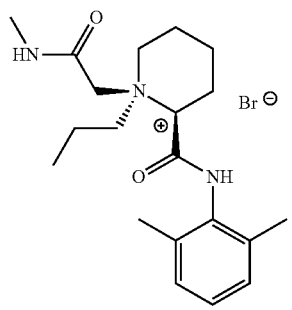

26Sb

In certain embodiments, the compound of Formula (II) is a mixture of the following compounds, or pharmaceutically acceptable co-crystals, tautomers, solvates, hydrates, polymorphs, isotopically enriched derivatives, or prodrugs thereof:

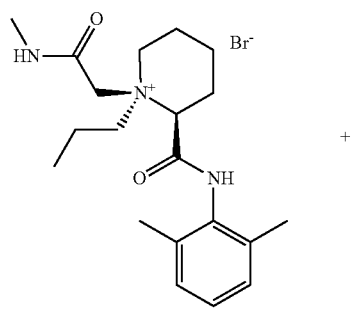

+

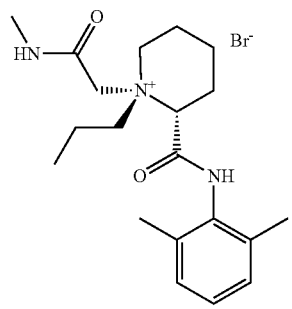

26Sa + 26Sb

In certain embodiments, the compound of Formula (II) is not of formula:

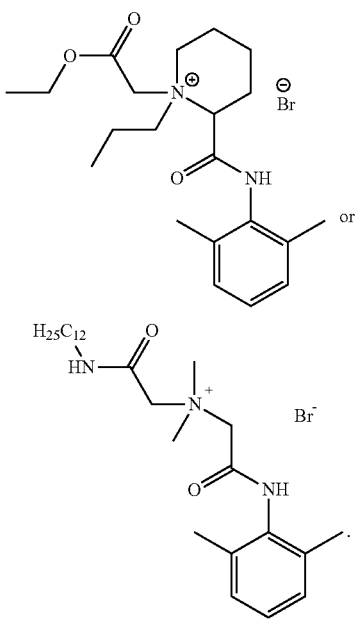

or

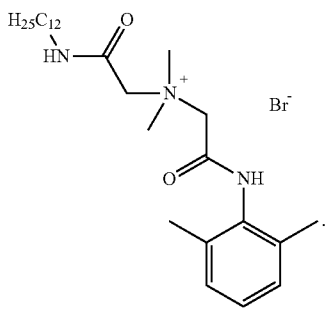

In certain embodiments, the compound of Formula (III) is one of the following compounds, or a pharmaceutically acceptable co-crystal, tautomer, stereoisomer, solvate, hydrate, polymorph, isotopically enriched derivative, or prodrug thereof:

9

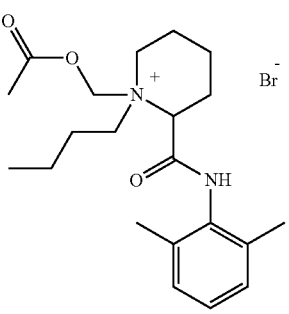

-continued

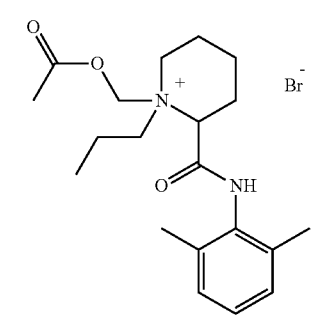

10

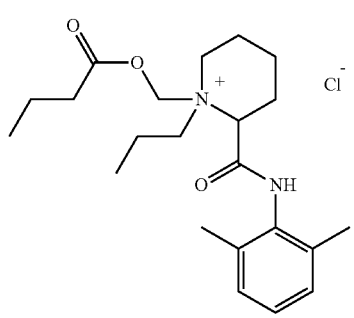

11

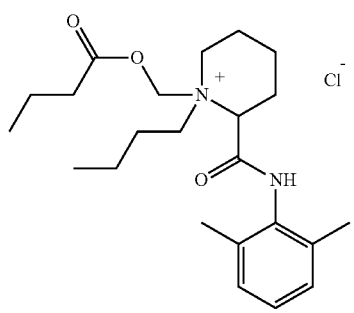

12

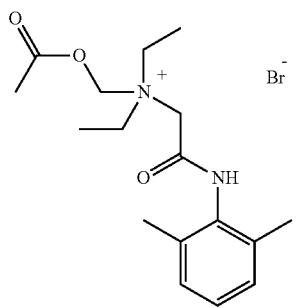

13

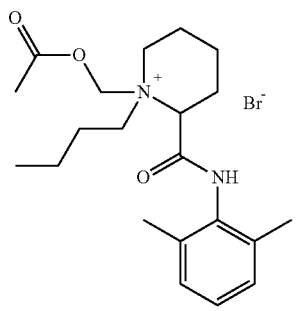

9

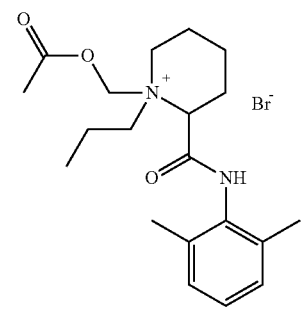

10

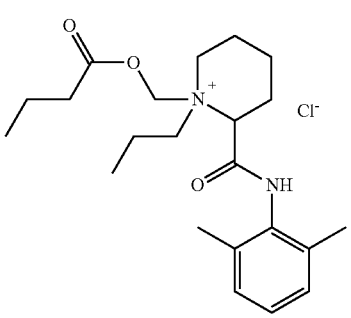

11

12

In certain embodiments, the compound of Formula (III) is one of the following compounds, or a pharmaceutically acceptable co-crystal, tautomer, stereoisomer, solvate, hydrate, polymorph, isotopically enriched derivative, or prodrug thereof:

In certain embodiments, the compound of Formula (III) is one of the following compounds, or a pharmaceutically acceptable co-crystal, tautomer, stereoisomer, solvate, hydrate, polymorph, isotopically enriched derivative, or prodrug thereof:

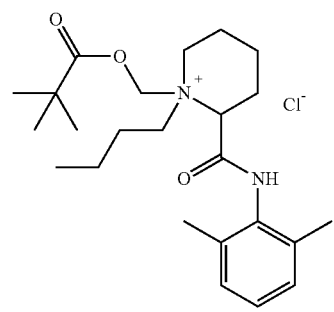
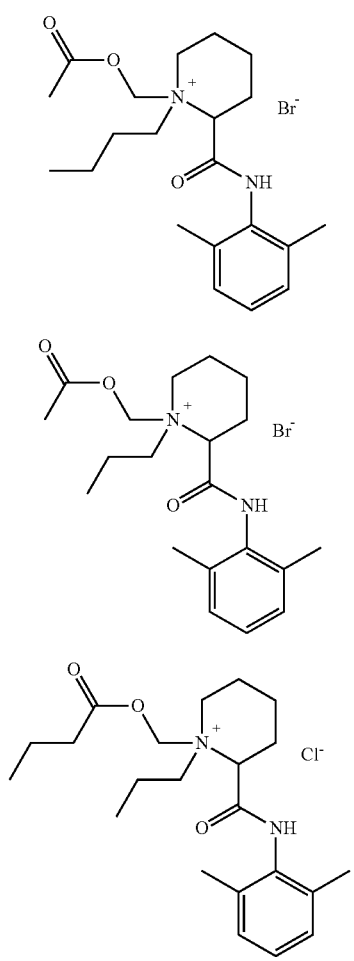
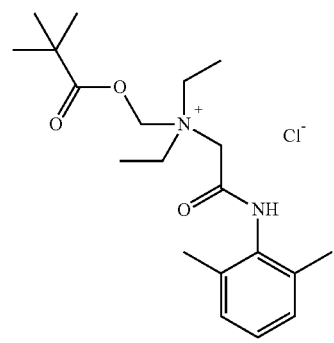
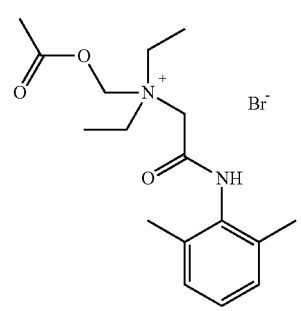
In certain embodiments, the compound of Formula (III) is not one or more of the following compounds:
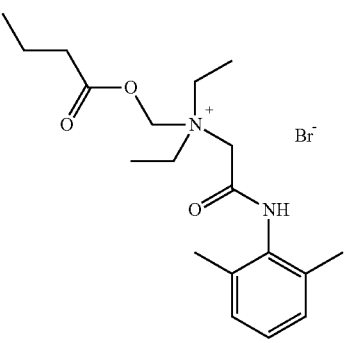
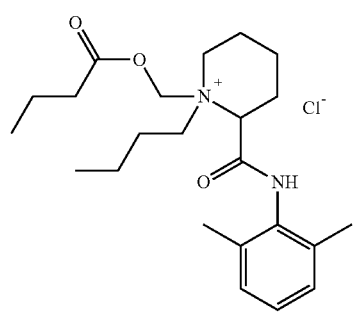
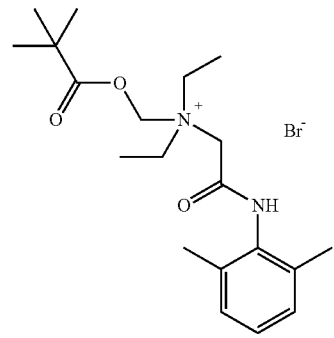
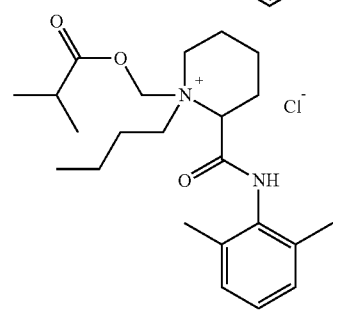

-continued

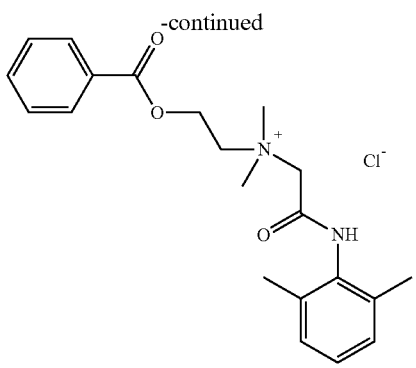

In certain embodiments, the provided compounds (e.g., compounds of Formula (I), (II), and (III)) selectively induce sensory nerve blockade over motor function blockade. In certain embodiments, the compounds selectively induce sensory nerve blockade over motor function blockade such that the ratio of the duration of sensory nerve blockade to duration of motor function blockade is at least 1.1:1, 1.2:1, 1.3:1, 1.4:1, 1.5:1, 2:1, 3:1, 4:1, 5:1, 6:1, 7:1, 8:1, 9:1, 10:1, 20:1, 30:1, 40:1, 50:1, or 1100:1 in a subject in need thereof.

Pharmaceutical Compositions, Kits, and Administration

The present disclosure provides pharmaceutical compositions comprising a disclosed compound (e.g., a compound of Formula (I), (II), or (III)), or a pharmaceutically acceptable co-crystal, tautomer, stereoisomer, solvate, hydrate, polymorph, isotopically enriched derivative, or prodrug thereof, and optionally a pharmaceutically acceptable excipient. In certain embodiments, the pharmaceutical composition described herein comprises a compound of Formula (I), (II), or (III), and a pharmaceutically acceptable excipient.

In certain embodiments, the compound of Formula (I), (II), or (III) is provided in an effective amount in the pharmaceutical composition. In certain embodiments, the effective amount is a therapeutically effective amount. In certain embodiments, the effective amount is a prophylactically effective amount. In certain embodiments, the effective amount is an amount effective for inducing selective sensory nerve blockade in a subject in need thereof.

In certain embodiments, the effective amount is an amount effective for providing a longer duration of sensory nerve blockade than duration of motor function blockade in a subject in need thereof. In certain embodiments, the effective amount is an amount effective for providing a ratio of the duration of sensory nerve blockade to duration of motor function blockade of at least 1.1:1 in a subject in need thereof. In certain embodiments, the effective amount is an amount effective for providing a ratio of the duration of sensory nerve blockade to duration of motor function blockade of at least 1.2:1 in a subject in need thereof. In certain embodiments, the effective amount is an amount effective for providing a ratio of the duration of sensory nerve blockade to duration of motor function blockade of at least 1.3:1 in a subject in need thereof. In certain embodiments, the effective amount is an amount effective for providing a ratio of the duration of sensory nerve blockade to duration of motor function blockade of at least 1.4:1 in a subject in need thereof. In certain embodiments, the effective amount is an amount effective for providing a ratio of the duration of sensory nerve blockade to duration of motor function blockade of at least 1.5:1 in a subject in need thereof. In certain embodiments, the effective amount is an amount effective for providing a ratio of the duration of sensory nerve blockade to duration of motor function blockade of at least 2:1 in a subject in need thereof. In certain embodiments, the effective amount is an amount effective for providing a ratio of the duration of sensory nerve blockade to duration of motor function blockade of at least 3:1 in a subject in need thereof. In certain embodiments, the effective amount is an amount effective for providing a ratio of the duration of sensory nerve blockade to duration of motor function blockade of at least 5:1 in a subject in need thereof. In certain embodiments, the effective amount is an amount effective for providing a ratio of the duration of sensory nerve blockade to duration of motor function blockade of at least 10:1 in a subject in need thereof. In certain embodiments, the effective amount is an amount effective for providing a ratio of the duration of sensory nerve blockade to duration of motor function blockade of at least 20:1 in a subject in need thereof. In certain embodiments, the effective amount is an amount effective for providing a ratio of the duration of sensory nerve blockade to duration of motor function blockade of at least 50:1 in a subject in need thereof. In certain embodiments, the effective amount is an amount effective for providing a ratio of the duration of sensory nerve blockade to duration of motor function blockade of at least 100:1 in a subject in need thereof. In certain embodiments, the effective amount is an amount effective for providing sensory nerve blockade without motor function blockade in a subject in need thereof.

In certain embodiments, the subject being treated or administered a compound described herein is an animal. The animal may be of either sex and may be at any stage of development. In certain embodiments, the subject is a non-human animal. In certain embodiments, the subject is a mammal. In certain embodiments, the subject described herein is a human. In certain embodiments, the subject is a non-human mammal. In certain embodiments, the subject is a domesticated animal, such as a dog, cat, cow, pig, horse, sheep, or goat. In certain embodiments, the subject is a companion animal, such as a dog or cat. In certain embodiments, the subject is a livestock animal, such as a cow, pig, horse, sheep, or goat. In certain embodiments, the subject is a zoo animal. In another embodiment, the subject is a research animal, such as a rodent (e.g., mouse, rat), dog, pig, or non-human primate. In certain embodiments, the animal is a genetically engineered animal. In certain embodiments, the animal is a transgenic animal (e.g., transgenic mice and transgenic pigs). In certain embodiments, the subject is a fish or reptile.

In certain embodiments, the compound or pharmaceutical composition is a solid. In certain embodiments, the compound or pharmaceutical composition is a powder. In certain embodiments, the compound or pharmaceutical composition can be dissolved in a liquid to make a solution. In certain embodiments, the compound or pharmaceutical composition is dissolved in water to make an aqueous solution. In certain embodiments, the pharmaceutical composition is a liquid for parental injection. In certain embodiments, the pharmaceutical composition is a liquid for topical administration. In certain embodiments, the pharmaceutical composition is a liquid (e.g., aqueous solution) for intravenous injection. In certain embodiments, the pharmaceutical composition is a liquid (e.g., aqueous solution) for subcutaneous injection.

After formulation with an appropriate pharmaceutically acceptable excipient in a desired dosage, the pharmaceutical compositions of the present disclosure can be administered to humans and other animals parenterally, intracisternally, intraperitoneally, intramuscularly, topically, bucally, intravenously, epidurally, intranasally, intrathecally, subcutaneously, ototopically, on the cornea, perineurally, by infiltration, or the like, depending on the desired location of the anesthetic effect. In certain embodiments, the compound or pharmaceutical composition can be administered by any of the methods for administering local anesthetics known to one of ordinary skill in the art. The composition can be formulated for topical anesthesia, infiltration anesthesia, field block anesthesia, nerve block anesthesia, intravenous regional anesthesia, spinal anesthesia and/or epidural anesthesia.

In certain embodiments, a pharmaceutical composition comprising a compound of Formula (I), (II), or (III) is administered, topically or parenterally, at dosage levels of each pharmaceutical composition sufficient to deliver from about 0.001 mg/kg to about 200 mg/kg in one or more dose administrations. In certain embodiments, the effective amount per dose varies from about 0.001 mg/kg to about 200 mg/kg, about 0.001 mg/kg to about 100 mg/kg, about 0.01 mg/kg to about 100 mg/kg, from about 0.01 mg/kg to about 50 mg/kg, preferably from about 0.1 mg/kg to about 40 mg/kg, preferably from about 0.5 mg/kg to about 30 mg/kg, from about 0.01 mg/kg to about 10 mg/kg, from about 0.1 mg/kg to about 10 mg/kg, of subject body weight per day, one or more times a day, to obtain the desired anesthetic effect. In certain embodiments, the compounds described herein may be at dosage levels sufficient to deliver from about 0.001 mg/kg to about 200 mg/kg, from about 0.001 mg/kg to about 100 mg/kg, from about 0.01 mg/kg to about 100 mg/kg, from about 0.01 mg/kg to about 50 mg/kg, preferably from about 0.1 mg/kg to about 40 mg/kg, preferably from about 0.5 mg/kg to about 30 mg/kg, from about 0.01 mg/kg to about 10 mg/kg, from about 0.1 mg/kg to about 10 mg/kg, and more preferably from about 1 mg/kg to about 25 mg/kg, of subject body weight per day, one or more times a day, to obtain the desired anesthetic effect. In certain embodiments, the desired dosage may be delivered using multiple administrations (e.g., two, three, four, five, six, seven, eight, nine, ten, eleven, twelve, thirteen, fourteen, or more administrations). In certain embodiments, the composition described herein is administered at a dose that is below the dose at which the agent causes non-specific effects.

In certain embodiments, the pharmaceutical composition is administered at a dose of about 0.001 mg to about 1000 mg per unit dose. In certain embodiments, the pharmaceutical composition is administered at a dose of about 0.01 mg to about 200 mg per unit dose. In certain embodiments, the pharmaceutical composition is administered at a dose of about 0.01 mg to about 100 mg per unit dose. In certain embodiments, pharmaceutical composition is administered at a dose of about 0.01 mg to about 50 mg per unit dose. In certain embodiments, the pharmaceutical composition is administered at a dose of about 0.01 mg to about 10 mg per unit dose. In certain embodiments, the pharmaceutical composition is administered at a dose of about 0.1 mg to about 10 mg per unit dose.

Pharmaceutical compositions described herein can be prepared by any method known in the art of pharmacology. In general, such preparatory methods include the steps of bringing the composition comprising a compound of Formula (I), (II), or (III) into association with a carrier and/or one or more other accessory ingredients, and then, if necessary and/or desirable, shaping and/or packaging the product into a desired single- or multi-dose unit.

Pharmaceutical compositions can be prepared, packaged, and/or sold in bulk, as a single unit dose, and/or as a plurality of single unit doses. As used herein, a "unit dose" is a discrete amount of the pharmaceutical composition comprising a predetermined amount of the active ingredient. The amount of the active ingredient is generally equal to the dosage of the active ingredient which would be administered to a subject and/or a convenient fraction of such a dosage, such as, for example, one-half or one-third of such a dosage.

Relative amounts of the active ingredient, the pharmaceutically acceptable excipient, and/or any additional ingredients in a pharmaceutical composition of the disclosure will vary, depending upon the identity, size, and/or condition of the subject treated and further depending upon the route by which the composition is to be administered. By way of example, the composition may comprise between 0.1% and 100% (w/w) active ingredient.

Pharmaceutically acceptable excipients used in the manufacture of provided pharmaceutical compositions include inert diluents, dispersing and/or granulating agents, surface active agents and/or emulsifiers, disintegrating agents, binding agents, preservatives, buffering agents, lubricating agents, and/or oils. Excipients such as cocoa butter and suppository waxes, coloring agents, coating agents, sweetening, flavoring, and perfuming agents may also be present in the composition.

Exemplary diluents include calcium carbonate, sodium carbonate, calcium phosphate, dicalcium phosphate, calcium sulfate, calcium hydrogen phosphate, sodium phosphate lactose, sucrose, cellulose, microcrystalline cellulose, kaolin, mannitol, sorbitol, inositol, sodium chloride, dry starch, cornstarch, powdered sugar, and mixtures thereof.

Exemplary granulating and/or dispersing agents include potato starch, corn starch, tapioca starch, sodium starch glycolate, clays, alginic acid, guar gum, citrus pulp, agar, bentonite, cellulose, and wood products, natural sponge, cation-exchange resins, calcium carbonate, silicates, sodium carbonate, cross-linked poly(vinyl-pyrrolidone) (crospovidone), sodium carboxymethyl starch (sodium starch glycolate), carboxymethyl cellulose, cross-linked sodium carboxymethyl cellulose (croscarmellose), methylcellulose, pregelatinized starch (starch 1500), microcrystalline starch, water insoluble starch, calcium carboxymethyl cellulose, magnesium aluminum silicate (Veegum), sodium lauryl sulfate, quaternary ammonium compounds, and mixtures thereof.

Exemplary surface active agents and/or emulsifiers include natural emulsifiers (e.g. acacia, agar, alginic acid, sodium alginate, tragacanth, chondrux, cholesterol, xanthan, pectin, gelatin, egg yolk, casein, wool fat, cholesterol, wax, and lecithin), colloidal clays (e.g. bentonite (aluminum silicate) and Veegum (magnesium aluminum silicate)), long chain amino acid derivatives, high molecular weight alcohols (e.g. stearyl alcohol, cetyl alcohol, oleyl alcohol, triacetin monostearate, ethylene glycol distearate, glyceryl monostearate, and propylene glycol monostearate, polyvinyl alcohol), carbomers (e.g. carboxy polymethylene, polyacrylic acid, acrylic acid polymer, and carboxyvinyl polymer), carrageenan, cellulosic derivatives (e.g. carboxymethylcellulose sodium, powdered cellulose, hydroxymethyl cellulose, hydroxypropyl cellulose, hydroxypropyl methylcellulose, methylcellulose), sorbitan fatty acid esters (e.g. polyoxyethylene sorbitan monolaurate (Tween 20), polyoxyethylene sorbitan (Tween 60), polyoxyethylene sorbitan monooleate (Tween 80), sorbitan monopalmitate (Span 40), sorbitan monostearate (Span 60), sorbitan tristearate (Span 65), glyceryl monooleate, sorbitan monooleate (Span 80)), polyoxyethylene esters (e.g. polyoxyethylene monostearate (Myrj 45), polyoxyethylene hydrogenated castor oil, polyethoxylated castor oil, polyoxymethylene stearate, and Solutol), sucrose fatty acid esters, polyethylene glycol fatty acid esters (e.g. Cremophor™), polyoxyethylene ethers, (e.g. polyoxyethylene lauryl ether (Brij 30)), poly(vinyl-pyrrolidone), diethylene glycol monolaurate, triethanolamine oleate, sodium oleate, potassium oleate, ethyl oleate, oleic acid, ethyl laurate, sodium lauryl sulfate, Pluronic F-68, Poloxamer-188, cetrimonium bromide, cetylpyridinium chloride, benzalkonium chloride, docusate sodium, and/or mixtures thereof.

Exemplary binding agents include starch (e.g., cornstarch and starch paste), gelatin, sugars (e.g., sucrose, glucose, dextrose, dextrin, molasses, lactose, lactitol, mannitol, etc.), natural and synthetic gums (e.g., acacia, sodium alginate, extract of Irish moss, panwar gum, ghatti gum, mucilage of isapol husks, carboxymethylcellulose, methylcellulose, ethylcellulose, hydroxyethylcellulose, hydroxypropyl cellulose, hydroxypropyl methylcellulose, microcrystalline cellulose, cellulose acetate, poly(vinyl-pyrrolidone), magnesium aluminum silicate (Veegum), and larch arabogalactan), alginates, polyethylene oxide, polyethylene glycol, inorganic calcium salts, silicic acid, polymethacrylates, waxes, water, alcohol, and/or mixtures thereof.

Exemplary preservatives include antioxidants, chelating agents, antimicrobial preservatives, antifungal preservatives, alcohol preservatives, acidic preservatives, and other preservatives. In certain embodiments, the preservative is an antioxidant. In other embodiments, the preservative is a chelating agent.

Exemplary antioxidants include alpha tocopherol, ascorbic acid, acorbyl palmitate, butylated hydroxyanisole, butylated hydroxytoluene, monothioglycerol, potassium metabisulfite, propionic acid, propyl gallate, sodium ascorbate, sodium bisulfite, sodium metabisulfite, and sodium sulfite.

Exemplary chelating agents include ethylenediaminetetraacetic acid (EDTA) and salts and hydrates thereof (e.g., sodium edetate, disodium edetate, trisodium edetate, calcium disodium edetate, dipotassium edetate, and the like), citric acid and salts and hydrates thereof (e.g., citric acid monohydrate), fumaric acid and salts and hydrates thereof, malic acid and salts and hydrates thereof, phosphoric acid and salts and hydrates thereof, and tartaric acid and salts and hydrates thereof. Exemplary antimicrobial preservatives include benzalkonium chloride, benzethonium chloride, benzyl alcohol, bronopol, cetrimide, cetylpyridinium chloride, chlorhexidine, chlorobutanol, chlorocresol, chloroxylenol, cresol, ethyl alcohol, glycerin, hexetidine, imidurea, phenol, phenoxyethanol, phenylethyl alcohol, phenylmercuric nitrate, propylene glycol, and thimerosal.

Exemplary antifungal preservatives include butyl paraben, methyl paraben, ethyl paraben, propyl paraben, benzoic acid, hydroxybenzoic acid, potassium benzoate, potassium sorbate, sodium benzoate, sodium propionate, and sorbic acid.

Exemplary alcohol preservatives include ethanol, polyethylene glycol, phenol, phenolic compounds, bisphenol, chlorobutanol, hydroxybenzoate, and phenylethyl alcohol.

Exemplary acidic preservatives include vitamin A, vitamin C, vitamin E, beta-carotene, citric acid, acetic acid, dehydroacetic acid, ascorbic acid, sorbic acid, and phytic acid.

Other preservatives include tocopherol, tocopherol acetate, deteroxime mesylate, cetrimide, butylated hydroxyanisol (BHA), butylated hydroxytoluened (BHT), ethylenediamine, sodium lauryl sulfate (SLS), sodium lauryl ether sulfate (SLES), sodium bisulfite, sodium metabisulfite, potassium sulfite, potassium metabisulfite, Glydant Plus, Phenonip, methylparaben, Germall 115, Germaben II, Neolone, Kathon, and Euxyl.

Exemplary buffering agents include citrate buffer solutions, acetate buffer solutions, phosphate buffer solutions, ammonium chloride, calcium carbonate, calcium chloride, calcium citrate, calcium glubionate, calcium gluceptate, calcium gluconate, D-gluconic acid, calcium glycerophosphate, calcium lactate, propanoic acid, calcium levulinate, pentanoic acid, dibasic calcium phosphate, phosphoric acid, tribasic calcium phosphate, calcium hydroxide phosphate, potassium acetate, potassium chloride, potassium gluconate, potassium mixtures, dibasic potassium phosphate, monobasic potassium phosphate, potassium phosphate mixtures, sodium acetate, sodium bicarbonate, sodium chloride, sodium citrate, sodium lactate, dibasic sodium phosphate, monobasic sodium phosphate, sodium phosphate mixtures, tromethamine, magnesium hydroxide, aluminum hydroxide, alginic acid, pyrogen-free water, isotonic saline, Ringer's solution, ethyl alcohol, and mixtures thereof.

Exemplary lubricating agents include magnesium stearate, calcium stearate, stearic acid, silica, talc, malt, glyceryl behanate, hydrogenated vegetable oils, polyethylene glycol, sodium benzoate, sodium acetate, sodium chloride, leucine, magnesium lauryl sulfate, sodium lauryl sulfate, and mixtures thereof.

Exemplary natural oils include almond, apricot kernel, avocado, babassu, bergamot, black current seed, borage, cade, camomile, canola, caraway, carnauba, castor, cinnamon, cocoa butter, coconut, cod liver, coffee, corn, cotton seed, emu, eucalyptus, evening primrose, fish, flaxseed, geraniol, gourd, grape seed, hazelnut, hyssop, isopropyl myristate, jojoba, kukui nut, lavandin, lavender, lemon, litsea cubeba, macademia nut, mallow, mango seed, meadowfoam seed, mink, nutmeg, olive, orange, orange roughy, palm, palm kernel, peach kernel, peanut, poppy seed, pumpkin seed, rapeseed, rice bran, rosemary, safflower, sandalwood, sasquana, savoury, sea buckthorn, sesame, shea butter, silicone, soybean, sunflower, tea tree, thistle, tsubaki, vetiver, walnut, and wheat germ oils. Exemplary synthetic oils include, but are not limited to, butyl stearate, caprylic triglyceride, capric triglyceride, cyclomethicone, diethyl sebacate, dimethicone 360, isopropyl myristate, mineral oil, octyldodecanol, oleyl alcohol, silicone oil, and mixtures thereof.

Liquid dosage forms for parenteral administration include, but are not limited to, pharmaceutically acceptable emulsions, microemulsions, solutions, suspensions, syrups, and elixirs. In addition to the active agents, the liquid dosage forms may contain inert diluents commonly used in the art such as, for example, water or other solvents, solubilizing agents and emulsifiers, such as ethyl alcohol, isopropyl alcohol, ethyl carbonate, ethyl acetate, benzyl alcohol, benzyl benzoate, propylene glycol, 1,3-butylene glycol, dimethylformamide, oils (in particular, cottonseed, groundnut, corn, germ, olive, castor, and sesame oils), glycerol, tetrahydrofurfuryl alcohol, polyethylene glycols and fatty acid esters of sorbitan, and mixtures thereof. In certain embodiments for parenteral administration, agents of the invention are mixed with solubilizing agents such CREMOPHOR EL® (polyethoxylated castor oil), alcohols, oils, modified oils, glycols, polysorbates, cyclodextrins, polymers, and combinations thereof.

Injectable preparations, for example, sterile injectable aqueous or oleaginous suspensions, may be formulated according to the known art using suitable dispersing or wetting agents and suspending agents. Sterile injectable preparation may also be a sterile injectable solution, suspension or emulsion in a nontoxic parenterally acceptable diluent or solvent, for example, as a solution in 1,3-butanediol. Among the acceptable vehicles and solvents that may be employed are water, Ringer's solution, U.S.P. and isotonic sodium chloride solution. In addition, sterile, fixed oils are conventionally employed as a solvent or suspending medium. For this purpose any bland fixed oil can be employed including synthetic mono- or diglycerides. In addition, fatty acids such as oleic acid are used in the preparation of injectables.

Injectable formulations can be sterilized, for example, by filtration through a bacterial-retaining filter, or by incorporating sterilizing agents in the form of sterile solid compositions which can be dissolved or dispersed in sterile water or other sterile injectable medium prior to use.

Formulations suitable for topical administration include liquid or semi-liquid preparations such as liniments, lotions, gels, applicants, oil-in-water or water-in-oil emulsions such as creams, ointments, or pastes; or solutions or suspensions such as drops. Formulations for topical administration to the skin surface can be prepared by dispersing the drug with a dermatologically acceptable carrier such as a lotion, cream, ointment, or soap. Useful carriers are capable of forming a film or layer over the skin to localize application and inhibit removal. For topical administration to internal tissue surfaces, the agent can be dispersed in a liquid tissue adhesive or other substance known to enhance adsorption to a tissue surface. For example, hydroxypropylcellulose or fibrinogen/thrombin solutions can be used to advantage. Alternatively, tissue-coating solutions, such as pectin-containing formulations can be used. Ophthalmic formulation, ear drops, and eye drops are also contemplated as being within the scope of this disclosure. Additionally, the present disclosure contemplates the use of transdermal patches, which have the added advantage of providing controlled delivery of an agent to the body. Such dosage forms can be made by dissolving or dispensing the agent in the proper medium. Absorption enhancers can also be used to increase the flux of the agent across the skin. The rate can be controlled by either providing a rate controlling membrane or by dispersing the agent in a polymer matrix or gel.

Additionally, the carrier for a topical formulation can be in the form of a hydroalcoholic system (e.g., liquids and gels), an anhydrous oil or silicone based system, or an emulsion system, including, but not limited to, oil-in-water, water-in-oil, water-in-oil-in-water, and oil-in-water-in-silicone emulsions. The emulsions can cover a broad range of consistencies including thin lotions (which can also be suitable for spray or aerosol delivery), creamy lotions, light creams, heavy creams, and the like. The emulsions can also include microemulsion systems. Other suitable topical carriers include anhydrous solids and semisolids (such as gels and sticks); and aqueous based mousse systems.

Also encompassed by the disclosure are kits (e.g., pharmaceutical packs). The kits provided may comprise a pharmaceutical composition or compound described herein and a container (e.g., a vial, ampule, bottle, syringe, and/or dispenser package, or other suitable container). In some embodiments, provided kits may optionally further include a second container comprising a pharmaceutical excipient for dilution or suspension of a pharmaceutical composition or compound described herein. In some embodiments, the pharmaceutical composition or compound described herein provided in the first container and the second container are combined to form one unit dosage form.

Thus, in one aspect, provided are kits including a first container comprising a compound or pharmaceutical composition described herein. In certain embodiments, the kits are useful for inducing sensory nerve blockade in a subject in need thereof. In certain embodiments, the kits are useful for inducing selective sensory nerve blockade in a subject in need thereof.

In certain embodiments, a kit described herein further includes instructions for using the kit. A kit described herein may also include information as required by a regulatory agency such as the U.S. Food and Drug Administration (FDA). In certain embodiments, the information included in the kits is prescribing information.

Methods of Treatment

The present disclosure provides methods for inducing sensory nerve blockade. In certain embodiments, the application provides a method of inducing selective sensory nerve blockade.

In certain embodiments, the methods comprise administering to a subject in need thereof a compound that induces sensory nerve blockade. In certain embodiments, the methods comprise administering to a subject in need thereof a compound that induces selective sensory nerve blockade. In certain embodiments, the methods comprise administering a compound of the disclosure (e.g., a compound of Formula (I), (II), or (III)), or a pharmaceutically acceptable co-crystal, tautomer, stereoisomer, solvate, hydrate, polymorph, isotopically enriched derivative, or prodrug, or composition thereof, to a subject in need thereof. In some embodiments, the method comprises administering a pharmaceutical composition comprising a compound of the disclosure (e.g., a compound of Formula (I), (II), or (III)), or a pharmaceutically acceptable salt, co-crystal, tautomer, stereoisomer, solvate, hydrate, polymorph, isotopically enriched derivative, or prodrug, thereof, to a subject in need thereof.

In certain embodiments, methods for inducing sensory nerve blockade comprise providing a longer duration of sensory nerve blockade than duration of motor function blockade in a subject in need thereof. In certain embodiments, methods for inducing sensory nerve blockade comprise providing a ratio of the duration of sensory nerve blockade to duration of motor function blockade of at least 1.1:1 in a subject in need thereof. In certain embodiments, methods for inducing sensory nerve blockade comprise providing a ratio of the duration of sensory nerve blockade to duration of motor function blockade of at least 1.2:1 in a subject in need thereof. In certain embodiments, methods for inducing sensory nerve blockade comprise providing a ratio of the duration of sensory nerve blockade to duration of motor function blockade of at least 1.3:1 in a subject in need thereof. In certain embodiments, methods for inducing sensory nerve blockade comprise providing a ratio of the duration of sensory nerve blockade to duration of motor function blockade of at least 1.4:1 in a subject in need thereof. In certain embodiments, methods for inducing sensory nerve blockade comprise providing a ratio of the duration of sensory nerve blockade to duration of motor function blockade of at least 1.5:1 in a subject in need thereof. In certain embodiments, methods for inducing sensory nerve blockade comprise providing a ratio of the duration of sensory nerve blockade to duration of motor function blockade of at least 2:1 in a subject in need thereof. In certain embodiments, methods for inducing sensory nerve blockade comprise providing a ratio of the duration of sensory nerve blockade to duration of motor function blockade of at least 3:1 in a subject in need thereof. In certain embodiments, methods for inducing sensory nerve blockade comprise providing a ratio of the duration of sensory nerve blockade to duration of motor function blockade of at least 4:1 in a subject in need thereof. In certain embodiments, methods for inducing sensory nerve blockade comprise providing a ratio of the duration of sensory nerve blockade to duration of motor function blockade of at least 5:1 in a subject in need thereof. In certain embodiments, methods for inducing sensory nerve blockade comprise providing a ratio of the duration of sensory nerve blockade to duration of motor function blockade of at least 10:1 in a subject in need thereof. In certain embodiments, methods for inducing sensory nerve blockade comprise providing a ratio of the duration of sensory nerve blockade to duration of motor function blockade of at least 20:1 in a subject in need thereof. In certain embodiments, methods for inducing sensory nerve blockade comprise providing a ratio of the duration of sensory nerve blockade to duration of motor function blockade of at least 30:1 in a subject in need thereof. In certain embodiments, methods for inducing sensory nerve blockade comprise providing a ratio of the duration of sensory nerve blockade to duration of motor function blockade of at least 40:1 in a subject in need thereof. In certain embodiments, methods for inducing sensory nerve blockade comprise providing a ratio of the duration of sensory nerve blockade to duration of motor function blockade of at least 50:1 in a subject in need thereof. In certain embodiments, methods for inducing sensory nerve blockade comprise providing a ratio of the duration of sensory nerve blockade to duration of motor function blockade of at least 100:1 in a subject in need thereof. In certain embodiments, methods for inducing sensory nerve blockade comprise providing sensory nerve blockade without motor function blockade in a subject in need thereof.

EXAMPLES

In order that the invention described herein may be more fully understood, the following examples are set forth. The examples described in this application are offered to illustrate the compounds, pharmaceutical compositions, and methods provided herein and are not to be construed in any way as limiting their scope.

Synthetic Methods

Compounds of the disclosure were prepared following the procedures described in detail below.

2-((2,6-Dimethylphenyl)amino)-N,N-diethyl-N-(2-methoxy-2-oxoethyl)-2-oxoethan-1-aminium bromide (1)

To a 50 mL round bottom flask, lidocaine (2.5 mmol), Methyl bromoacetate (10 mmol), and 3 mL acetonitrile were added under the protection of nitrogen. The reaction was heated to 80° C. for 1 hour, and cooled down to room temperature. The solvent was removed under reduced pressure, and the residue was purified through silica gel column chromatography (dichloromethane:methanol=25:1) to give the title compound as a white solid (0.94 g, 97%). $^1$H NMR (CDCl$_3$): δ 10.39 (s, 1H), 6.97-7.12 (m, 3H), 5.17 (s, 2H), 4.67 (s, 2H), 3.91-4.02 (m, 2H), 3.75-3.87 (m, 5H), 2.24 (s, 6H), 1.52 (t, J=7.2 Hz 6H). $^{13}$C NMR (CDCl$_3$): δ 164.8, 162.0, 135.1, 132.7, 128.2, 127.6, 58.1, 57.3, 53.4, 46.7, 18.8, 8.7. HRMS (ESI): m/z [M–Br]$^+$ calcd for C17H27N2O3 307.2016; found: 307.2024.

1-Butyl-2-((2,6-dimethylphenyl)carbamoyl)-1-(2-methoxy-2-oxoethyl)piperidin-1-ium bromide (2)

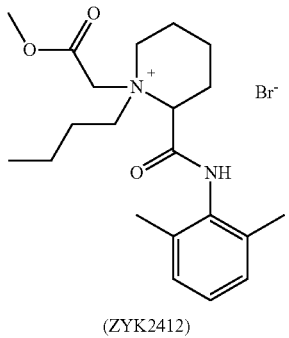

(ZYK2412)

To a 50 mL round bottom flask, bupivacaine (racemic; 2.5 mmol), methyl bromoacetate (10 mmol), and 3 mL acetonitrile were added under the protection of nitrogen. The reaction was heated to 80° C. for 1 hour, and cooled down to room temperature. The solvent was removed under reduced pressure, and the residue was purified by silica gel column chromatography (dichloromethane:methanol=25:1) to give two products as a white solid.

The first product isolated (Compound 2a; ZYK2412-1) (0.41 g, 37%) was determined, by 2D NMR techniques, to be a mixture of the two stereoisomers shown below:

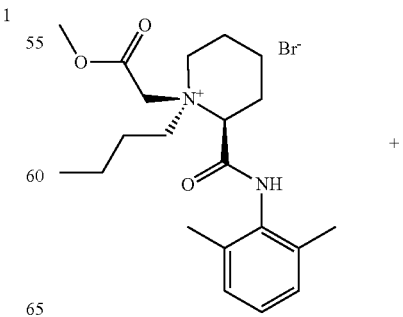

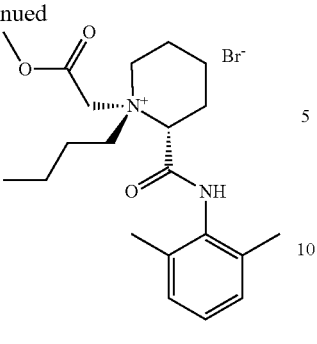

2a (ZYK2412-1)

$^1$H NMR (CDCl$_3$): δ 10.59 (s, 1H), 6.98-7.07 (m, 3H), 6.14 (dd, J$_1$=9.2 Hz, J$_2$=3.6 Hz, 1H), 4.81 (dd, J$_1$=317.6 Hz, J$_2$=17.2 Hz, 2H), 4.20-4.29 (m, 1H), 3.95-4.05 (m, 1H), 3.81 (s, 3H), 3.61-3.80 (m, 2H), 2.45-2.57 (m, 1H), 2.25 (s, 6H). 1.85-2.13 (m, 7H), 1.33-1.48 (m, 2H), 1.00 (t, J=7.2 Hz 3H). $^{13}$C NMR (CDCl$_3$): δ 165.7, 164.8, 135.0, 132.7, 128.2, 127.6, 69.3, 62.5, 62.5, 59.0, 53.4, 25.4, 24.7, 20.0, 19.9, 19.3, 18.8, 13.4. HRMS (ESI): m/z [M−Br]$^+$ calcd for C21H33N2O3 361.2486; found: 361.2492.

The second product isolated (Compound 2b; ZYK2412-2) (0.35 g, 32%) was determined, by 2D NMR techniques, to be a mixture of the two stereoisomers shown below:

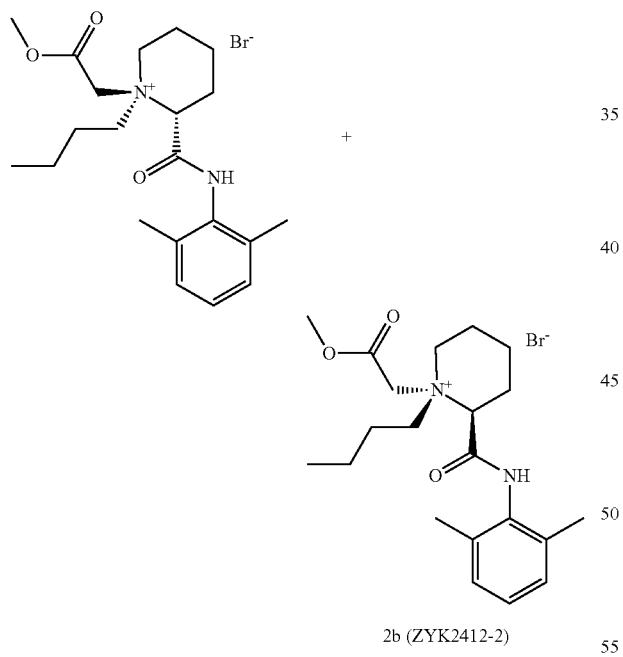

2b (ZYK2412-2)

$^1$H NMR (CDCl$_3$): δ 10.36 (s, 1H), 7.00-7.11 (m, 3H), 6.15 (dd, J$_1$=4.4 Hz, J$_2$=4.4 Hz, 1H), 4.62 (dd, J$_1$=244.0 Hz, J$_2$=16.4 Hz, 2H), 4.48-4.57 (m, 1H), 3.87-3.98 (m, 2H), 3.86 (s, 3H), 3.73 (td, J$_t$=13.6 Hz, J$_d$=4.8 Hz, 1H), 2.49-2.63 (m, 1H), 2.31-2.44 (m, 1H), 2.26 (s, 6H). 1.86-2.25 (m, 5H), 1.65-1.76 (m, 1H), 1.23-1.48 (m, 2H), 0.97 (t, J=7.2 Hz 3H). $^{13}$C NMR (CDCl$_3$): δ 165.0, 164.3, 135.0, 132.7, 128.3, 127.6, 69.9, 60.4, 58.2, 55.1, 53.6, 25.3, 24.4, 20.1, 19.8, 18.7, 17.7, 13.1. HRMS (ESI): m/z [M−Br]$^+$ calcd for C21H33N2O3 361.2486; found: 361.2491.

2-((2,6-Dimethylphenyl)carbamoyl)-1-(2-methoxy-2-oxoethyl)-1-methylpiperidin-1-ium bromide (3)

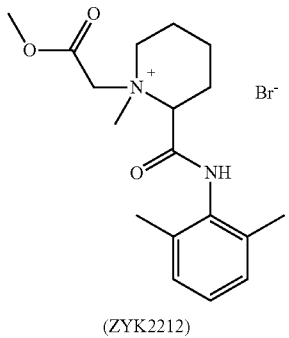

(ZYK2212)

To a 50 mL round bottom flask, mepivacaine (racemic; 1 mmol), methyl bromoacetate (3 mmol), and 1 mL acetonitrile were added under the protection of nitrogen. The reaction was heated to 80° C. for 1 hour, and cooled down to room temperature. The solvent was removed under reduced pressure, and the residue was purified by silica gel column chromatography (dichloromethane:methanol=30:1) to give two products as a white solid.

The first product isolated (Compound 3a; ZYK2212-1) (77 mg, 19%) was determined, by 2D NMR techniques, to be a mixture of the two stereoisomers shown below:

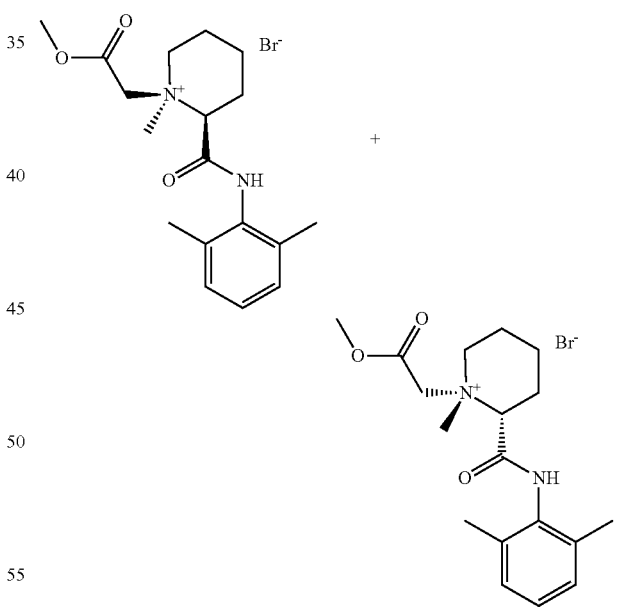

3a (ZYK2212-1)

$^1$H NMR (CDCl$_3$): δ 10.02 (s, 1H), 6.98-7.07 (m, 3H), 6.01 (dd, J$_1$=10.0 Hz, J$_2$=3.6 Hz, 1H), 4.81 (dd, J$_1$=338.8 Hz, J$_2$=16.8 Hz, 2H), 4.18-4.28 (m, 1H), 3.67-3.79 (m, 4H), 3.49 (s, 3H), 2.11-2.30 (m, 8H), 1.76-2.04 (m, 4H). $^{13}$C NMR (CDCl$_3$): δ 164.7, 164.2, 135.0, 132.7, 128.2, 127.6, 70.7, 61.9, 61.8, 53.4, 43.5, 24.6, 20.0, 19.9, 18.8. HRMS (ESI): m/z [M−Br]$^+$ calcd for C18H27N2O3 319.2016; found: 319.2022.

The second product isolated (Compound 3b; ZYK2212-2) (0.31 g, 75%) was determined, by 2D NMR techniques, to be a mixture of the two stereoisomers shown below:

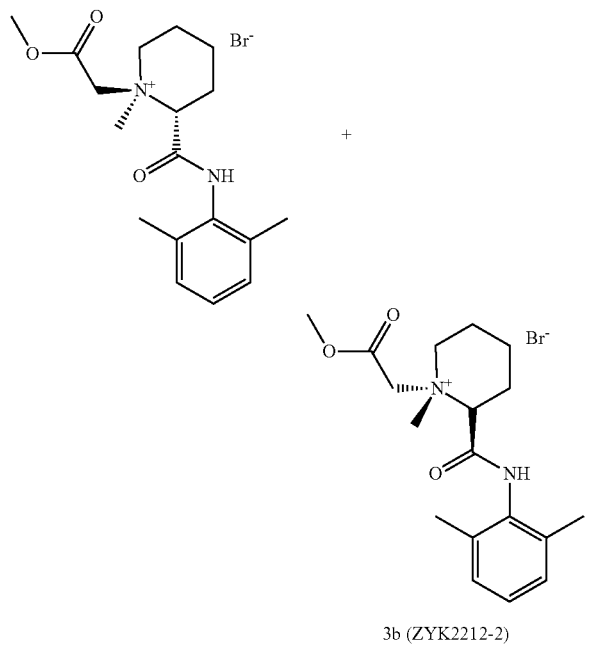

3b (ZYK2212-2)

$^1$H NMR (3-2, CDCl$_3$): δ 10.14 (s, 1H), 6.92-7.08 (m, 3H), 5.45 (dd, J$_1$=9.6 Hz, J$_2$=3.6 Hz, 1H), 4.74 (dd, J$_1$=290.4 Hz, J$_2$=17.2 Hz, 2H), 4.15-4.24 (m, 1H), 3.77-3.87 (m, 1H), 3.75 (s, 3H), 3.57 ((s, 3H), 2.26-2.37 (m, 1H), 2.11-2.23 (m, 7H), 1.76-1.90 (m, 4H). $^{13}$C NMR (CDCl$_3$): δ 165.2, 164.6, 135.0, 132.2, 128.2, 127.8, 72.2, 61.0, 54.6, 53.2, 50.1, 24.8, 19.9, 19.2, 18.3. HRMS (ESI): m/z [M−Br]$^+$ calcd for C18H27N2O3 319.2016; found: 319.2022.

2-((2,6-Dimethylphenyl)carbamoyl)-1-(2-methoxy-2-oxoethyl)-1-propylpiperidin-1-ium bromide (4S)

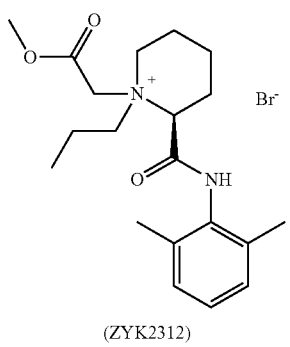

(ZYK2312)

To a 50 mL round bottom flask, (S)-ropivacaine (single enantiomer; 3 mmol), methyl bromoacetate (10 mmol), and 2 mL acetonitrile were added under the protection of nitrogen. The reaction was heated to 80° C. for 1 hour, and cooled down to room temperature. The solvent was removed under reduced pressure, and the residue was purified by silica gel column chromatography (dichloromethane:methanol=30:1) to give two products as a white solid.

The first product isolated (Compound 4Sa; ZYK2312-1) (0.77 g, 60%) was determined, by 2D NMR techniques, to be the stereoisomer shown below:

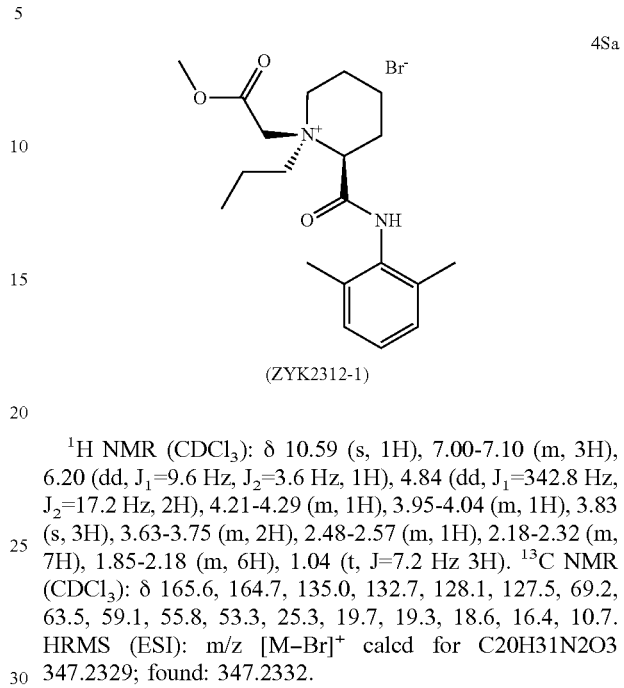

(ZYK2312-1)

$^1$H NMR (CDCl$_3$): δ 10.59 (s, 1H), 7.00-7.10 (m, 3H), 6.20 (dd, J$_1$=9.6 Hz, J$_2$=3.6 Hz, 1H), 4.84 (dd, J$_1$=342.8 Hz, J$_2$=17.2 Hz, 2H), 4.21-4.29 (m, 1H), 3.95-4.04 (m, 1H), 3.83 (s, 3H), 3.63-3.75 (m, 2H), 2.48-2.57 (m, 1H), 2.18-2.32 (m, 7H), 1.85-2.18 (m, 6H), 1.04 (t, J=7.2 Hz 3H). $^{13}$C NMR (CDCl$_3$): δ 165.6, 164.7, 135.0, 132.7, 128.1, 127.5, 69.2, 63.5, 59.1, 55.8, 53.3, 25.3, 19.7, 19.3, 18.6, 16.4, 10.7. HRMS (ESI): m/z [M−Br]$^+$ calcd for C20H31N2O3 347.2329; found: 347.2332.

The second product isolated (Compound 4Sb; ZYK2312-2) (0.11 g, 8.6%) was determined, by 2D NMR techniques, to be the stereoisomer shown below:

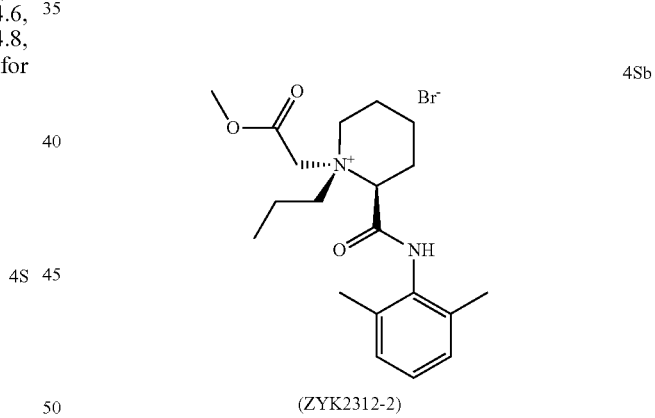

(ZYK2312-2)

$^1$H NMR (CDCl$_3$): δ 10.25 (s, 1H), 7.00-7.10 (m, 3H), 6.21 (dd, J$_1$=4.4 Hz, J$_2$=4.4 Hz, 1H), 4.60 (dd, J$_1$=254.8 Hz, J$_2$=16.8 Hz, 2H), 4.50-4.60 (m, 1H), 3.82-3.95 (m, 5H), 3.69 (td, J$_t$=13.2 Hz, J$_d$=4.8 Hz, 1H), 2.47-2.60 (m, 1H), 2.33-2.43 (m, 1H), 2.25 (s, 6H). 1.83-2.16 (m, 5H), 1.70-1.81 (m, 1H), 0.97 (t, J=7.2 Hz 3H). $^{13}$C NMR (CDCl$_3$): δ 165.0, 164.3, 135.0, 132.7, 128.2, 127.6, 67.9, 62.0, 58.2, 55.0, 53.4, 25.1, 20.1, 18.7, 17.6, 16.4, 10.7. HRMS (ESI): m/z [M−Br]$^+$ calcd for C20H31N2O3 347.2329; found: 347.2332.

Compounds 5-8 may be prepared in a manner analogous to the syntheses of the compounds above.

(5)

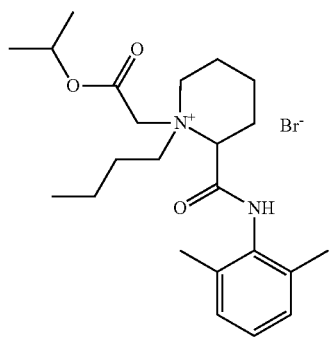

1-butyl-2-((2,6-dimethylphenyl)carbamoyl)-
1-(2-isopropoxy-2-oxoethyl)piperidin-1-ium
bromide (6)

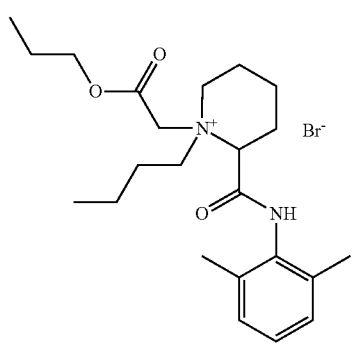

1-butyl-2-((2,6-dimethylphenyl)carbamoyl)-1-
(2-oxo-2-propoxyethyl)piperidin-1-ium
bromide (7)

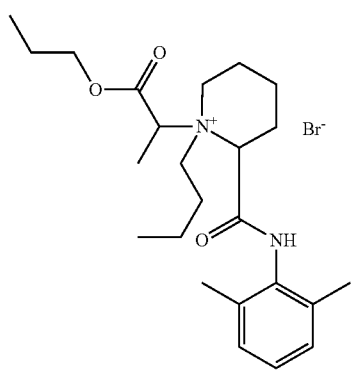

1-butyl-2-((2,6-dimethylphenyl)carbamoyl)-
1-(1-oxo-1-propoxypropan-2-yl)piperidin-1-
ium bromide -continued (8)

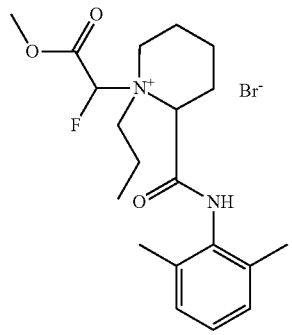

2-((2,6-dimethylphenyl)carbamoyl)-
1-(1-fluoro-2-methoxy-2-oxoethyl)-
1-propylpiperidin-1-ium bromide 1-(Acetoxymethyl)-1-butyl-2-((2,6-dimethylphenyl)
carbamoyl)piperidin-1-ium bromide (9)

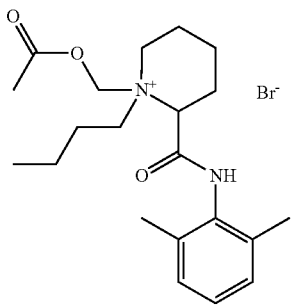

(ZYK1412)

To a 50 mL round bottom flask, bupivacaine (2.5 mmol), bromomethyl acetate (5 mmol), and 3 mL acetonitrile were added under the protection of nitrogen. The reaction was heated to 80° C. for 1 hour, and cooled down to room temperature. The solvent was removed under reduced pressure, and the residue was purified through silica gel column chromatography (dichloromethane:methanol=20:1) to give a white solid (0.83 g, 75%). $^1$H NMR (CDCl$_3$): δ 10.48 (s, 1H), 7.02-7.08 (m, 3H), 6.30 (dd, J$_1$=8.0 Hz, J$_2$=4.0 Hz, 2H), 5.79 (dd, J$_1$=21.2 Hz, J$_2$=9.6 Hz, 2H), 3.89-3.92 (m, 1H), 3.73 (td, J$_t$=13.2 Hz, J$_d$=4.8 Hz 1H), 3.50 (td, J$_t$=13.2 Hz, J$_d$=4.8 Hz 1H), 3.35-3.45 (m, 1H), 2.45-2.53 (m, 1H), 2.33 (s, 3H), 2.27 (s, 6H). 1.84-2.06 (m, 7H), (tq, J$_t$=7.2 Hz, J$_q$=7.2 Hz 2H), 1.01 (t, J=7.2 Hz 3H). $^{13}$C NMR (CDCl$_3$): δ 168.1, 165.4, 135.0, 132.3, 128.2, 127.6, 75.1, 68.5, 60.3, 55.0, 25.4, 24.3, 20.8, 20.0, 19.6, 19.2, 18.7, 13.5. HRMS (ESI): m/z [M−Br]$^+$ calcd for C21H33N2O3 361.2486; found: 361.2491.

1-(Acetoxymethyl)-2-((2,6-dimethylphenyl)carbamoyl)-1-propylpiperidin-1-ium bromide (10S)

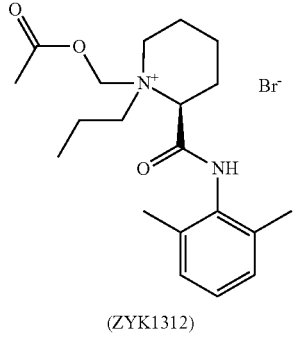

(ZYK1312)

To a 50 mL round bottom flask, (S)-ropivacaine (single enantiomer; 2.5 mmol), bromomethyl acetate (5 mmol), and 3 mL acetonitrile were added under the protection of nitrogen. The reaction was heated to 80° C. for 1 hour, and cooled down to room temperature. The solvent was removed under reduced pressure, and the residue was purified through silica gel column chromatography (dichloromethane:methanol=25:1) to give a white solid (0.85 g, 80%). $^1$H NMR (DMSO-d6): δ 10.3 (s, 1H), 7.06-7.16 (m, 3H), 5.68-5.76 (m, 2H), 4.73-4.80 (m, 1H), 3.85-3.95 (m, 1H), 3.30-3.50 (m, 4H), 2.25-2.40 (m, 2H), 2.23 (s, 3H), 2.14 (s, 6H). 1.60-90 (m, 6H), 0.94 (t, J=7.2 Hz 3H). HRMS (ESI): m/z [M−Br]$^+$ calcd for C20H31N2O3 347.2329; found: 347.2335.

1-((Butyryloxy)methyl)-2-((2,6-dimethylphenyl)carbamoyl)-1-propylpiperidin-1-ium chloride (11S)

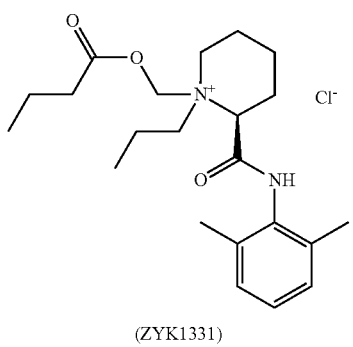

(ZYK1331)

To a 50 mL round bottom flask, (S)-ropivacaine (single enantiomer; 2.5 mmol), chloromethyl butyrate (10 mmol), and 3 mL acetonitrile were added under the protection of nitrogen. The reaction was heated to 80° C. for 6 hours, and cooled down to room temperature. The solvent was removed under reduced pressure, and the residue was purified through silica gel column chromatography (dichloromethane:methanol=25:1) to give a white solid (0.62 g, 60%). $^1$H NMR (CDCl$_3$): δ 10.09 (s, 1H), 6.98-7.08 (m, 3H), 6.12 (dd, J$_1$=9.2 Hz, J$_2$=3.6 Hz, 1H), 5.86 (dd, J$_1$=34.4 Hz, J$_2$=9.6 Hz, 2H), 3.73-3.84 (m, 1H), 3.63 (td, J$_t$=13.2 Hz, J$_d$=4.8 Hz 1H), 3.43-3.55 (m, 2H), 2.15-2.38 (m, 8H). 1.86-2.09 (m, 5H), 1.68 (tq, J$_t$=7.2 Hz, J$_q$=7.2 Hz 2H), 1.03 (t, J=7.2 Hz 3H), 0.96 (t, J=7.2 Hz 3H). $^{13}$C NMR (CDCl$_3$): δ 170.8, 165.4, 134.9, 133.0, 128.1, 127.4, 75.0, 69.9, 68.9, 62.7, 35.5, 25.4, 19.7, 19.5, 18.6, 18.0 16.1, 13.4, 10.9. HRMS (ESI): m/z [M−Cl]$^+$ calcd for C22H35N2O3 375.2642; found: 375.2648.

1-butyl-1-((butyryloxy)methyl)-2-((2,6-dimethylphenyl)carbamoyl)piperidin-1-ium chloride (12)

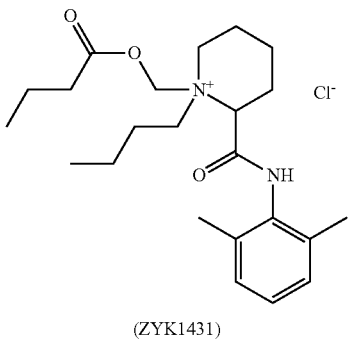

(ZYK1431)

To a 50 mL round bottom flask, bupivacaine (2.5 mmol), chloromethyl butyrate (10 mmol), and 3 mL acetonitrile were added under the protection of nitrogen. The reaction was heated to 80° C. for 6 hours, and cooled down to room temperature. The solvent was removed under reduced pressure, and the residue was purified through silica gel column chromatography (dichloromethane:methanol=20:1) to give a white solid (0.58 g, 55%). $^1$H NMR (CDCl$_3$): δ 11.13 (s, 1H), 6.95-7.07 (m, 3H), 6.09 (dd, J$_1$=8.8 Hz, J$_2$=4.0 Hz, 1H), 5.86 (dd, J$_1$=26.0 Hz, J$_2$=9.6 Hz, 2H), 3.75-3.87 (m, 1H), 3.66 (td, J$_t$=13.2 Hz, J$_d$=4.8 Hz 1H), 3.34 3-3.53 (m, 2H), 2.40-2.68 (m, 4H), 2.13-2.33 (m, 7H), 1.80-2.02 (m, 6H), 1.65 (tq, J$_t$=7.2 Hz, J$_q$=7.2 Hz 2H), 1.37 (tq, J$_t$=7.2 Hz, J$_q$=7.2 Hz 2H), 0.97 (t, J=7.2 Hz 3H), 0.94 (t, J=7.2 Hz 3H). HRMS (ESI): m/z [M−Cl]$^+$ calcd for C23H37N2O3 389.2799; found: 389.2806.

N-(Acetoxymethyl)-2-((2,6-dimethylphenyl)amino)-N,N-diethyl-2-oxoethan-1-aminium bromide (13)

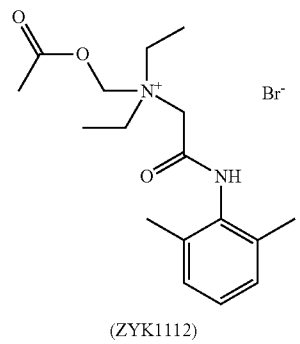

(ZYK1112)

To a 50 mL round bottom flask, lidocaine (2.5 mmol), bromomethyl acetate (5 mmol), and 3 mL acetonitrile were added under the protection of nitrogen. The reaction was heated to 80° C. for 1 hour, and cooled down to room temperature. The solvent was removed under reduced pressure, and the residue was purified through silica gel column chromatography (dichloromethane:methanol=25:1) to give a white solid (0.87 g, 90%). ¹H NMR (CDCl₃): δ 10.32 (s, 1H), 6.93-7.10 (m, 3H), 5.58 (s, 2H), 4.99 (s, 2H), 3.58-3.78 (m, 4H), 2.31 (s, 3H), 2.24 (s, 6H), 1.45 (t, J=7.2 Hz 6H). ¹³C NMR (CDCl₃): δ 168.2, 161.6, 135.1, 132.8, 128.1, 127.6, 76.5, 55.8, 54.1, 20.8, 18.8, 8.2. HRMS (ESI): m/z [M–Br]⁺ calcd for C17H27N2O3 307.2016; found: 307.2022.

2-((2,6-dimethylphenyl)carbamoyl)-1-(2-(methyl-amino)-2-oxoethyl)-1-propyl-1-piperidin-2-ylium bromide (26S)

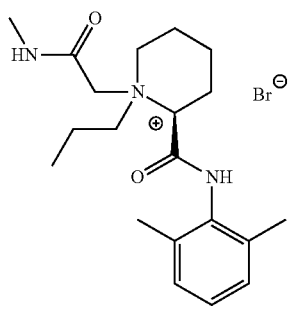

(ZYK3312)

To a 50 mL round bottom flask, (S)-ropivacaine (single enantiomer; 3 mmol), 2-bromo-N-methylacetamide (10 mmol), and 1 mL acetonitrile were added under the protection of nitrogen. The reaction was heated to 80° C. for 16 hours, and cooled down to room temperature. The solvent was removed under reduced pressure, and the residue was purified by silica gel column chromatography (dichloromethane:methanol=20:1) to give a white solid.

The first product isolated (Compound 26Sa; ZYK3312-1) (0.45 g, 35%) was determined, by 2D NMR techniques, to be the stereoisomer shown below:

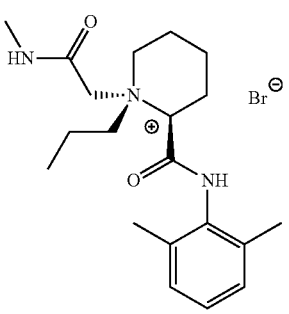

(ZYK3312-1)

¹H NMR (CDCl₃): δ 9.98 (s, 1H), 8.63 (q, J=4.0 Hz, 1H), 6.95-7.06 (m, 3H), 5.38 (dd, J₁=12 Hz, J₂=3.6 Hz, 1H), 4.81 (dd, J₁=64 Hz, J₂=16 Hz, 2H), 4.11-4.28 (m, 1H), 3.83-3.99 (m, 1H), 3.49 (dt, J_r=12 Hz, J_d=4.0 Hz, 1H), 3.27-3.41 (m, 1H), 2.67 (d, J=4.0 Hz, 3H), 2.43-2.59 (m, 1H), 2.03-2.38 (m, 9H), 1.58-1.91 (m, 4H), 0.91 (t, J=8.0 Hz 3H). ¹³C NMR (CDCl₃): δ 165.7, 164.0, 135.1, 132.6, 128.2, 127.6, 69.3, 58.3, 56.2, 25.8, 25.3, 20.0, 18.6, 18.5, 16.3, 11.1, 10.7. HRMS (ESI): m/z [M–Br]⁺ calcd for C20H30N2O3 346.2489; found: 346.2493.

Compounds 14-25 and 27-31 may be prepared in a manner analogous to the syntheses of the compounds above.

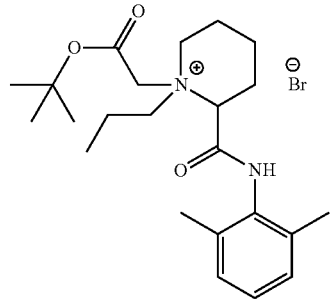

14

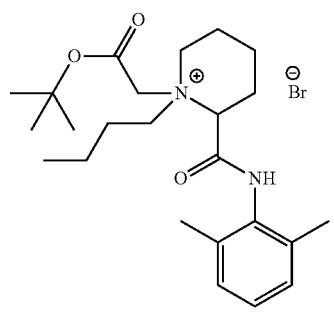

15

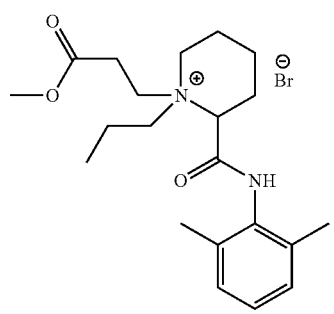

16

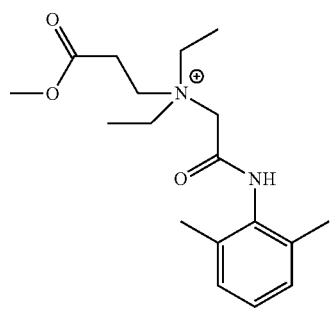

17

-continued
18
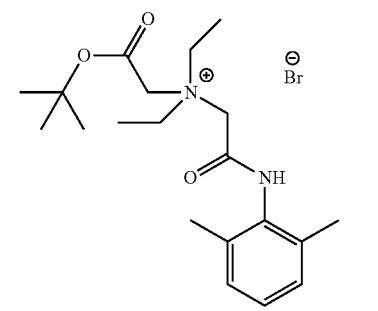
19
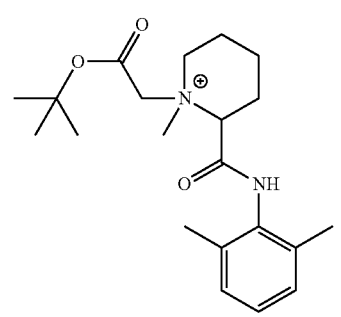
20
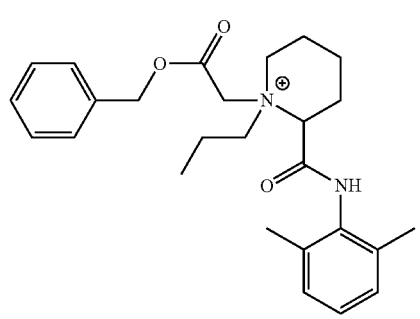
21
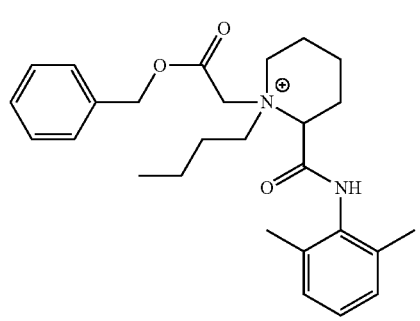
22
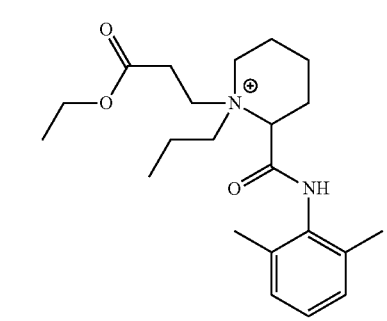
-continued
23
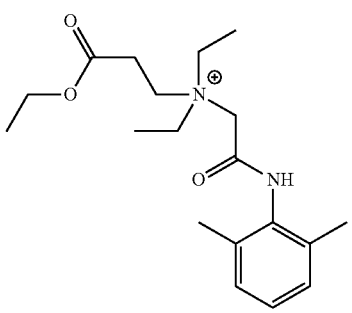
24
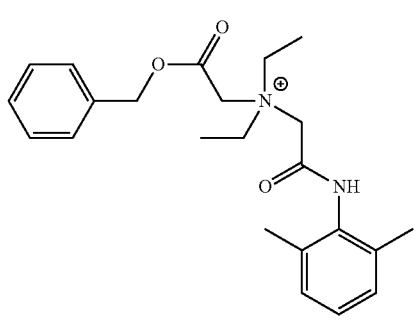
25
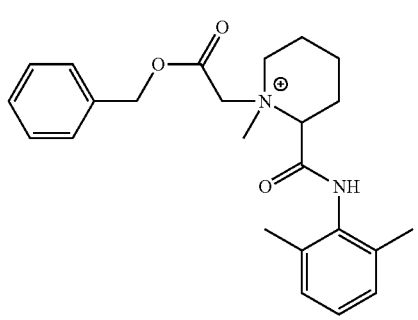
27
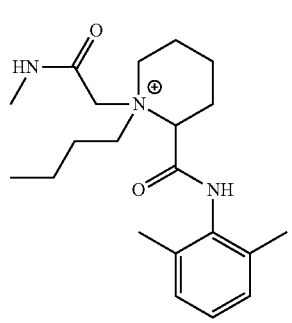
28
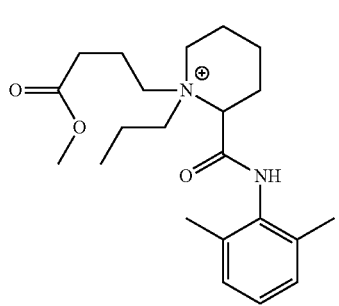

-continued

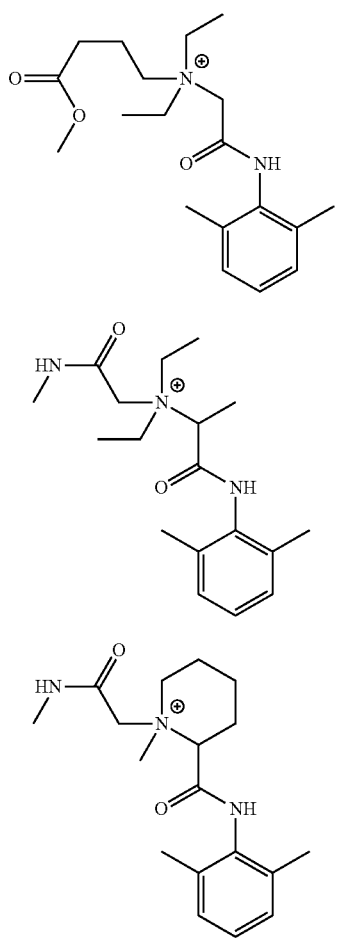

29

30

31

Biological Assay Data and Procedures
Duration of Sensory and Motor Block in Rats Sciatic Nerve Block and Neurobehavioral Testing. Animals were cared for in compliance with protocols approved by the Children's Hospital Animal Care and Use Committee, and the Massachusetts Institute of Technology Committee on Animal Care, which conformed to guidelines of the International Association for the Study of Pain. Adult male Sprague-Dawley rats (Charles River Laboratories) weighing 320-450 g were housed in groups, in a 6 AM to 6 PM light-dark cycle. Under brief isoflurane-oxygen anesthesia, a 23G needle was introduced postero-medial to the greater trochanter, until bone was contacted, and 0.3 mL of test solution was injected over the sciatic nerve. Thermal nociception was assessed by a modified hotplate test, and motor function via a weight-bearing test.

The duration of thermal nociceptive block was calculated as the time required for thermal latency to return to a value of 7 s from a higher value; 7 s is the midpoint between a baseline thermal latency of 2 seconds in adult rats, and a maximal latency of 12 s. Motor strength was assessed with a weight-bearing test. In brief, the animal was held over a digital balance such that it could bear weight with 1 hind paw at a time. The maximum weight that it could bear was recorded. The duration of motor blockade was defined as the time for weight bearing to return halfway to normal from maximal block. The halfway point for each rat was defined as [(highest weight borne by either leg) (lowest weight borne by blocked leg)]/2 (lowest weight borne by blocked leg).

Exemplary compounds were evaluated under the described experimental conditions. The results in Table 1 demonstrate that compounds of the disclosure are effective sensory nerve blocking agents. Surprisingly, compounds of the disclosure also exhibit high selectively for sensory nerve blockade over motor function blockade, particularly compared to standard of care local anesthetics such as ropivacaine and bupivacaine.

TABLE 1

| Compound | Dose conc (mM) | Block Duration (min) Sensory | Motor | Sensory:Motor Block Ratio | n |
|---|---|---|---|---|---|
| Bupivacaine | 10 | 129 ± 21 | 140 ± 15 | 0.92 | 4 |
|  | 15 | 215 ± 31 | 222 ± 30 | 0.97 | 4 |
| (S)-Ropivacaine | 10 | 150 ± 35 | 150 ± 38 | 1 | 4 |
|  | 15 | 215 ± 31 | 210 ± 28 | 1 | 4 |
| 2a + 2b | 5 | 30 ± 12 | 0 | ∞ | 4 |
| (1:1 mixture) | 7.5 | 120 ± 34 | 30 ± 15 | 4 | 8 |
| (ZYK2412-1 + ZYK2412-2) | 10 | 150 ± 51 | 50 ± 23 | 3 | 8 |
| 3a (ZYK2212-1) | 10 | 0 | 0 | — | 4 |
| 3b (ZYK2212-2) | 10 | 450 ± 60 | 300 ± 60 | 1.5 | 4 |
| 4Sa + 4Sb | 5 | 34 ± 13 | 0 | ∞ | 6 |
| (2.5:1 mixture) | 7.5 | 108 ± 27 | 10 ± 10 | 10.8 | 8 |
| (ZYK2312-1 + ZYK2312-2) | 10 | 220 ± 40 | 78 ± 24 | 2.8 | 8 |
|  | 15 | 254 ± 48 | 69 ± 20 | 3.7 | 8 |
| 4Sa (ZYK2312-1) | 10 | 200 ± 60 | 100 ± 60 | 2 | 6 |
| 4Sb (ZYK2312-2) | 10 | 90 ± 30 | 0 | ∞ | 8 |
|  | 15 | 200 ± 30 | 0 | ∞ | 10 |
| 9 (ZYK1412) | 5 | 65 ± 23 | 25 ± 19 | 2.6 | 5 |
|  | 10 | 120 ± 53 | 75 ± 39 | 1.6 | 8 |
|  | 15 | 125 ± 51 | 85 ± 36 | 1.5 | 8 |
| 10S (ZYK1312) | 5 | 55 ± 23 | 15 ± 15 | 3.7 | 4 |
|  | 10 | 105 ± 53 | 65 ± 34 | 1.6 | 4 |
| 11S (ZYK1331) | 10 | 135 ± 56 | 90 ± 44 | 1.5 | 4 |
| 26Sa (ZYK3312-1) | 10 | 180 | 140 | 1.3 | 4 |

Cytotoxicity

C2C12 Mouse myoblasts [American Type Culture Collection (ATCC) CRL-1772] were cultured to proliferate in DMEM supplemented with 20% FBS and 100 Penicillin Streptomycin. Cell culture supplies were obtained from Invitrogen, unless otherwise noted. Cells were plated at 50,000 cells per mL in DMEM with 2% horse serum and 1% Penn Strep, and left to differentiate into myotubules for 10-14 days. During differentiation, media were exchanged every 2 to 3 days. Cell viability and proliferation were studied after exposures to drugs for up to 24 h. PC12 cells (ATCC, CRL-1721) originating from rat adrenal gland pheochromocytoma were grown in 24-well tissue culture dishes (CellBind; Corning) with F-12K (ATCC) supplemented with 12.5% horse serum (Gibco), 2.5% FBS (Gibco), and 1% Penn Strep (Sigma). For neuronal induction (PC12), cells were seeded at a relative low density of 5×104 cells/cm2 and 50 ng/mL NGF was added 24 h after seeding. Cell viability and proliferation were evaluated as for C2C12 cells. Experiments with PC12 cells were conducted for up to 24 hours.

Figure 2:
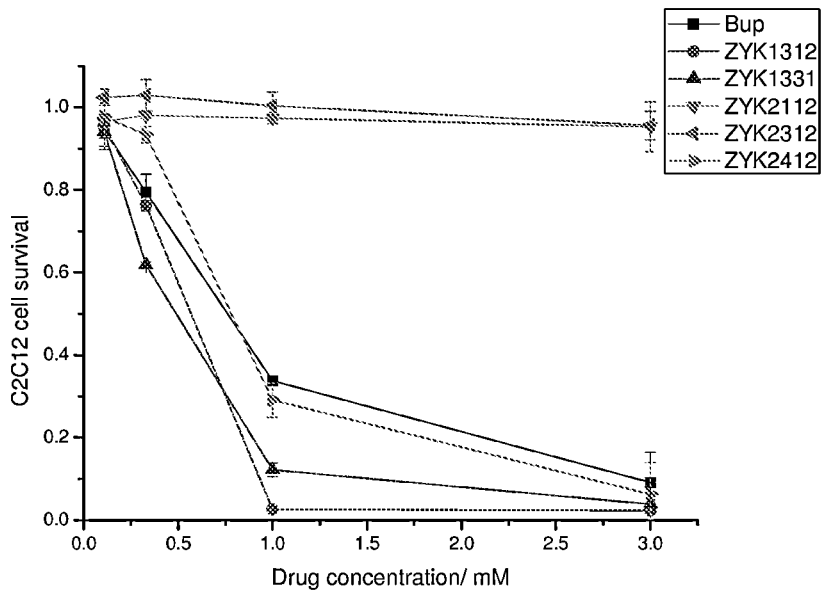
FIG. 2 is a plot showing the cytotoxicity of exemplary compounds in comparison to ropivacaine and bupivacaine in C212 cells.

FIG. 1 and FIG. 2 show results of the cytotoxicity assays with compounds 10S (ZYK1312), 11S (ZYK1331), 1 (ZYK2112), 4Sa/4Sb (mixture; ZYK2312-1/ZYK2312-2), 2a/2b (mixture; ZYK2412-1/ZYK2412-2) demonstrating that compounds of the disclosure are significantly less cytotoxic than ropivacaine and bupivacaine. Table 2 shows the results of additional experiments, also demonstrating that compounds 4Sa (ZYK2312-1), 4Sb (ZYK2312-1), and 26Sa (ZYK3312-1) are significantly less cytotoxic than ropivacaine and bupivacaine.

TABLE 2

Cytotoxicity of compounds

| compound | PC12 IC$_{50}$ | C2C12 IC$_{50}$ |
|---|---|---|
| 4Sa (ZYK2312-1) | 19.2 mM | 14.6 mM |
| 4Sb (ZYK2312-2) | 20.1 | 19.3 |
| 26Sa (ZYK3312-1) | 1.2 mM | 1.0 mM |
| bupivacaine | 0.87 mM | 0.72 mM |

In Vitro Effects on hERG and Peak Nav1.5

These experiments were designed to examine the acute effects of 4Sa (ZYK2312-1), 4Sb (ZYK2312-2), and bupivacaine on hERG and peak Nav1.5 currents recorded from stably transfected HEK cells.

Experimental Methods: Currents were measured using the whole-cell variant of the patch clamp method. Glass pipettes were pulled from borosilicate glass by a horizontal puller (Sutter Instruments, USA). Pipette tip resistance was approximately 1 to 2 MΩ when filled with internal solutions. Series resistance was compensated electronically by approximately 60-80%. Bath temperature was measured by a thermistor placed near the cell under study. An Axopatch 1-B amplifier (Axon Instruments, Foster City, CA) was used for whole-cell voltage clamping. Creation of voltage clamp pulses and data acquisition was controlled by a computer running pClamp software (ver 9.2 Axon Instruments). After rupture of the cell membrane (entering whole-cell mode), current kinetics and amplitudes were allowed to stabilize as the cell was dialyzed with internal solution and paced every 5 seconds (typically 2 to 3 minutes). Peak $I_{Na}$ was elicited using a pulse pattern with fixed amplitudes (conditioning prepulse: −120 mV for 50 ms; depolarizing test step to −30 mV for 20 ms). hERG current was elicited with a 500 ms pulse to +10 mV followed by a 500 ms pulse to −40 mV (holding potential=75 mV). Cells were perfused at each testing concentration until a steady-state was reached.

Figure 3:
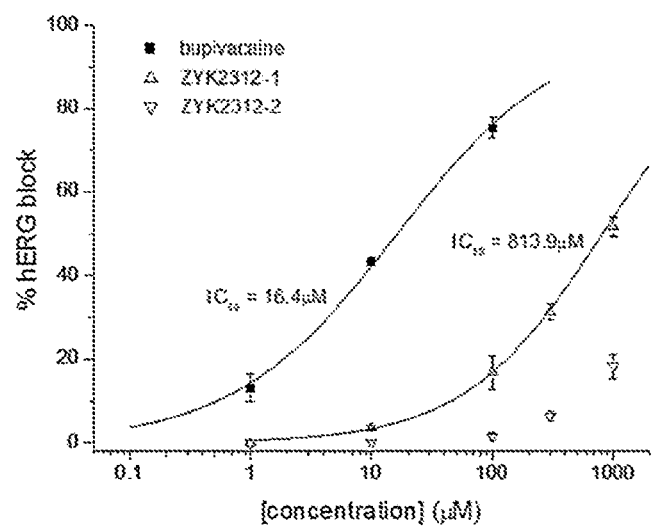
FIG. 3 is two plots showing the inhibition of hERG and peak Nav1.5 by exemplary compounds in comparison to bupivacaine in HEK cells.
Figure 3:
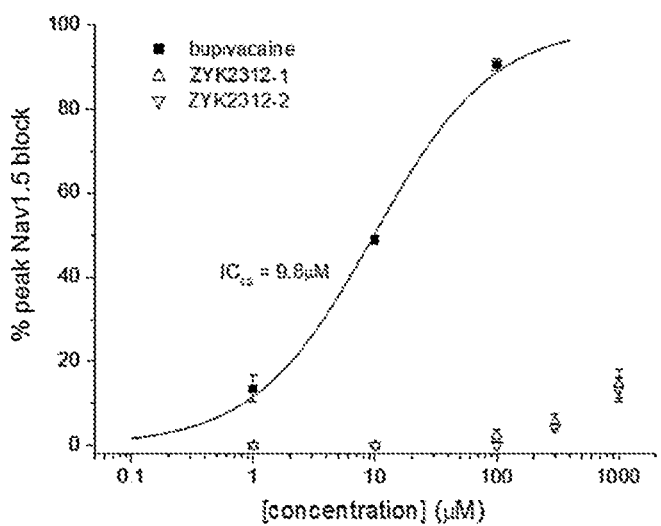

Raw data and mean±SEM are given. Data are presented as percent reduction of current amplitude. This was measured as current reduction after a steady-state effect had been reached in the presence of drug relative to current amplitude before drug was introduced (control). Each cell served as its own control. A nonlinear curve-fitting routine was utilized to fit a three-parameter Hill equation to the results using MicroCal Origin, version 6.0 software. The equation is:

$$y = V_{max}\frac{x^n}{k^n + x^n}$$

where Vmax=100 and k and n are unconstrained variables. All data are shown in Tables 2 and 3 and FIG. 3.

The effects of 4Sa (ZYK2312-1), 4Sb (ZYK2312-2), and bupivacaine on hERG and peak Nav1.5 currents were characterized in stably transfected HEK cells at physiologic temperatures. As indicated in Tables 3 and 4, and FIG. 3, bupivacaine was associated with a concentration-dependent block of both hERG and peak Nav1.5 currents over the tested concentration range of 1-100 μM. The IC$_{50}$ values were 16.4 μM for hERG and 9.8 μM for peak Nav1.5.

In contrast, of 4Sa (ZYK2312-1) had little effect on peak Nav1.5 (concentration range 1-1000 μM) and weakly blocked hERG current with an IC$_{50}$ of 813.9 μM. 4Sb (ZYK2312-2) had little effect on either current over its tested concentration range. Therefore, 4Sa (ZYK2312-1) and 4Sb (ZYK2312-2) were weak blockers of these cardiac currents over a concentration range of 1-1000 μM. In contrast, bupivacaine blocked both current with IC$_{50}$ values of 16.4 μM for hERG and 9.8 μM for peak Nav1.5.

TABLE 3

Effects of compounds on hERG current amplitude (percent reduction of current amplitude)

| compound | 1 μM | 10 μM | 100 μM | 300 μM | 1000 μM |
|---|---|---|---|---|---|
| 4Sa | 0 | 4.4 | 24.6 | 35.2 | 52.8 |
| (ZYK2312-1) | 0 | 3.9 | 11.1 | 30.1 | 47.4 |
|  | 0 | 2.6 | 14.7 | 28.7 | 54.6 |
| mean ± SE | 0 ± 0 | 3.6 ± 0.5 | 16.8 ± 4.0 | 31.3 ± 2.0 | 51.6 ± 2.2 |
| 4Sb | 0 | 0 | 0 | 5.2 | 15.7 |
| (ZYK2312-2) | 0 | 0 | 1.9 | 6.9 | 21.4 |
|  | 0 | 0 | 2.6 | 7.2 | 17.8 |
| mean ± SE | 0 ± 0 | 0 ± 0 | 1.5 ± 0.8 | 6.4 ± 1.1 | 18.3 ± 2.9 |
| bupivacaine | 19.8 | 43.0 | 76.3 | NA | NA |
|  | 9.1 | 45.0 | 70.7 |  |  |
|  | 10.5 | 42.1 | 78.9 |  |  |
| mean ± SE | 13.1 ± 3.4 | 43.4 ± 0.9 | 75.3 ± 2.4 |  |  |

Values are mean ± standard error

TABLE 4

Effects of compounds on peak Nav1.5 current amplitude (percent reduction of current amplitude)

| compound | 1 μM | 10 μM | 100 μM | 300 μM | 1000 μM |
|---|---|---|---|---|---|
| 4Sa | 0 | 0 | 0 | 3.7 | 11.2 |
| (ZYK2312-1) | 0 | 0 | 2.1 | 5.8 | 14.5 |
|  | 0 | 0 | 4.9 | 7.2 | 18.0 |

TABLE 4-continued

Effects of compounds on peak Nav1.5 current amplitude
(percent reduction of current amplitude)

| compound | 1 µM | 10 µM | 100 µM | 300 µM | 1000 µM |
|---|---|---|---|---|---|
| mean ± SE | 0 ± 0 | 0 ± 0 | 2.3 ± 1.4 | 5.6 ± 1.8 | 14.6 ± 3.4 |
| 4Sb | 0 | 0 | 0 | 2.8 | 13.8 |
| (ZYK2312-2) | 0 | 0 | 0 | 4.0 | 10.2 |
|  | 0 | 0 | 0 | 5.9 | 15.9 |
| mean ± SE | 0 ± 0 | 0 ± 0 | 0 ± 0 | 4.2 ± 0.9 | 13.3 ± 2.9 |
| bupivacaine | 18.3 | 50.8 | 89.2 | NA | NA |
|  | 7.7 | 49.0 | 89.1 |  |  |
|  | 14.5 | 47.3 | 93.8 |  |  |
| mean ± SE | 13.5 ± 3.1 | 49.0 ± 1.0 | 90.7 ± 1.5 |  |  |

Values are mean ± standard error

EQUIVALENTS AND SCOPE

In the claims articles such as "a," "an," and "the" may mean one or more than one unless indicated to the contrary or otherwise evident from the context. Claims or descriptions that include "or" between one or more members of a group are considered satisfied if one, more than one, or all of the group members are present in, employed in, or otherwise relevant to a given product or process unless indicated to the contrary or otherwise evident from the context. The invention includes embodiments in which exactly one member of the group is present in, employed in, or otherwise relevant to a given product or process. The invention includes embodiments in which more than one, or all of the group members are present in, employed in, or otherwise relevant to a given product or process.

Furthermore, the invention encompasses all variations, combinations, and permutations in which one or more limitations, elements, clauses, and descriptive terms from one or more of the listed claims is introduced into another claim. For example, any claim that is dependent on another claim can be modified to include one or more limitations found in any other claim that is dependent on the same base claim. Where elements are presented as lists, e.g., in Markush group format, each subgroup of the elements is also disclosed, and any element(s) can be removed from the group. It should it be understood that, in general, where the invention, or aspects of the invention, is/are referred to as comprising particular elements and/or features, certain embodiments of the invention or aspects of the invention consist, or consist essentially of, such elements and/or features. For purposes of simplicity, those embodiments have not been specifically set forth in haec verba herein. It is also noted that the terms "comprising" and "containing" are intended to be open and permits the inclusion of additional elements or steps. Where ranges are given, endpoints are included. Furthermore, unless otherwise indicated or otherwise evident from the context and understanding of one of ordinary skill in the art, values that are expressed as ranges can assume any specific value or sub-range within the stated ranges in different embodiments of the invention, to the tenth of the unit of the lower limit of the range, unless the context clearly dictates otherwise.

This application refers to various issued patents, published patent applications, journal articles, and other publications, all of which are incorporated herein by reference. If there is a conflict between any of the incorporated references and the instant specification, the specification shall control. In addition, any particular embodiment of the present invention that falls within the prior art may be explicitly excluded from any one or more of the claims. Because such embodiments are deemed to be known to one of ordinary skill in the art, they may be excluded even if the exclusion is not set forth explicitly herein. Any particular embodiment of the invention can be excluded from any claim, for any reason, whether or not related to the existence of prior art.

Those skilled in the art will recognize or be able to ascertain using no more than routine experimentation many equivalents to the specific embodiments described herein. The scope of the present embodiments described herein is not intended to be limited to the above Description, but rather is as set forth in the appended claims. Those of ordinary skill in the art will appreciate that various changes and modifications to this description may be made without departing from the spirit or scope of the present invention, as defined in the following claims.

What is claimed is:

1. A compound of Formula (II):

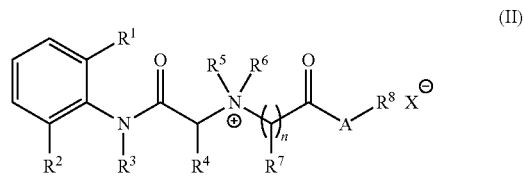

wherein:
$R^1$ is substituted or unsubstituted alkyl;
$R^2$ is substituted or unsubstituted alkyl;
$R^3$ is hydrogen, or substituted or unsubstituted alkyl;
$R^4$ is joined with $R^5$ or $R^6$ to form a heterocyclyl ring;
$R^5$ is substituted or unsubstituted alkyl, or is joined with $R^4$ to form a heterocyclyl ring;
$R^6$ is substituted or unsubstituted alkyl, or is joined with $R^4$ to form a heterocyclyl ring;
$R^7$ is hydrogen, substituted or unsubstituted alkyl, or halogen;
$R^8$ is substituted or unsubstituted alkyl, substituted or unsubstituted carbocyclyl, substituted or unsubstituted heterocyclyl, substituted or unsubstituted heteroaryl, or substituted or unsubstituted aryl;
A is O, S, or $NR^A$;
$R^A$ is hydrogen or substituted or unsubstituted alkyl;
$X^−$ is a counterion; and
n is 1, 2, 3, 4, 5, or 6;

provided that the compound is not:

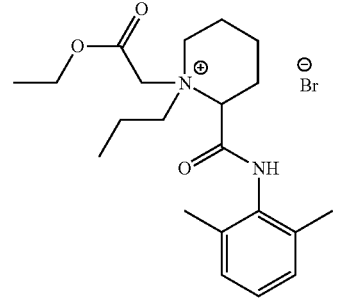

2. The compound of claim 1, wherein:
$R^1$ is unsubstituted alkyl; and
$R^2$ is unsubstituted alkyl.

3. The compound of claim 1, wherein:
$R^3$ is hydrogen.

4. The compound of claim 1, wherein:
$R^5$ is unsubstituted alkyl; and
$R^6$ is joined with $R^4$ to form a heterocyclyl ring.

5. The compound of claim 1, wherein:
$R^7$ is hydrogen.

6. The compound of claim 1, wherein:
$R^8$ is substituted or unsubstituted alkyl.

7. The compound of claim 1, wherein:
$R^8$ is unsubstituted $C_{1-4}$ alkyl.

8. The compound of claim 1, wherein:
A is O or S.

9. The compound of claim 1, wherein:
n is 1.

10. The compound of claim 1, wherein:
$X^-$ is a halide ion.

11. The compound of claim 1, wherein the compound is of Formula (II-e):

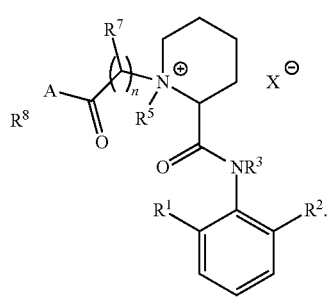

(II-e)

12. A compound of formula:

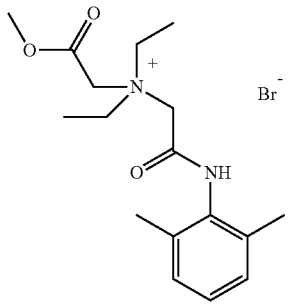

1

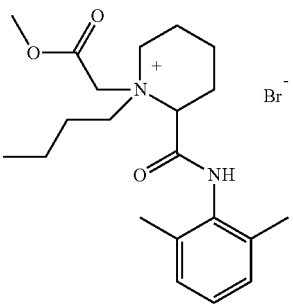

2

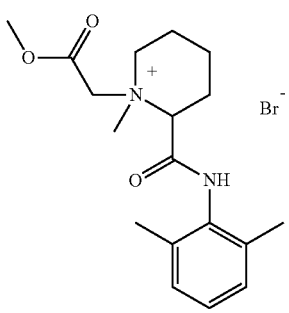

3

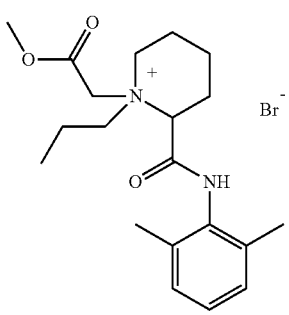

4

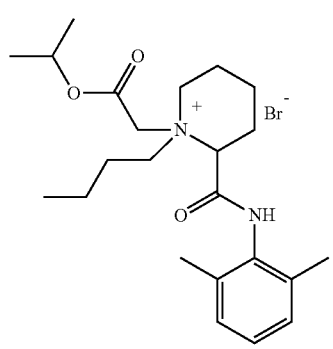

5

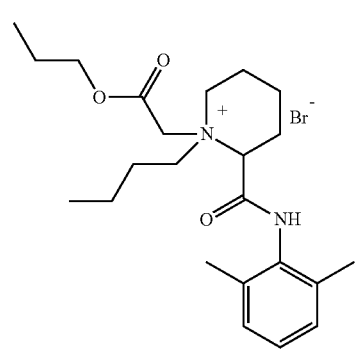
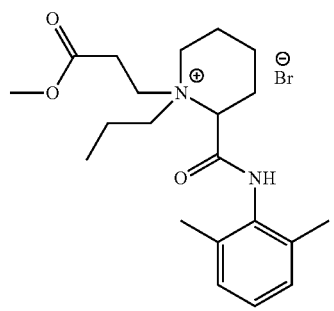
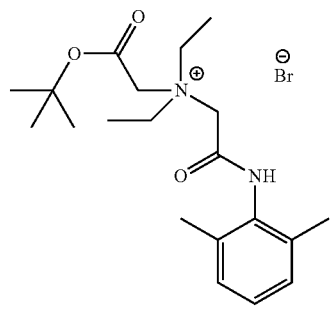
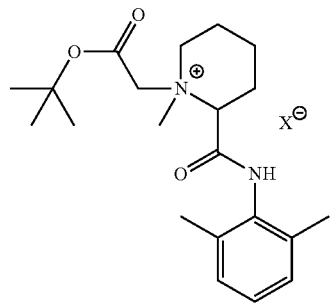
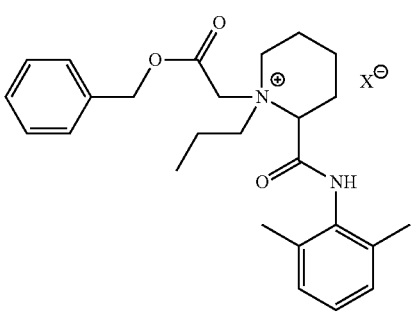

21
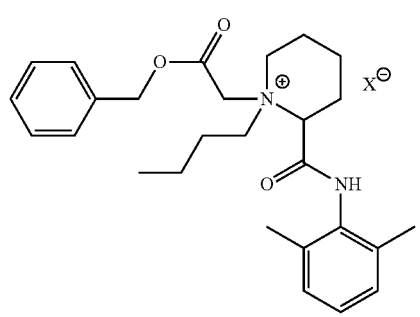
22
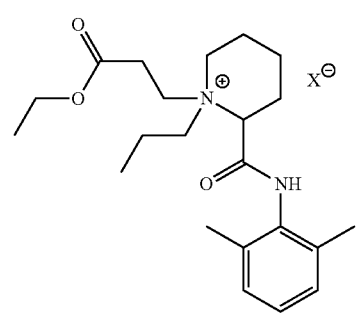
23
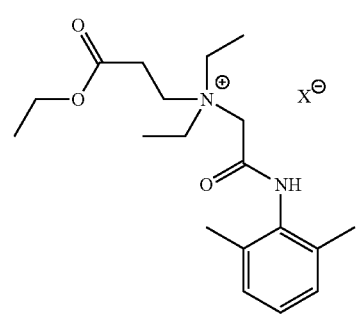
24
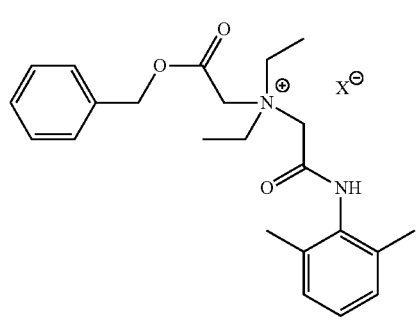
25
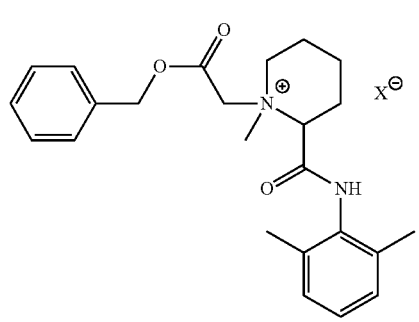
26
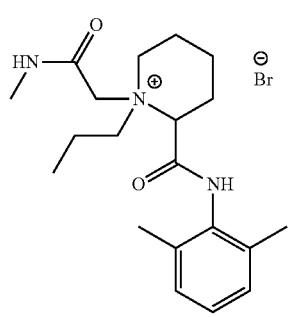
27
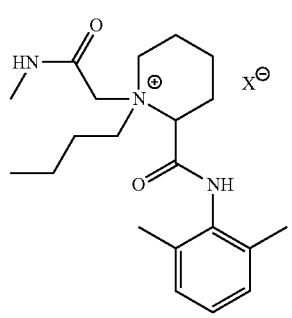
28
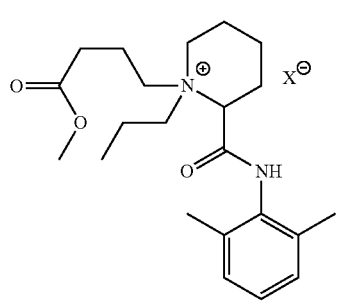
29
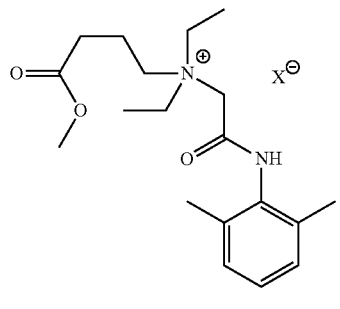
30
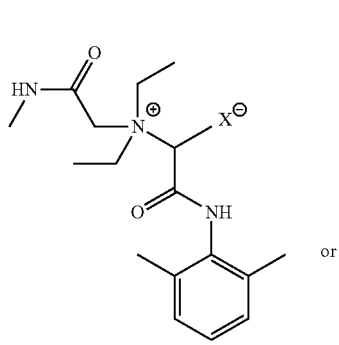
or -continued

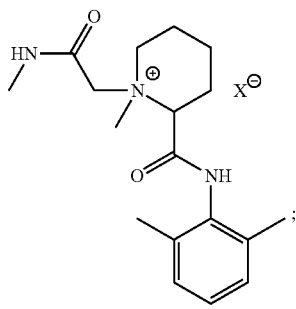

wherein X⁻ is a counterion.

13. A compound of formula:

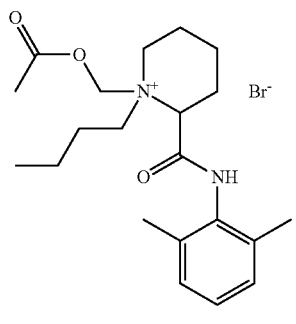

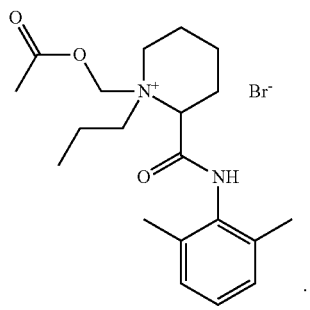

14. A pharmaceutical composition comprising a compound of claim 1 and a pharmaceutically acceptable excipient.

15. A kit comprising a compound of claim 1; and instructions for administering the compound to a subject.

16. The compound of claim 1, wherein the compound is of Formula (II-f):

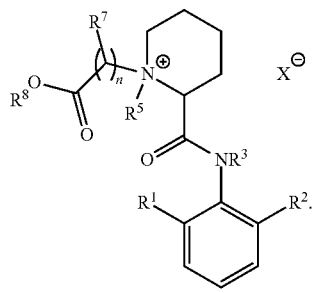

17. The compound of claim 1, wherein the compound is of Formula (II-g):

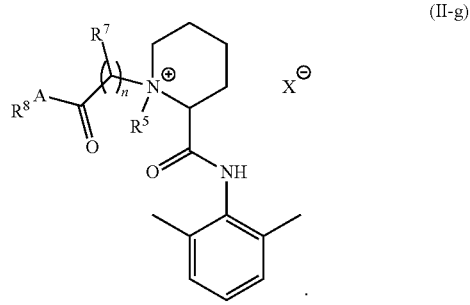

18. The compound of claim 1, wherein the compound is of Formula (II-h):

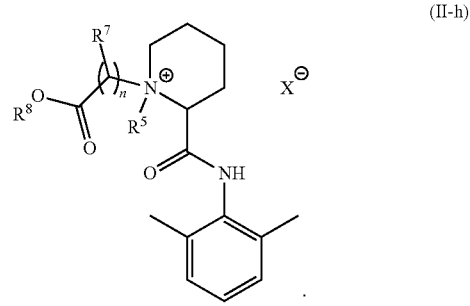

19. The compound of claim 1, wherein the compound is of Formula (II-i):

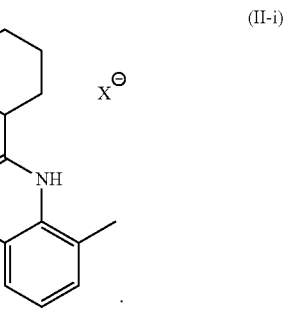

20. The compound of claim 1, wherein the compound is of Formula (II-j):

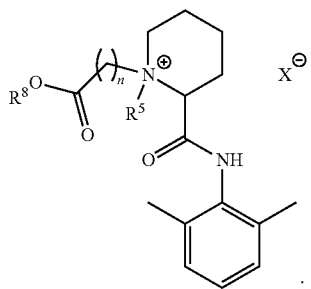
(II-j)
21. The compound of claim 1, wherein the compound is of formula:
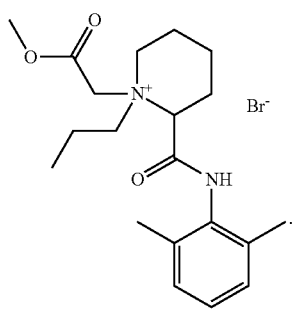
(4)
22. The compound of claim 1, wherein the compound is of formula:
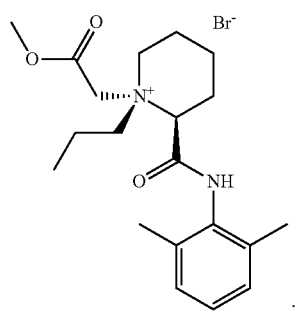
(4Sb)
23. A pharmaceutical composition comprising a compound of claim 12 and a pharmaceutically acceptable excipient.
* * * * *